US009256353B2

(12) United States Patent
Wilkinson et al.

(10) Patent No.: US 9,256,353 B2
(45) Date of Patent: *Feb. 9, 2016

(54) PROVIDING APPLICATION AND DEVICE MANAGEMENT USING ENTITLEMENTS

(71) Applicant: VMware, Inc., Palo Alto, CA (US)

(72) Inventors: Anthony J. Wilkinson, Princess Risborough (GB); Mark Benson, Berkshire (GB); Robin Crewe, Richmond (GB)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,793

(22) Filed: Apr. 8, 2015

(65) Prior Publication Data

US 2015/0212708 A1     Jul. 30, 2015

Related U.S. Application Data

(63) Continuation of application No. 14/595,194, filed on Jan. 12, 2015, which is a continuation of application No. 13/193,471, filed on Jul. 28, 2011, now Pat. No. 8,935,429, which is a continuation of application No. 11/643,020, filed on Dec. 19, 2006, now Pat. No. 8,010,701.

(51) Int. Cl.
*G06F 3/033* (2013.01)
*G06F 3/0484* (2013.01)
(Continued)

(52) U.S. Cl.
CPC ........ *G06F 3/04842* (2013.01); *G06F 3/04817* (2013.01); *G06F 8/61* (2013.01);
(Continued)

(58) Field of Classification Search
CPC ....... G06F 2209/549; G06F 8/61; G06F 8/65; G06F 9/468; H04L 67/10
USPC .......................... 715/835; 709/217–219, 245
See application file for complete search history.

(56) References Cited

U.S. PATENT DOCUMENTS 5,115,501 A * 5/1992 Kerr ...................... G06F 9/4446
6,073,214 A * 6/2000 Fawcett .................... G06F 8/65
711/133

(Continued)

FOREIGN PATENT DOCUMENTS

WO     2007075846 A2     7/2007

OTHER PUBLICATIONS

Latifa Boursas et al., Efficient Technical and Organizational Measures for Privacy-Aware Campus Identity Management and Service Integration, Google 2006, pp. 1-7.

(Continued)

*Primary Examiner* — Mohamed Wasel

(57) ABSTRACT

An Application Workspace System (AWS) enables users to access remote server-based applications (e.g., thin client applications, terminal server applications, applications on hosted operating systems, etc.) using the same interface that they use to access local applications, without needing to know where the application is being accessed. The AWS automatically determines which applications the user is entitled to use, and then figures out automatically, based upon a variety of parameters, which applications are to be made available to the user (resolved to version, particular package etc.), and whether they are to be installed locally, or accessed remotely. This abstract is provided to comply with rules requiring an abstract, and it is submitted with the intention that it will not be used to interpret or limit the scope or meaning of the claims.

24 Claims, 63 Drawing Sheets

(51) Int. Cl.
*G06F 9/46* (2006.01)
*G06F 9/445* (2006.01)
*H04L 29/08* (2006.01)
*G06F 3/0481* (2013.01)
*G06F 9/54* (2006.01)

(52) U.S. Cl.
CPC .................. *G06F 8/65* (2013.01); *G06F 9/468* (2013.01); *G06F 9/542* (2013.01); *H04L 67/10* (2013.01); *G06F 2209/549* (2013.01)

(56) References Cited

U.S. PATENT DOCUMENTS

| | | | |
|---|---|---|---|
| 6,167,567 A * | 12/2000 | Chiles | G06F 9/4448 709/221 |
| 6,301,589 B1 | 10/2001 | Hirashima et al. | |
| 6,332,217 B1 * | 12/2001 | Hastings | G06F 8/60 707/999.001 |
| 6,571,245 B2 * | 5/2003 | Huang | G06F 17/30867 |
| 6,625,623 B1 | 9/2003 | Midgley et al. | |
| 6,684,331 B1 | 1/2004 | Srivastava | |
| 6,789,215 B1 * | 9/2004 | Rupp | G06F 8/61 714/38.14 |
| 6,816,864 B2 | 11/2004 | Deuser et al. | |
| 6,816,882 B1 | 11/2004 | Conner et al. | |
| 6,922,724 B1 | 7/2005 | Freeman et al. | |
| 6,925,598 B2 * | 8/2005 | Melhem | G06F 8/38 715/210 |
| 7,171,459 B2 * | 1/2007 | Sanghvi | G06F 9/542 709/220 |
| 7,181,436 B1 | 2/2007 | Conley et al. | |
| 7,222,179 B2 | 5/2007 | Srivastava et al. | |
| 7,310,650 B1 | 12/2007 | Felsted et al. | |
| 7,437,614 B2 * | 10/2008 | Haswell | G06F 11/3684 714/38.13 |
| 7,464,214 B2 | 12/2008 | Davies et al. | |
| 7,486,695 B1 | 2/2009 | AbdelAziz et al. | |
| 7,526,562 B1 | 4/2009 | Samprathi et al. | |
| 7,571,180 B2 | 8/2009 | Minyailov | |
| 7,660,983 B1 | 2/2010 | Srivastava | |
| 7,743,388 B2 | 6/2010 | Nikols et al. | |
| 7,779,091 B2 | 8/2010 | Wilkinson et al. | |
| 7,831,034 B2 | 11/2010 | Maximo et al. | |
| 8,028,026 B2 | 9/2011 | Jain et al. | |
| 2002/0040400 A1 | 4/2002 | Masters | |
| 2002/0083087 A1 | 6/2002 | Deuser et al. | |
| 2002/0091697 A1 * | 7/2002 | Huang | G06F 17/30867 |
| 2002/0138618 A1 | 9/2002 | Szabo | |
| 2002/0143865 A1 | 10/2002 | Tung Loo et al. | |
| 2003/0014557 A1 | 1/2003 | Berger et al. | |
| 2003/0088587 A1 | 5/2003 | Merrells et al. | |
| 2003/0091028 A1 | 5/2003 | Chang et al. | |
| 2003/0140068 A1 | 7/2003 | Yeung | |
| 2003/0144894 A1 | 7/2003 | Robertson et al. | |
| 2003/0172127 A1 | 9/2003 | Northrup et al. | |
| 2003/0191868 A1 | 10/2003 | Espino | |
| 2003/0195950 A1 * | 10/2003 | Huang | G06F 17/30867 709/219 |
| 2004/0107125 A1 | 6/2004 | Guheen et al. | |
| 2004/0117439 A1 | 6/2004 | Levett et al. | |
| 2004/0117667 A1 | 6/2004 | Lavender et al. | |
| 2004/0172558 A1 | 9/2004 | Callahan et al. | |
| 2004/0250248 A1 | 12/2004 | Halpern et al. | |
| 2004/0255289 A1 * | 12/2004 | Alex George | G06F 9/4445 717/174 |
| 2005/0015507 A1 | 1/2005 | Chin | |
| 2005/0044110 A1 | 2/2005 | Herzenberg et al. | |
| 2005/0044197 A1 | 2/2005 | Lai | |
| 2005/0044356 A1 | 2/2005 | Srivastava et al. | |
| 2005/0091269 A1 * | 4/2005 | Gerber | G06F 9/44505 |
| 2005/0091537 A1 | 4/2005 | Nisbet et al. | |
| 2005/0114401 A1 | 5/2005 | Conkel | |
| 2005/0160172 A1 | 7/2005 | Eytchison | |
| 2005/0267978 A1 | 12/2005 | Satapati | |
| 2005/0283462 A1 | 12/2005 | Pennec et al. | |
| 2006/0004802 A1 | 1/2006 | Phillips et al. | |
| 2006/0031185 A1 | 2/2006 | Jose et al. | |
| 2006/0149760 A1 | 7/2006 | Keni et al. | |
| 2006/0150026 A1 | 7/2006 | Kolawa et al. | |
| 2006/0155773 A1 | 7/2006 | Drouet et al. | |
| 2006/0155867 A1 | 7/2006 | Kilian et al. | |
| 2006/0200473 A1 * | 9/2006 | Whitehead, Jr. | G06F 17/30067 |
| 2007/0115282 A1 | 5/2007 | Turner et al. | |
| 2007/0124373 A1 | 5/2007 | Chatterjee et al. | |
| 2007/0226753 A1 | 9/2007 | Nikols et al. | |
| 2007/0239859 A1 | 10/2007 | Wilkinson et al. | |
| 2007/0256073 A1 * | 11/2007 | Troung | G06F 21/53 718/1 |
| 2007/0282953 A1 | 12/2007 | Jain et al. | |
| 2007/0283154 A1 | 12/2007 | Zhang et al. | |
| 2008/0034071 A1 | 2/2008 | Wilkinson et al. | |
| 2008/0046576 A1 | 2/2008 | Wahl | |
| 2008/0077752 A1 | 3/2008 | Kinoshita | |
| 2008/0091812 A1 | 4/2008 | Lev-Ran et al. | |
| 2008/0104215 A1 | 5/2008 | Excoffier et al. | |
| 2008/0133777 A1 | 6/2008 | Wilkinson | |
| 2008/0147745 A1 | 6/2008 | Wilkinson et al. | |
| 2008/0147787 A1 | 6/2008 | Wilkinson et al. | |
| 2008/0168118 A1 * | 7/2008 | Hickey | G06F 13/385 709/201 |
| 2008/0184336 A1 * | 7/2008 | Sarukkai | G06F 21/6218 726/1 |
| 2008/0256090 A1 | 10/2008 | Dietterich et al. | |
| 2008/0263640 A1 | 10/2008 | Brown | |
| 2008/0288631 A1 * | 11/2008 | Faisal | G06F 8/67 709/224 |
| 2008/0301258 A1 | 12/2008 | Arndt et al. | |
| 2009/0150398 A1 | 6/2009 | Raut | |
| 2009/0216815 A1 | 8/2009 | Braginsky et al. | |
| 2010/0082979 A1 | 4/2010 | Edwards | |
| 2010/0269160 A1 | 10/2010 | Kalonji et al. | |
| 2011/0061002 A1 | 3/2011 | Bethune et al. | |
| 2014/0040343 A1 | 2/2014 | Nickolov et al. | |

OTHER PUBLICATIONS

D.M. Eyers et al., OASIS Role-Based Access Control for Electronic Health Records, IEE Proc.—Softw., vol. 153, No. 1, Feb. 2006, 8 pages.
Katrin Franke et al., WANDA: A Generic Framework Applied in Forensic Handwriting Analysis and Writer Identification, Google 2003, pp. 1-12.
Alexander C. Klaiber et al., A Comparison of Message Passing and Shared Memory Architectures for Data Parallel Programs, ACM SIGARCH Computer Architecture News, vol. 22, No. 2, pp. 94-105, IEEE Computer Society Press, 1994.
E. Axel Larsson, A Case Study: Implementing Novell Identity Management at Drew University, ACM 2005, pp. 165-170.
Volker Turau, A Caching System for Web Content Generated from XML Sources Using XSLT, Google 2002, pp. 197-207.
B. Tyler Wilson et al., Forest Inventory and Analysis Information Delivery Architecture, The Computer Society, Proceedings of the 19th International Workshop on Database and Exper Systems Applications (DEXA '05), 2005, IEEE, pp. 706-710.
"JavaTM Message Service API Tutorial," Sun Microsystems, Inc., 59 pages, 2002.
Mahmoud, "Getting Started with Java Message Service (JMS)," URL=http://java.sun.com/developer/technicalArticles/Ecommerce/jms/, 9 pages, Nov. 2004.
Mykkanen, "Component and Service Technology Families," University of Kuopio Savonia Polytechnic, 150 pages, Aug. 30, 2004.
"Propero workSpace Product Overview," Propero Ltd., 17 pages, 2005.
"Propero workSpace Technical Overview," Propero Ltd., 17 pages, 2005.
"Java Message Service (JMS)," URL=http://peterindia.net/JMSOverview.html, 11 pages, download date Jan. 18, 2008.
International Search Report, International Publication No. WO 2007/075846, Apr. 11, 2008, 3 pages.

* cited by examiner

Example Package Instance forms:
- Special workSpace Windows MSIs
- Standard Windows MSIs
- Vendor-specific Windows SETUP.EXEs
- Macintosh PKGs
- Etc.

Fig. 19

PROVIDING APPLICATION AND DEVICE MANAGEMENT USING ENTITLEMENTS

CLAIM OF PRIORITY

This application is a continuation of prior U.S. patent application Ser. No. 14/595,194, filed Jan. 12, 2015, entitled "Providing Application and Device Management Using Entitlements," which is a continuation of prior U.S. patent application Ser. No. 13/193,471, filed on Jul. 28, 2011, now U.S. Pat. No. 8,935,429, entitled "Providing Remote Application Access Using Entitlements", which is a continuation of prior U.S. patent application Ser. No. 11/643,020, filed on Dec. 19, 2006, now U.S. Pat. No. 8,010,701, entitled "Method And System for Providing Virtualized Application Workspaces," each of which is incorporated herein by reference in its entirety.

TECHNICAL FIELD

The present invention relates to methods and systems for providing an applications workspace and, in particular, to methods and systems for automatically providing seamless access to different types of applications and configuring them on a per-user basis, appropriate for the point of access.

BACKGROUND

Multiple waves of technology have left most organizations with IT infrastructure that is complex, inflexible, and expensive to run. People, devices and applications are tightly coupled making it difficult to rollout new applications or support new work patterns. IT organizations within corporations have to manage a hundreds if not thousands of applications, based on divergent technologies, and run thousands of PCs and servers, each with its own operating requirements and idiosyncrasies.

Maintaining software on a distributed PC or other access device is expensive and time-consuming. As the number of applications and services provided through the PC, the complexity of the PC configuration increases.

Historically this problem has been addressed by 'locking down' the PC to limit the changes that can be made to it. Products have also been introduced to 'push' software to physical devices but these approaches depend on there being a small, well-defined number of access devices as well as a relatively infrequent update cycle. Until a few years ago this was difficult but achievable in a well managed environment. However, an explosion in the number and type of access devices (which now encompass PCs, laptops, PDAs and mobile phones) combined with a need for frequent, real-time updates (to protect against viruses, worms and security loopholes) has rendered such an approach unworkable.

In large organizations, the problem of access device diversity is compounded by the fact that end users use applications that run on many different platforms. Some run on the user's PC, some run centrally as terminal applications, thin clients or web services and some run on virtual machine technology. Previously, the infrastructure for supporting and managing these applications was entirely separate.

BRIEF DESCRIPTION OF THE DRAWINGS

FIG. 19 is an example screen display of a script used to configure applications.

DETAILED DESCRIPTION

Figure 1:
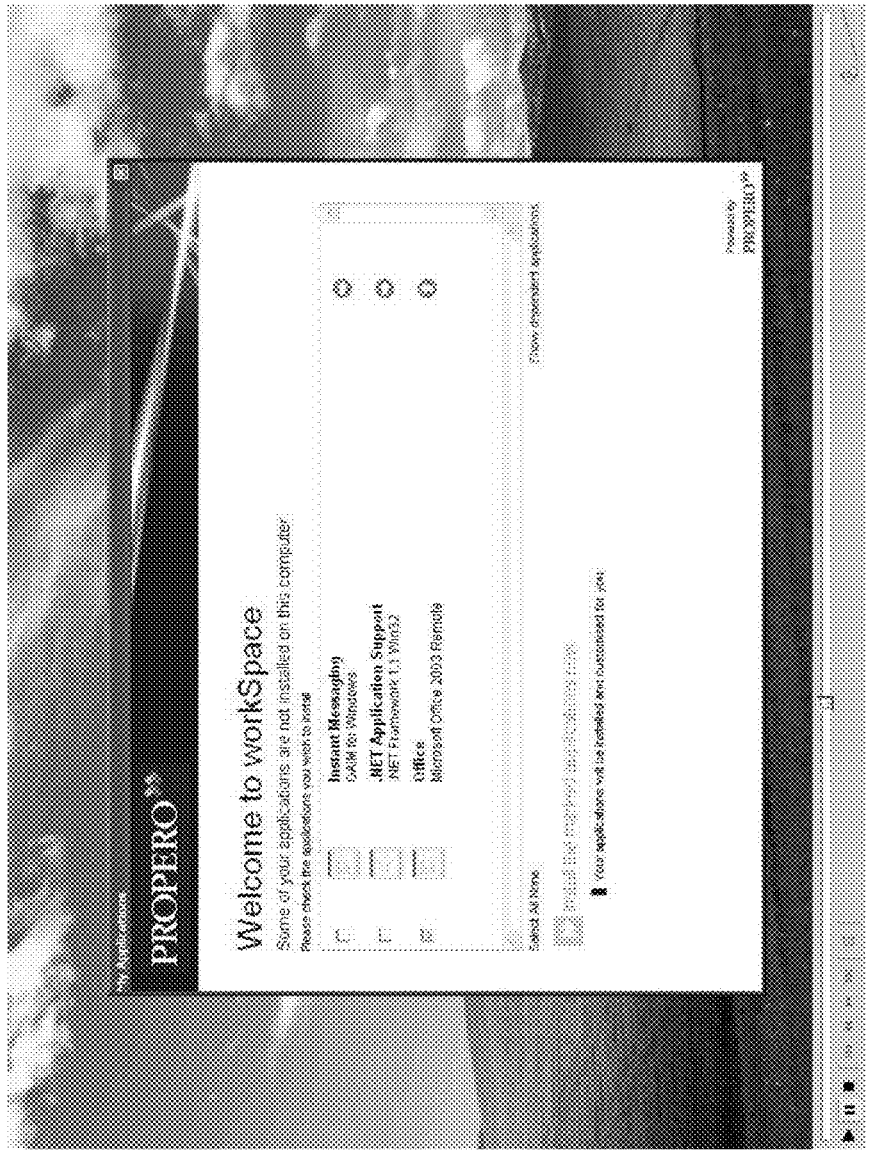
FIG. 1 is an example screen display of a virtual workspace presented on a computing device that has an integrated Application Workspace System client.

Embodiments of the present description provide enhanced computer- and network-based methods and systems for determining applications to which a user is entitled and providing seamless and uniform access to these applications, regardless of their type and where they are accessed from. Example embodiments provide an Application Workspace System ("AWS"), which enables users to access remote server-based applications (e.g., thin client applications, terminal server applications, applications on hosted operating systems, etc.) using the same interface that they use to access local applications, without needing to know where the application is being accessed. The AWS includes a set of client and server components that implement the notion of a user's virtual workspace, which is presented to the user either seamlessly integrated into the native user interface (such as Windows Explorer) or via a web portal which presents a virtual desktop.

The AWS automatically determines which applications the user is entitled to use, and then figures out automatically, based upon a variety of parameters, which applications are to be made available to the user (resolved to version, particular package etc.), and whether they are to be installed locally, or accessed remotely. Entitled as used herein refers to more than just a concept of access permissions—it involves evaluating a series of rules that specify how applications have been administered for what users and to run in what environments. The parameters that influence this decision define, for example, the user, the access point (the device from which the workspace is accessed), the delivery method (remote, local, etc.) the user's entitlements, application administration parameters, etc. Applications can be associated with users in a "generic" fashion so that they can be "dynamically bound" to a user's access at various times. Thus, the AWS can separate out the administration of applications to users generically (for example, assigning a word processing application to a user) from the administration of actual application implementations that correspond to different versions, packages delivery methods, etc. In this manner, seamless integration of both local and remote applications is made possible.

In the case of applications that are installed locally, the AWS provides for the customization of the configuration and behavior of such applications via scripts that hook system events such as login, power-down, etc. or disconnect or reconnect on terminal servers. In the case of remote applications that are made available, for example, through a terminal server, extensive application behavior modification is supported using a rules-based engine.

The AWS also provides a generalized message bus that can be used for load balancing and resource discovery.

In addition, the AWS provides a generalized LDAP replication mechanism using XSLT stylesheets that can replicate data between heterogeneous schemas. The use of XSLT for replication is extendible to other directory server mechanisms or other information consuming processes that entail heterogeneous data organizations.

The following description details an example embodiment of an Application Workspace System, called "Workspace" or Propero Workspace. Other implementations of the various principles, methods, techniques, components, protocols, etc can be incorporated to provide other embodiments of an AWS. Thus, the present description means to include all such possible embodiments of an AWS.

The Application Workspace System implements an abstraction referred to as a "virtual workspace" that integrates seamlessly into whatever device environment a user uses to access applications. On a personal computer running Windows, for example, once configured, applications appear as icons, which can be "opened" to start an application running (i.e., to launch an application). The AWS automatically configures the user's environment so that the user need not know the particular application that is being run—from a version/package perspective or from a location perspective—an application may be run locally or remotely.

FIG. 1 is an example screen display of a configuration portion of a virtual workspace presented on a computing device that has an integrated Application Workspace System client. The user interface displayed is one that is presented by the AWS in response to the user logging into the native environment of the computing device (e.g., Windows). In FIG. 1, one of the applications is shown as already having been configured for the user (Microsoft Office 2003 Remote) and two other applications are available for installation and customization. When the user finishes configuring the workspace, the native user interface (for example, the Windows desktop) is displayed with the applications that have been configured automatically part of the desktop. The user launches applications the same way, without needing to know whether they are local or remote.

Figure 2:
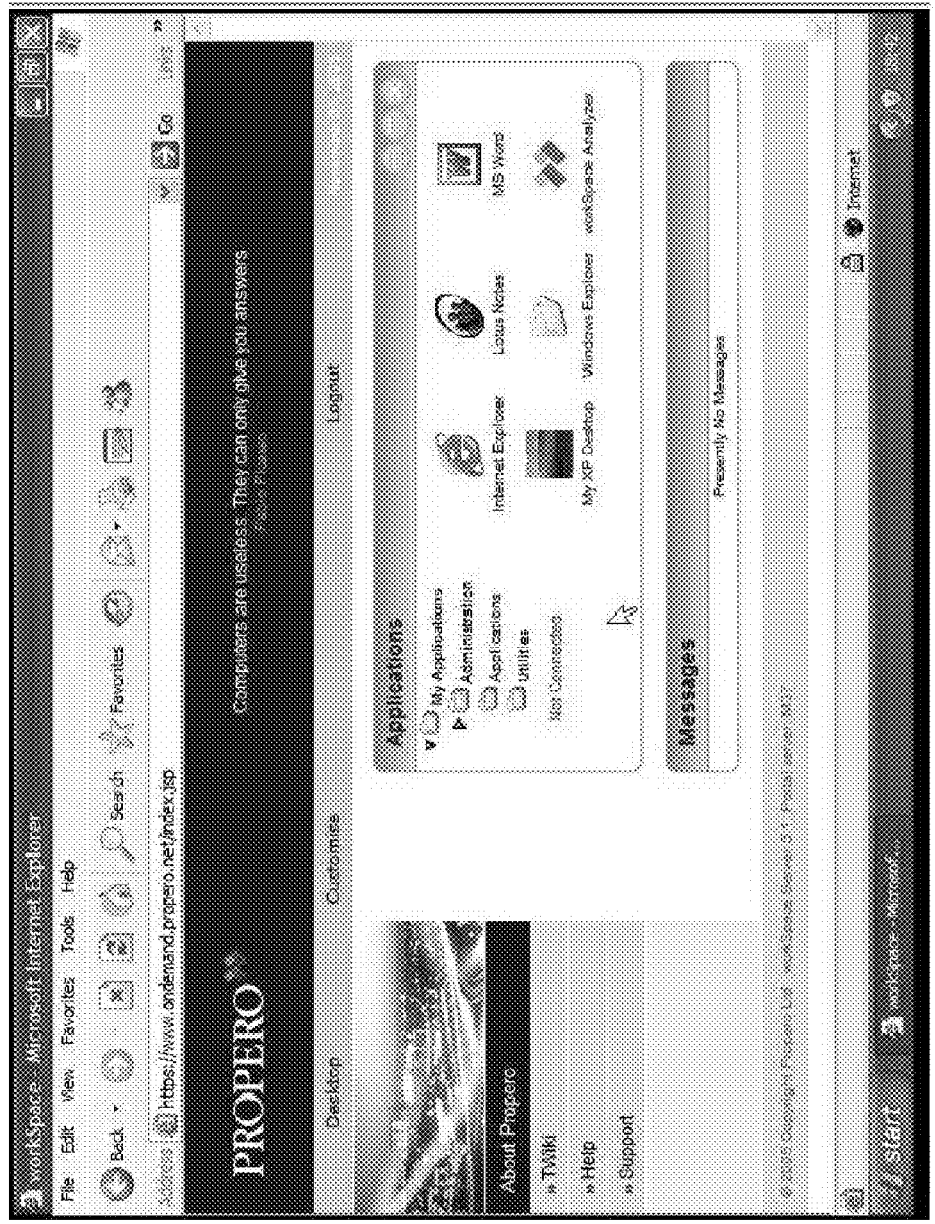
FIG. 2 is an example screen display of a virtual workspace presented through a web browser interface to an Application Workspace System.

FIG. 2 is an example screen display of a virtual workspace presented through a web browser interface to an Application Workspace System. In FIG. 2, a variety of remote applications are offered to the user as icons which can be selected to invoke the corresponding applications. When run, icons representing these applications appear in a task bar, just as if they were part of the native interface of the underlying computing device.

The AWS abstracts the notion of an application so that the task of associating applications with users is separated from the administrative task of mapping particular implementations of the applications to different access devices (from where the application is accessed and how the application is accessed—e.g., a portable or desktop). For example, the directory services (e.g., LDAP) setup of application implementation mappings is an administrative task that need not involve lay users.

To accomplish this abstraction, applications are modeled as belonging to an "application family" that represents the application in an abstract sense (e.g., "Office"). Thus, for example, all kinds of different versions of Microsoft Office may be abstracted as a single family "Office." Specific applications that can be thought of as instances of those application families (called application objects) delivered via specific means (e.g., "Microsoft Office 2003—Local", "OpenOffice for Mac—Local", "Microsoft Office 200—Remote"). This information is stored in an AWS configuration repository, which is typically an LDAP directory, although equivalent storage repositories, protocols, and directory servers may be used.

Stored within the application family object in the configuration repository are a set of rules (sometimes referred to as "policy") that describes how an application family is to be resolved to a specific application instance at the point of use. Point of use (also referred to as point of access herein) refers to a description of the environment where from the user is attempting to access a particular application. For example, a mobile device being used while traveling abroad typically will be characterized as a different point of use than the user's home personal computer. As a result, the AWS may desire to give the user access to a different application instance than the user normally uses while at home.

Entitlements comprise the definitions (including all the attributes of) the set of application family objects, application objects (including all relevant sub-objects such as document types and launch items), associated package container objects and package objects, along with tuples from all the users user groups, that a given user may have available to him or her at any time. A set of entitlements for a user can be derived from the AWS configuration repository. A process referred to as entitlements resolution further refines a set of entitlements to the set of application objects (and hence the relevant associated objects from the set listed above) that a user actually has available to him or her at a particular point in time.

Assignment of applications (in the general sense) to users is accomplished by creating links in the AWS data model between users and application families—thus allowing for non-IT literate administrators to manage which applications their users need to be able to use without having to be cognizant of the various versions and delivery mechanisms that may by appropriate at specific locations or from specific access devices (such as via a PC or a PDA).

The abstraction of applications breaks the administration of applications into two areas: user administration, which describes which users are associated with which applications families; and application administration which is typically an IT (information technology) function that provides the rules indicating under which circumstances an application family resolves to a specific application. Note that user administration may administer to any defined group instead of to an individual user using any type of grouping mechanism. Groups may also substitute for other entities in the AWS data model.

Note that, for the purposes of this description, the term "application" is used to mean a set of modules, code, script, text or other represented code and/or programs that execute on either hardware machines or higher level virtual machines or are executed by other programs that overall allows a user to achieve some task using the computer (i.e., "apply the computer" to a task). Also, a "package" is a specific set of modules, code, script, text or other represented code and/or programs that execute on either hardware machines or higher level virtual machines or are executed by other programs that are delivered together in some manner. Thus, an application comprises one or more packages. Within an AWS configuration repository, "application objects" are used to represent applications, and "package objects" are used to represent packages.

Note as well that the term "local" or "remote" with reference to applications indicates where, relative to the user, processing occurs in order for the user to achieve the task using the application. Note that this is distinct from where the user interacts with the application through an input device (e.g., screen, keyboard, mouse etc.) as the use of the input device typically will be on the computer the user is physically interacting with.

When a user attempts to login to the user's environment, and at other times, the AWS attempts to automatically determine the virtual workspace for that user from the point of access. In the case of a computing device such as a desktop computer, this determination process results in presenting the user with a set of icons on the desktop that map to particular applications. As an effect of this process, local applications are properly configured, installed, removed, customized and possibly updated, and remote application access is integrated into the virtual workspace. That way, when a user "clicks" on an icon to invoke the underlying application, the "right" thing just happens, be it local or remote. Which applications are installed or configured is determined based upon a process referred to as "entitlements resolution."

Entitlements resolution is the decision process that resolves an application family object to an application object so that the corresponding application instance can be made available to a user. This is performed at the point of use, and has various pieces of information made available to it from the environment and from the AWS data model. Such information includes, for example, location, network address, access device type, pre-defined tuples (for example, name-value pairs) that may be stored on the access device, and tuples that are associated with any application object in the AWS data model.

Entitlements resolution typically takes place at a point of entry to the system—in many implementations, this can be one of two places:

An "intelligent" access device (e.g., a computing system that can perform local processing and has elements of the AWS installed on it); and A remote interface—usually manifesting itself as a web application, and commonly part of a web portal.

The entitlements resolution process can result in the AWS needing to transparently install or configure or remove or otherwise manage locally installed applications. It can also result in automatically presenting to the user applications that the user is able to use remotely (for example, if no local application availability is present or, for example, to possible override a locally installed application in favor of a remote one). In order to achieve access to remote applications, any icon or link representing the application includes an encoding of a primary key of the application object in the configuration repository (usually a Distinguished Name (a "DN") to an LDAP object). This identifying key is used to get information from an AWS configuration repository regarding the details needed to run the application.

Note that many different kinds of remotely accessed applications can be integrated into an AWS. For example, an AWS can integrate and support terminal server applications (which run applications in sessions specific to a client access and which are isolated from other applications), Citrix applications (which provide an extension to the general case of Terminal Server applications), Terminal Emulators for character based protocols, virtual machine environments such as hosted operating environments using, for example, VMWare, on-demand application streaming, and any other form of application delivery. The general distinction that the AWS draws between a "local" and a "remote" application is that a local application is some form of code, script or otherwise that executes locally on the user's computer in a manner native to the local computer's native operating system to perform the functions of the application, whereas a remote application has some form of code, script, module or otherwise executing on a computer other than that which the user is using, and any code in that instance that executes locally on the computer the user is using does so only to provide screen, keyboard and mouse functionality for that remote application.

If the entitlements resolution process results in providing a user with access to remote applications, then the mechanism by which they are actually launched (described in detail below) uses web-based components and systems that are common to both access from a workstation running components of the AWS (e.g., a managed workstation) and from a workstation running a browser with a Java Virtual Machine that is used to navigate to a web-based portal (e.g., an unmanaged workstation). In some embodiments, the behavior of remote applications is automatically modified to behave properly when they are launched at their point of use. Behavior modification of applications is also described further below.

Different implementations of an AWS may present different sets of components and services to effectuate the notion of a virtual workspace. In an example AWS, the Propero Workspace (the "Workspace" or "workSpace"), includes a set of tools, modules, data schemas (data models) etc., which are delivered to customers as a set of integrate-able components and/or services. A typical AWS includes: a manager component; a server component; and an analyzer component.

The manager component comprises a set of modules downloaded to a client machine to allow a user to install and run applications locally (or as a "terminal" to remote applications), which are automatically configured and customized on a per-user basis and for the user's environment. A node manager component of the manager component provides a majority of the AWS support for installation and configuration, event based script customization of applications, and communications with the server component.

The server component comprises the entirety of network (e.g., web)-based components that support access from intelligent workstations and access from browsers (via a portal). These components include the ability to perform entitlements resolution, user administration, application administration, application personalization and behavior modification, etc. and implement the virtual workspace.

The analyzer component comprise an extensive set of tools which are used to assist administrators in determining mappings for applications to application families, exclusions, conflicts, dependencies, which users use which applications, etc. A kernel manager component of the analyzer performs application usage based upon detecting a variety of activities—at levels of actual use—not just invocation—on both intelligent workstations and on terminal servers. The detection occurs by "hooking" various system code to be made aware when certain events are triggered.

Example embodiments described herein provide applications, tools, data structures and other support to implement a Application Workspace System to be used for automatic and transparent configuration and customization of applications and seamless integration of remote and local applications in a virtual workspace. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 3:
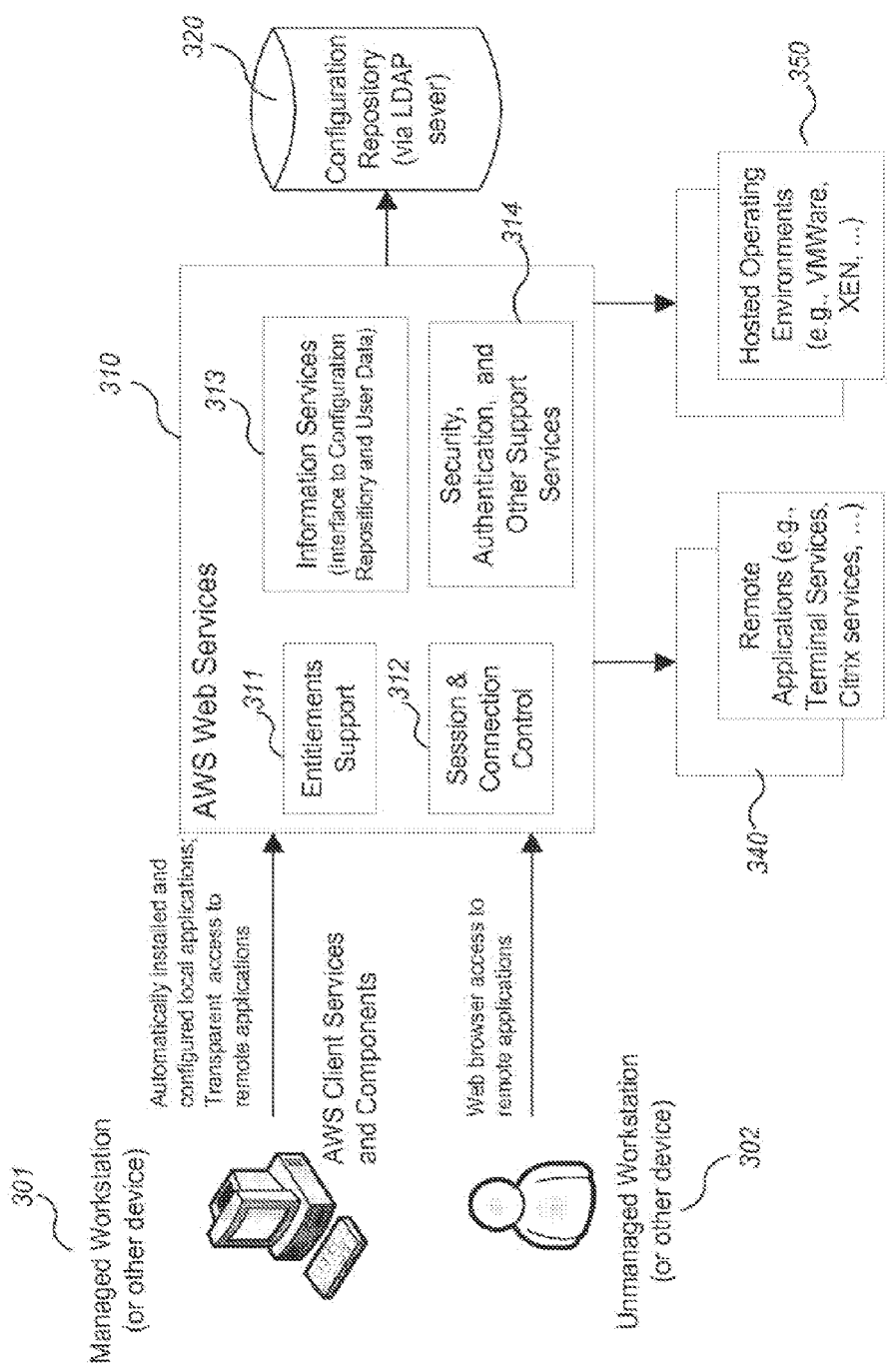
FIG. 3 is an overview block diagram of an Application Workspace System, including example components of example Application Workspace System web services.

FIG. 3 is an overview block diagram of an Application Workspace System, including example components of example Application Workspace System web services. In one embodiment, the AWS comprises one or more functional components/modules that work together to provide personalized and on-demand configuration of and access to local and remote application. These components may be implemented in software or hardware or a combination of both. In FIG. 3, a an Application Workspace System comprises a client side, herein shown as managed workstation 301 and unmanaged workstation 302, and a server side, show as AWS Web Services 310. A managed (or "intelligent") computing device, such as managed workstation 301 is a device (e.g., a Windows workstations) that has installed on it an instance of the AWS Manager (described below with respect to FIG. 4). An unmanaged computing device, such as workstation 302 is a device with no AWS software installed on it, but does have a browser and a Java virtual machine available to navigate to a portal provided by the AWS Web Services 310. The Web Services component 310 provides a variety of AWS components and services such as support for entitlements 311; information services 313 for access to the configuration repository 320, for example; session and connection control 312, for example to remote applications 340 needing terminal emulation or session management or to access hosted operating environments 350; and security, authentication, and other support services 314. In one embodiment the configuration repository 320 for application configuration and association data is implemented by a Lightweight Directory Access Protocol (LDAP) server.

Figure 4:
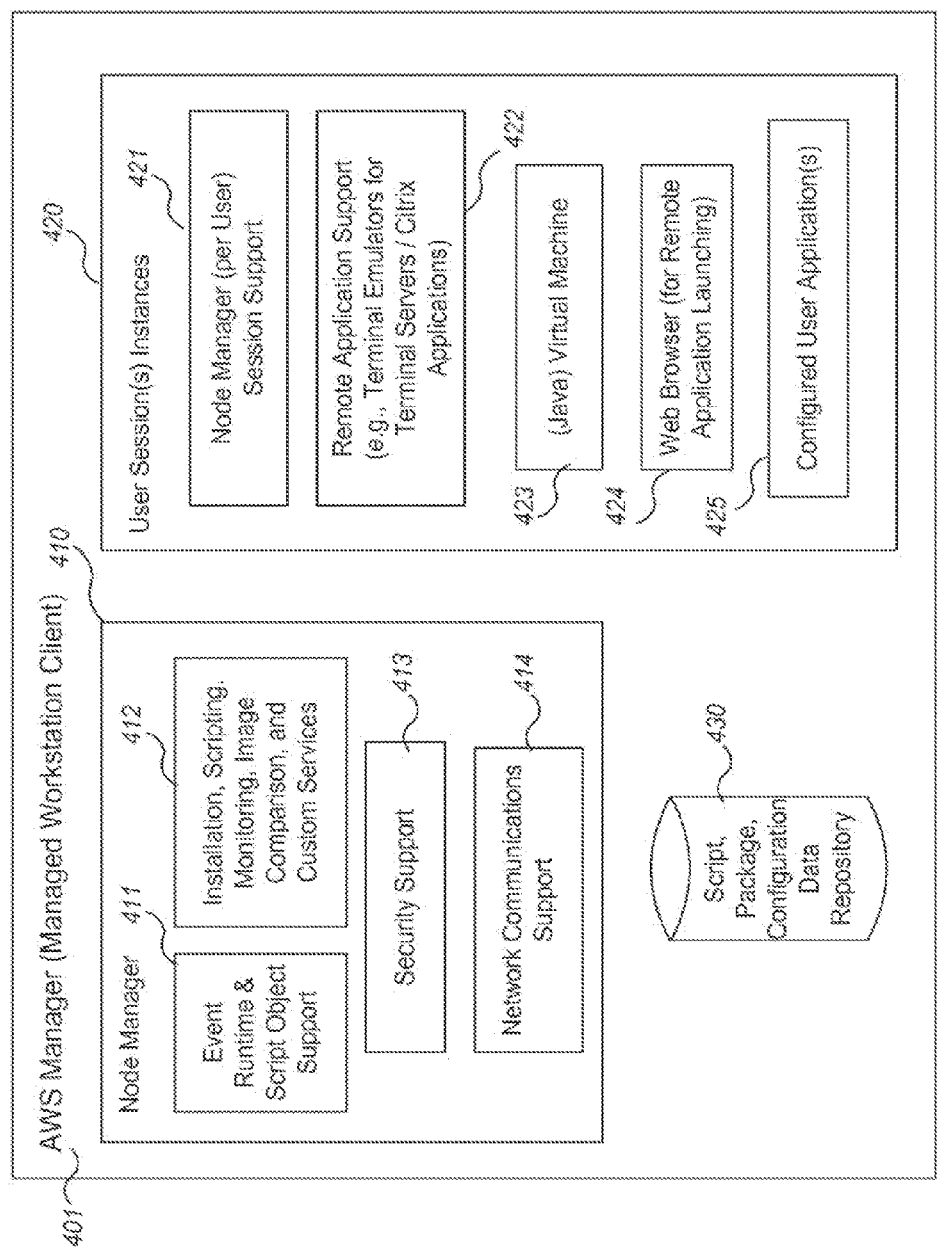
FIG. 4 is an overview block diagram of example components of example Application Workspace System client services.

FIG. 4 is an overview block diagram of example components of example Application Workspace System client services. In one example embodiment, the client portion of the AWS that resides on a managed computing system is known as the AWS Manager. The AWS Manager 401 comprises Node Manager 410 that executes in the SYSTEM security context, and User Session Manager 420 that executes in the security context of the user, and any number of remote application support processes 422 that manage access to remote applications on the managed workstation. AWS Manager 401 also comprises local script, package, and configuration data repository 430 whose data corresponds to the "state" of installed applications on the managed workstation.

Note that the use of the term "workstation" is a matter of ease of description is not meant to convey a specific arrangement of hardware or software. Essentially, any computing device capable of performing the functions indicated can be substituted where this description uses the term "workstation." Thus, workstations may be mobile or wired device, embedded systems, PDAs, cellular devices, etc.

Node Manager 410 comprises a set of services, modules, and code for supporting the functions of an AWS to implement a virtual workspace. The node manager provides all the necessary functions for packaging, installation, scripting, management, diagnostics, tracing and any ancillary functions that AWS uses. In particular, the Node Manger 410 comprises event runtime and script object support 411; installation, scripting, monitoring, image comparison, and custom services 412; security support 413, and support for network communications 414, for example with the AWS web services.

Note that in some embodiments, some of the code of the Node Manager 410, because it performs "smart" configuration, can also be used by terminal servers to configure remote applications made available through terminal servers, because many of the same functions are needed to configure remote applications. For example, the Node Manager code may also be used for Windows Terminal Servers and Citrix Servers as a system service. This shared code is mainly a figment of efficient implementation, though, and is not a requirement of an AWS.

The user session(s) instances 420 comprise all of the local support needed to interface to local and remote applications using AWS. It typically includes instances of the Node Manager session support 421 that are specific to the user and the particular session; terminal emulation support 422 for interfacing to remote applications; a JAVA virtual machine 423 (although other languages and virtual machines could be similarly incorporated); a web browser 424; and the configured user applications 425. Other components can of course be present as well.

Figure 5:
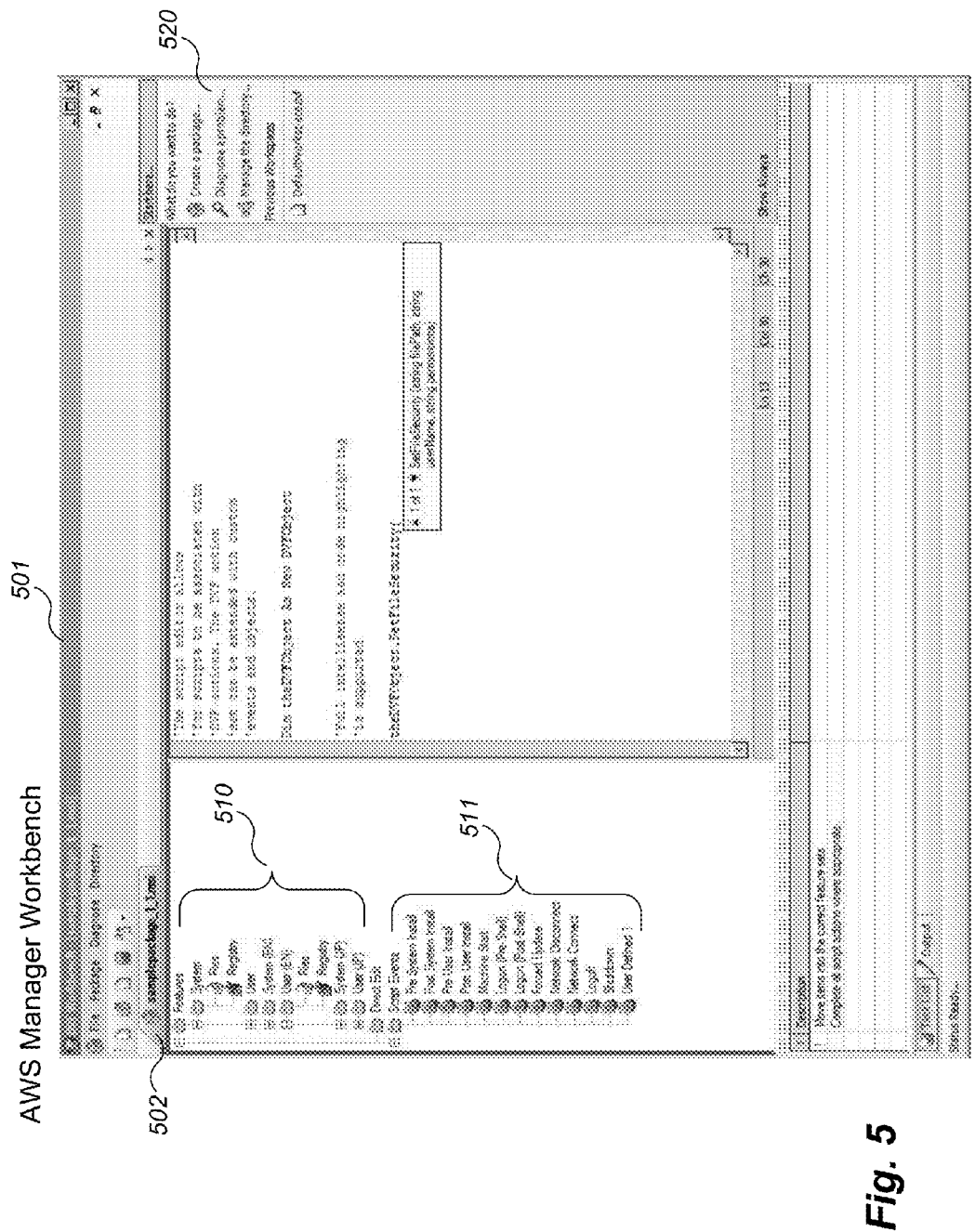
FIG. 5 is an example screen display of a component of an Application Workspace System client for monitoring and configuring aspects of Application Workspace System client systems.

FIG. 5 is an example screen display of a component of an Application Workspace System client for monitoring and configuring aspects of Application Workspace System client systems. In some embodiments, this component is known as the Workbench or the AWS Manager Workbench. Workbench 501 provides a user interface to the packaging, diagnostic and other functions of the AWS Manager. The Workbench 501 can be run on a remote system and can be used to analyze, debug, and otherwise monitor a managed workstation remotely. In FIG. 5, Workbench 501 is shown displaying a package 502 that exists on a monitored managed workstation. The package contains several "features" 510 (as defined by the MSI package interface) and a set of events 511 to which scripts have been associated for this package. Event based scripts and their use to configure applications are described further below. The Workbench 501 offers additional functions as shown in action hint list 520.

As mentioned, the components of the AWS are used to implement a virtual workspace, which transparently "delivers" access to the right application for the right user for the right point of access at the right time by abstracting out the notion of an application. To support this abstraction, the application information, mappings to other objects, application packages (which define how an application is configured/installed) etc. are set up in the configuration repository typically by an administrator. Application packages are discussed further below with respect to installation of local applications. Application packages can contain scripts that are automatically triggered upon the detection of certain system events (such as logon). Users can also be assigned to application families through the entitlements set up procedures. Once entitlements are set up, users use the workSpace to launch applications—in a manner with which they are familiar—and the "right" thing automatically happens. The node manager on a managed workstation or a browser invokes workSpace (server) components to automatically configure the virtual workspace, process launch requests, configure applications, etc. In addition, a kernel manager component runs in certain scenarios, such as on terminal servers, to ensure that applications behave properly when they are run remotely. In overview, the kernel manager configures remote applications (such as terminal server applications) to trap certain events, such as file access requests, to ensure that applications behave properly as they may have been written to operate as single user applications and not share resources appropriately.

Figure 6:
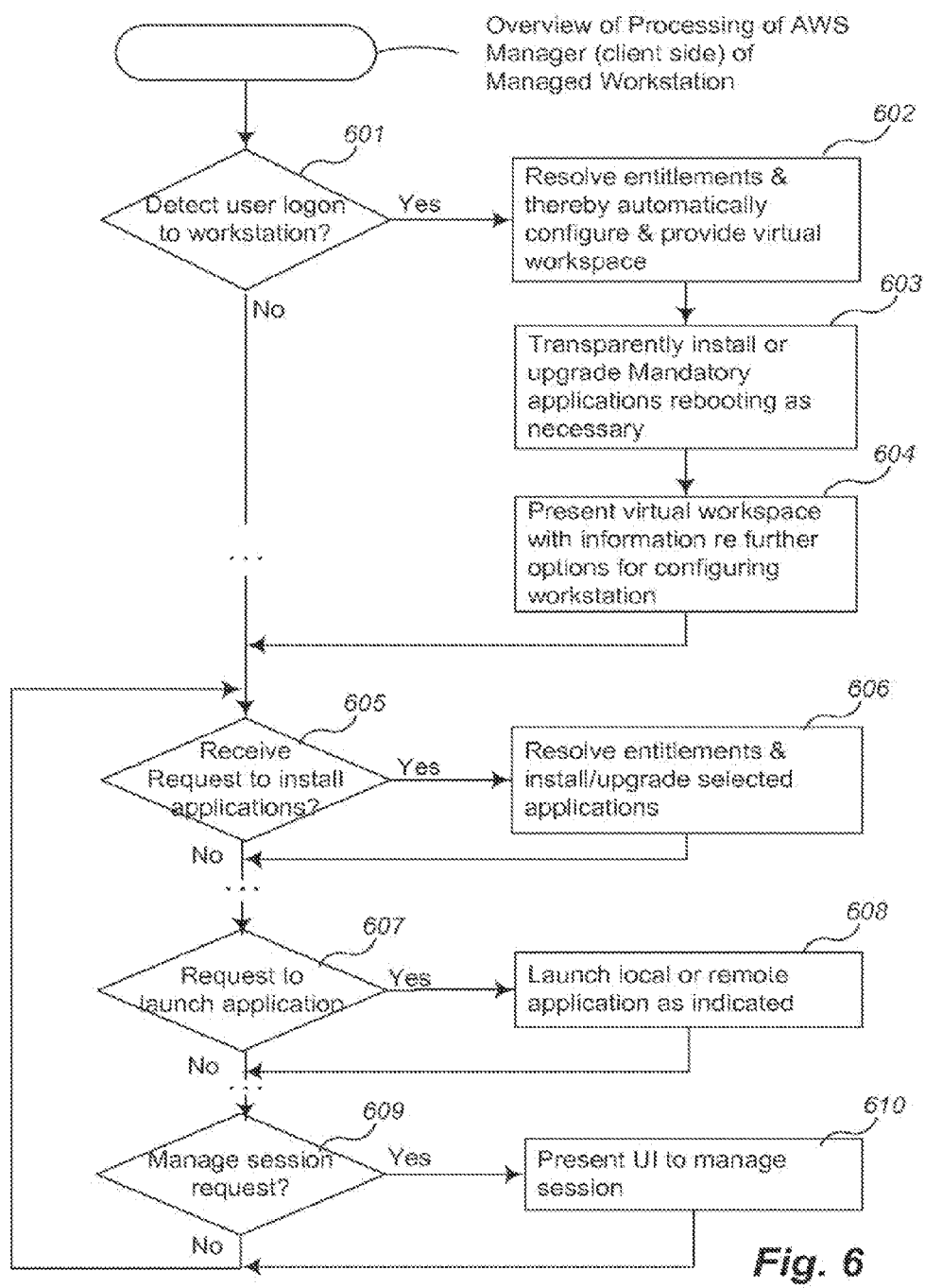
FIG. 6 is an example overview flow diagram of processing performed by an example Application Workspace System on a managed computing system.

FIG. 6 is an example overview flow diagram of processing performed by an example Application Workspace System on a managed computing system. The steps are typically performed by an AWS Manager component, such as Node Manager 410 of AWS Manager 401 in FIG. 4. Generally, the AWS client side code provides a variety of services on a managed workstation to automatically configure and personal the set of applications intended for a user at the user's point of access when at the time of access. The code automatically configures the virtual workspace when it detects that the user has logged on, automatically installs/upgrades applications that are selected by the user for installation into the virtual workspace, takes care of launching applications, and responds to requests from a user to manage the user's remote sessions.

More specifically, steps 601-610 present an event handling loop. in step 601, when the code detects a logon event, the node manager resolves the entitlements relevant to that user and access point (step 602), transparently installs or upgrades as necessary mandatory applications (step 603), including rebooting the system if the application install/upgrade requires such, and then presents a portion of the virtual workspace with information to allow the user to further configure applications (step 604). FIG. 1 is an example screen display that results from the processing shown in steps 601-604. In step 605, when the code detects a request from the user to install/upgrade one or more applications, then in step 606, the Node Manager resolves entitlements and proceeds to install or update the indicated applications. In step 607, when the code detects a request from the user to "launch" (run or execute) an application, the Node Manager proceeds in step 608 to launch a local or remote application as indicated. In step 609, when the code detects a request to manage a (for example, terminal) session, the Node Manager presents a user interface in step 610 that allows the user to manage the session.

Figure 7:
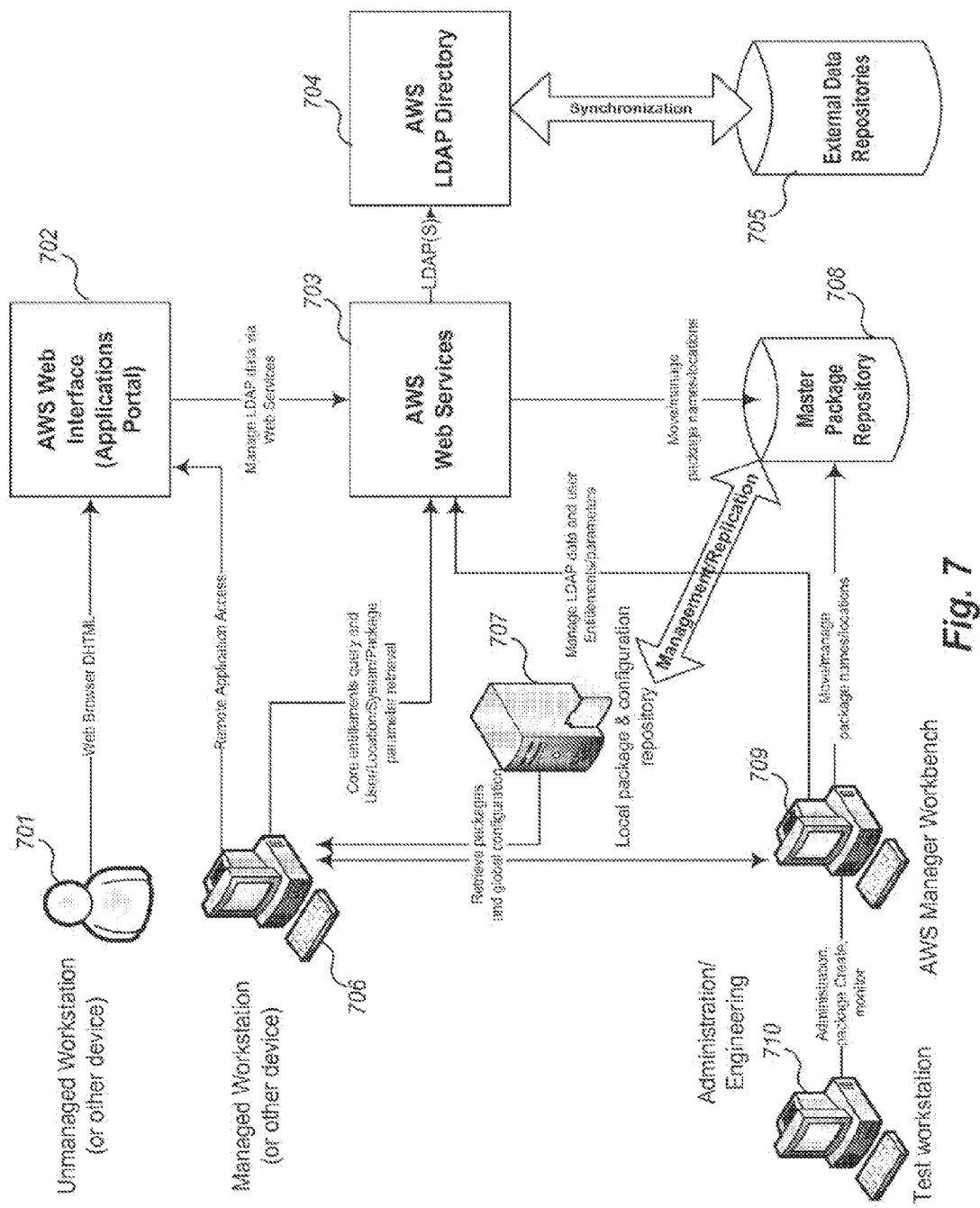
FIG. 7 is an overview block diagram illustrating how the components of an example embodiment of an Application Workspace System cooperate to transparently provide correct applications to users and to implement a virtual workspace.

FIG. 7 is an overview block diagram illustrating how the components of an example embodiment of an Application Workspace System cooperate to transparently provide correct applications to users and to implement a virtual workspace. In FIG. 7, a user uses a device 701 to access the AWS Web Interface 702 (the applications portal) typically through DHTML (Dynamic HTML). In response, the AWS Web Services components 703 perform entitlements resolution (to decide what application to run), consulting the AWS LDAP directory service 704 as needed. The AWS LDAP server 704 interfaces to and synchronizes configuration data stored in entitlements data repository 705. A user can use a managed device such as workstation 706 to run either local applications or remote applications. Software (for example, a Node Manager) running on the managed workstation 706 performs entitlements resolution via AWS Web Services components 703 and, when indicated by the resolution process, installs local application packages configured from the local package and configuration repository 707. Both the package and configuration repository 707 and the AWS Web Services component 703 access and manage application package data stored in a master package repository 708. The AWS Manager Workbench 709 is used by and administrator to manage packages, monitor the configuration process, administer entitlements, etc. Where beneficial, one or more test workstations 710 may also be incorporated to test configurations of packages, etc.

Details of how an administrative sets up application packages for installation are described further below with respect to FIGS. 14, 15, and 16. Details of the entitlements resolution process are described further below with respect to FIGS. 24-30.

Figure 8A:
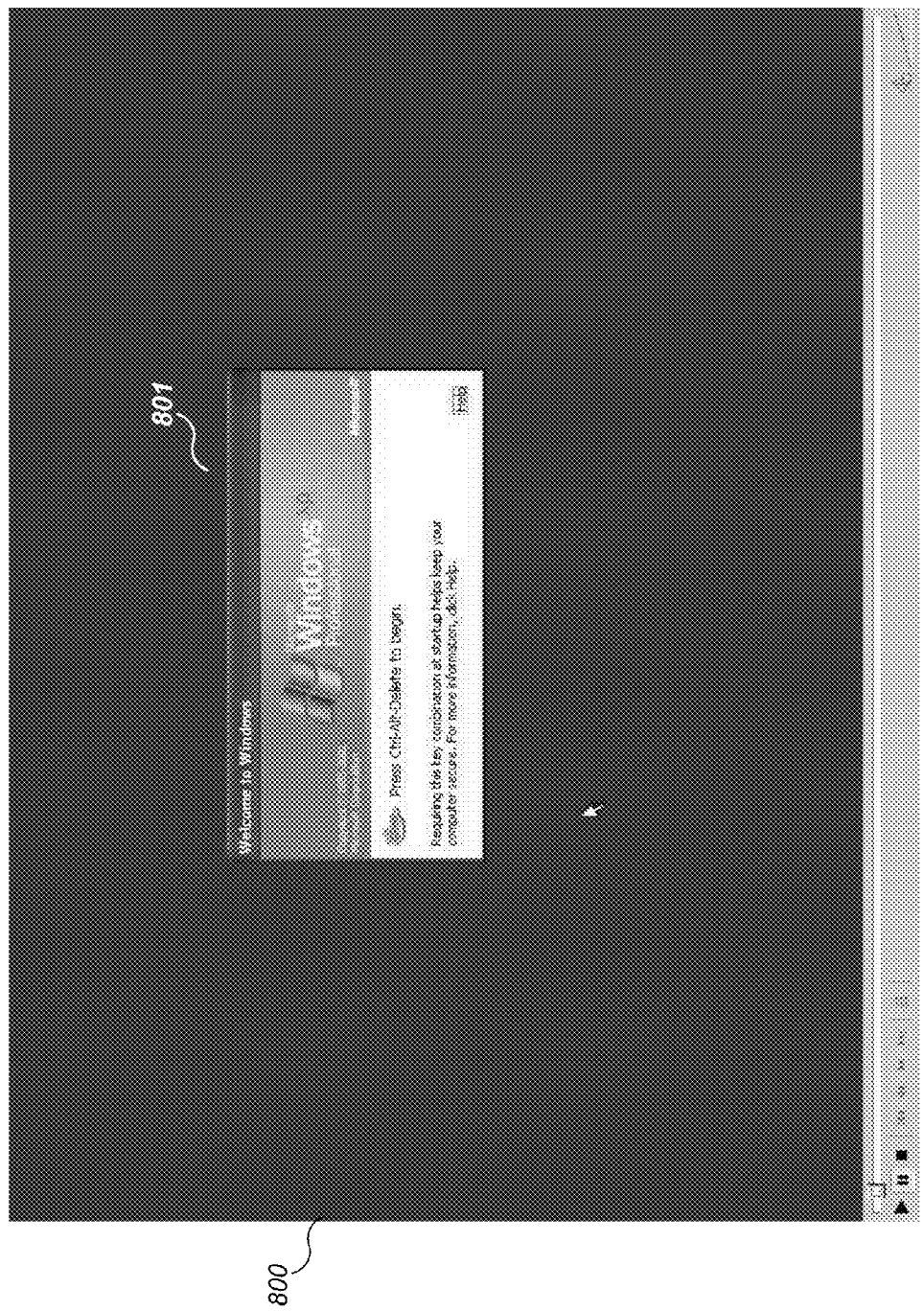
FIGS. 8A-8F are example screen displays illustrating how a user operates the virtual workspace provided by an example Application Workspace System on a managed computing system to launch applications.
Figure 8B:
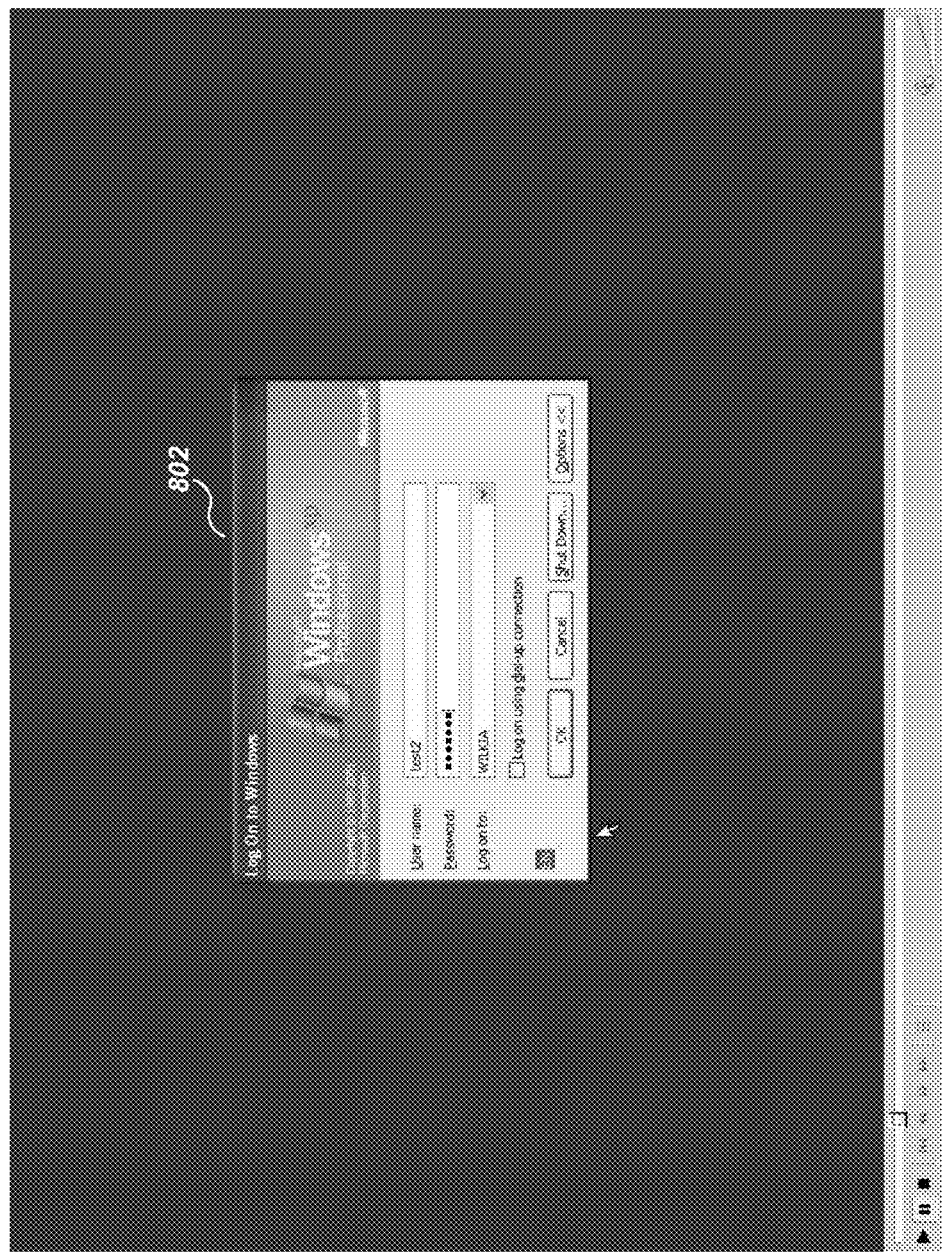
Figure 8C:
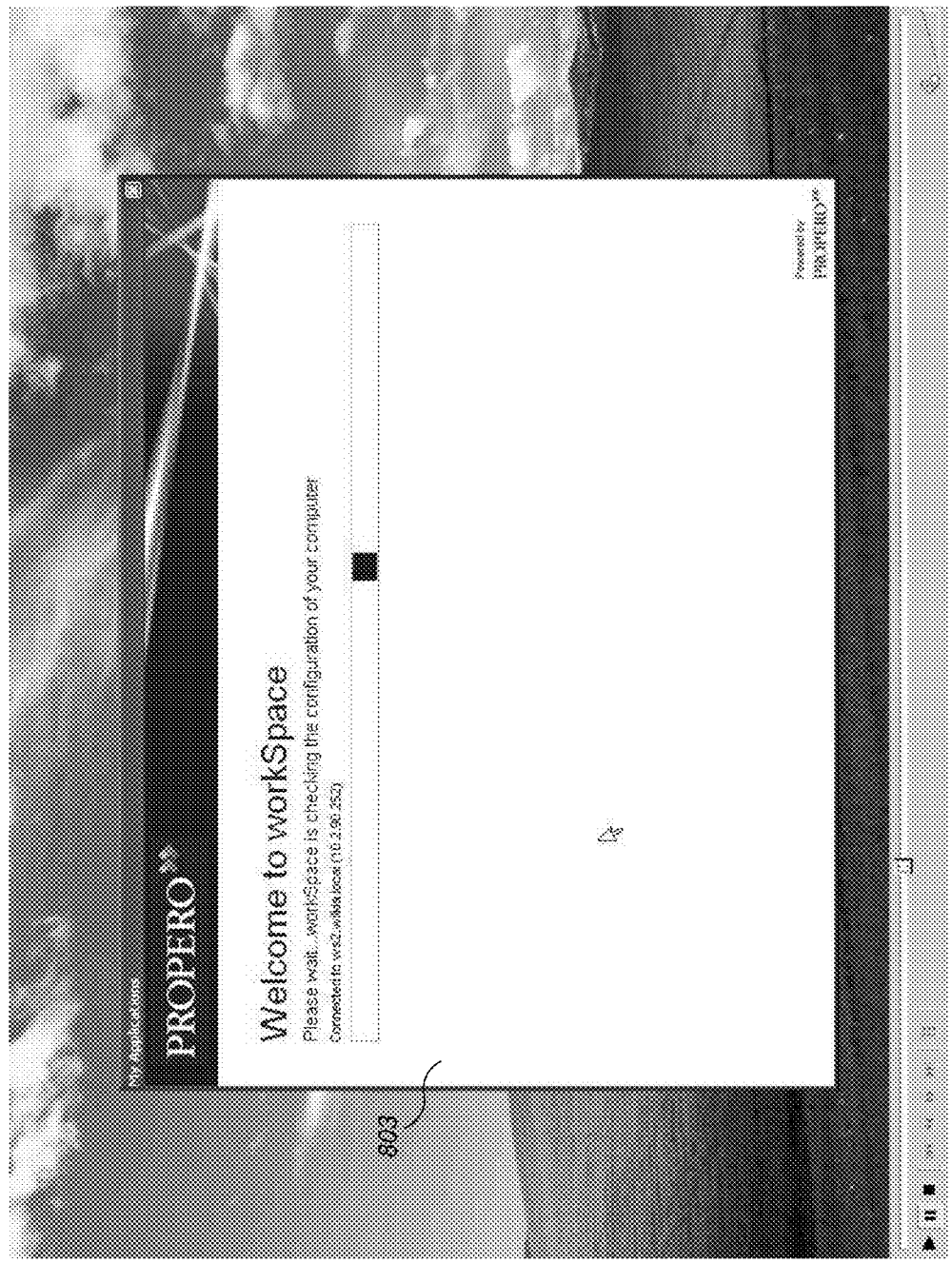
Figure 8D:
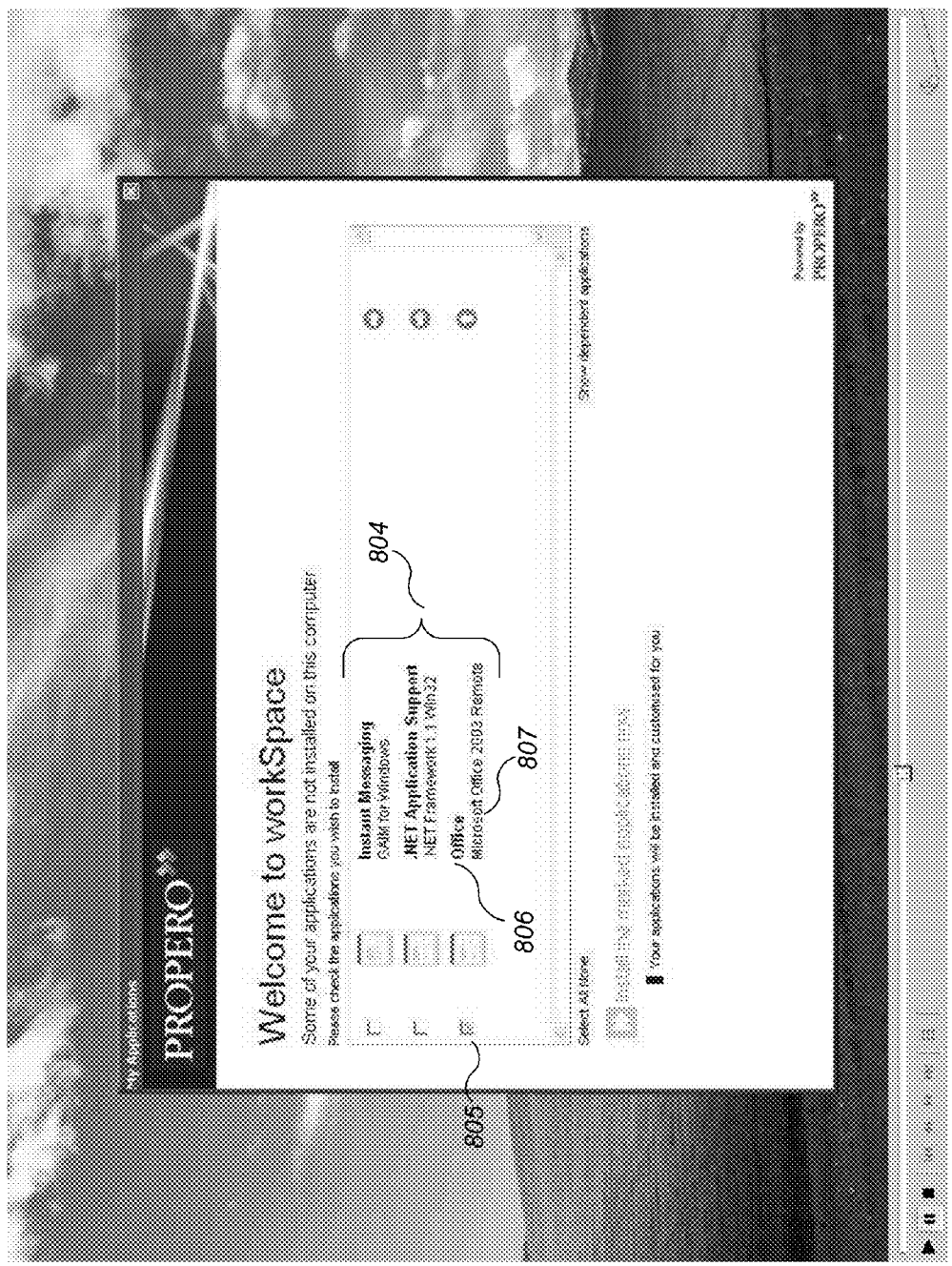
Figure 8E:
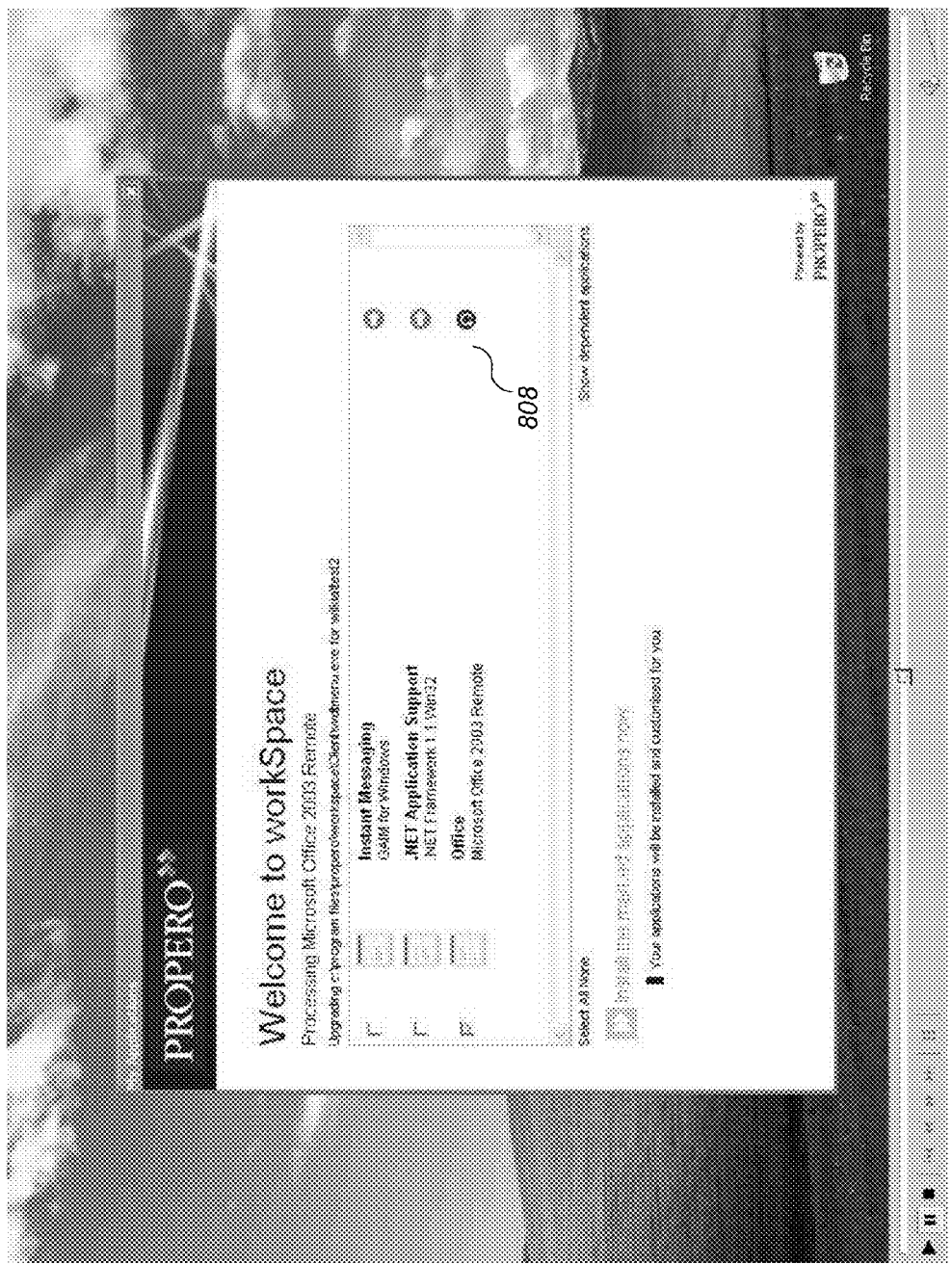
Figure 8F:
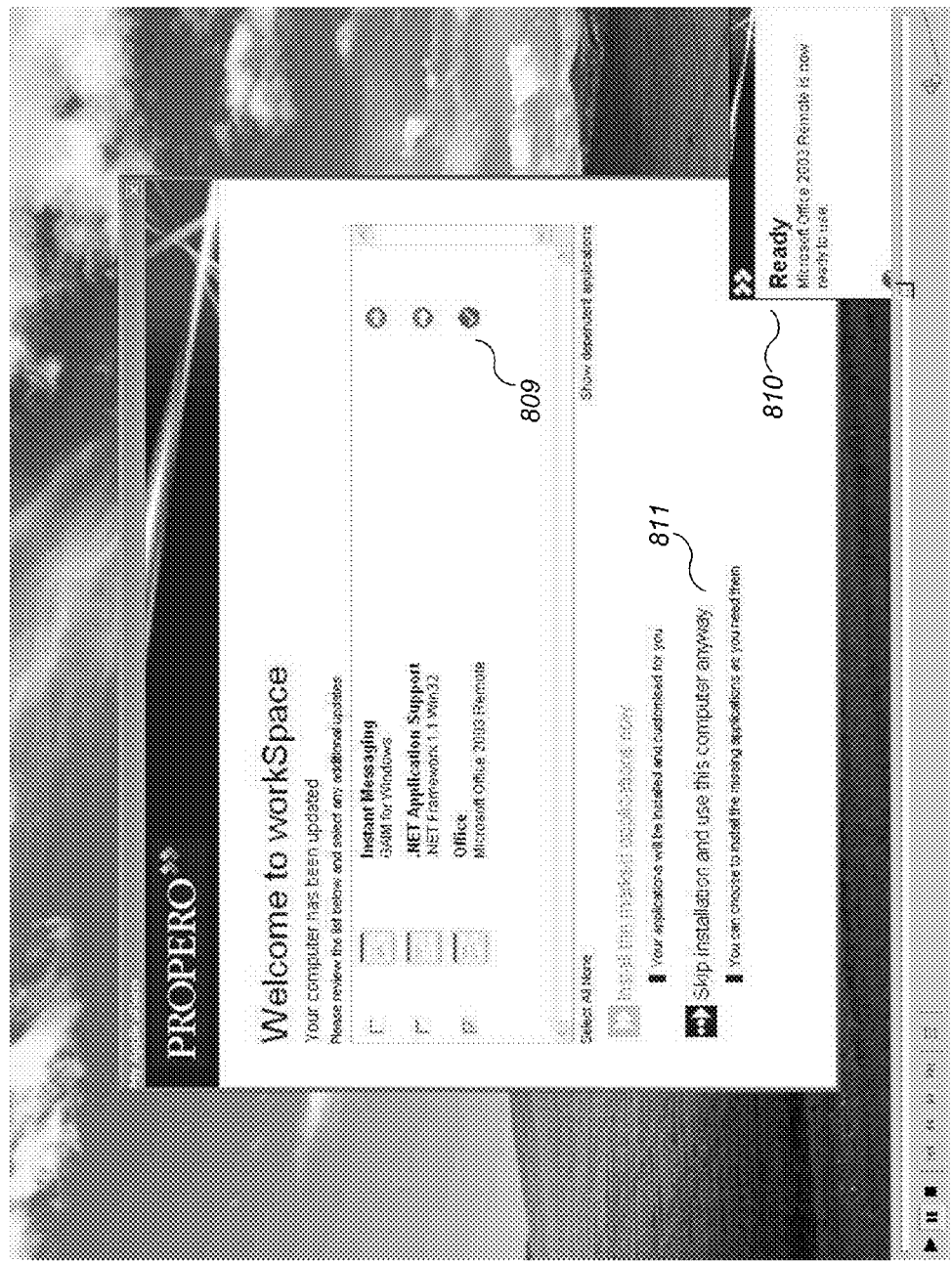

FIGS. 8A-8F are example screen displays illustrating how a user operates the virtual workspace provided by an example Application Workspace System on a managed computing system to launch applications. FIG. 8A shows a standard operating system desktop (native user interface) on a managed workstation. FIG. 8B shows the user logging into the user's desktop using normal procedures. FIG. 8C shows how the AWS software integrates seamlessly into the standard user interface of the native operating system and shows the user that the user's applications are automatically being "configured." This is one typical point in time, where the entitlements resolution process is invoked to automatically configure local and remote applications for the user. After the entitlements resolution process is complete, a list of available applications which are available for local installation (based upon the users entitlements set up by an administrator earlier) is displayed as shown in FIG. 8D. The resolution process may result in many (desired) side-effects as detailed below, since the AWS automatically can determine compatibilities between applications, upgrades to newer versions etc. FIG. 8E shows example feedback during an application upgrade. FIG. 8F shows additional applications that can be installed should the user desired.

Note that once the applications are installed/updated, the user can launch local applications on the managed computing device using the native operating system mechanism. The AWS does not intervene. However, it is possible for someone (e.g., an administrator) to associate shortcuts with specific AWS events, and thus be able to perform custom script actions before applications are launched and at other times in the system.

Figure 9A:
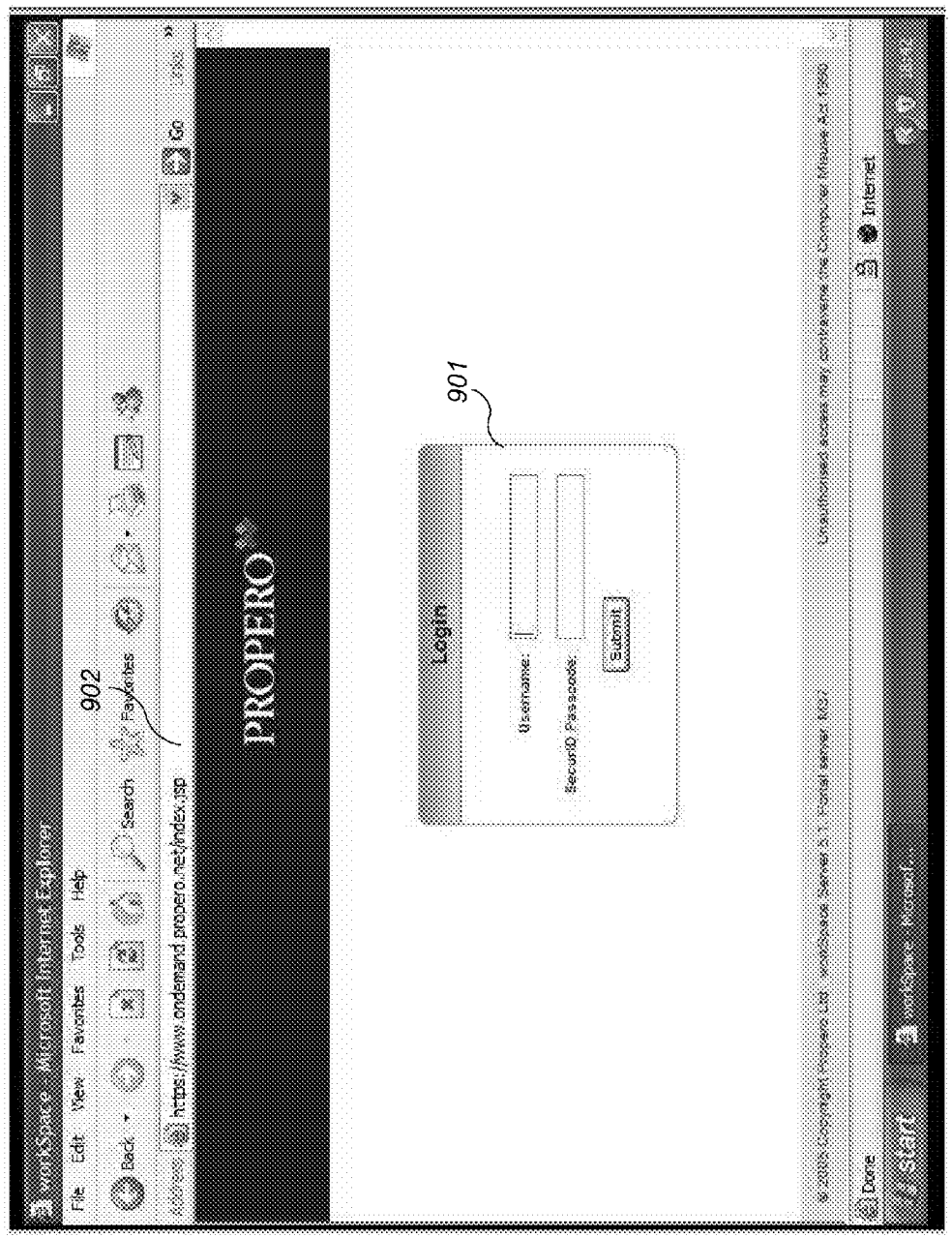
FIGS. 9A-9L are example screen displays illustrating how a user operates the virtual workspace provided by an example Application Workspace System through a web portal to launch applications.
Figure 9B:
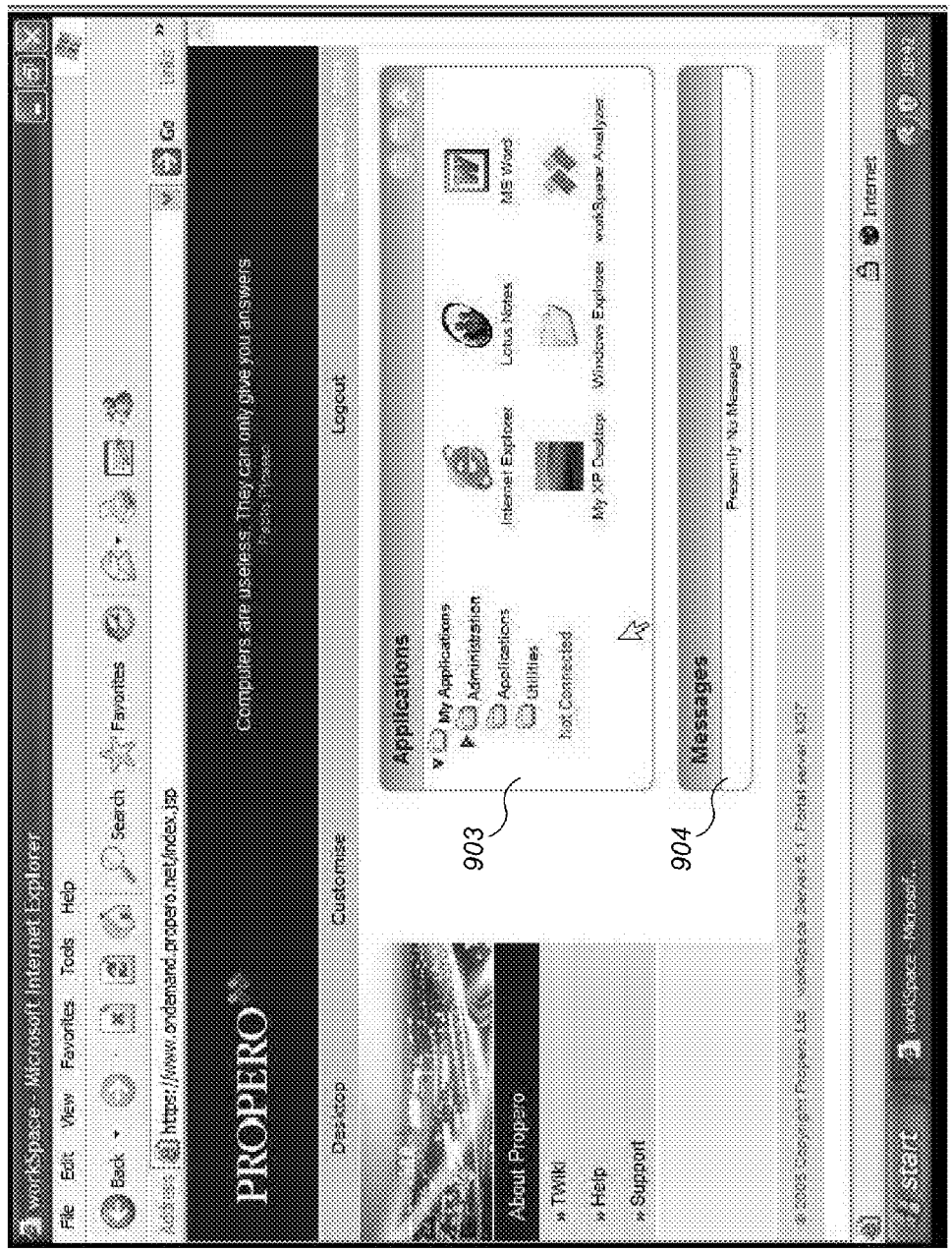
Figure 9C:
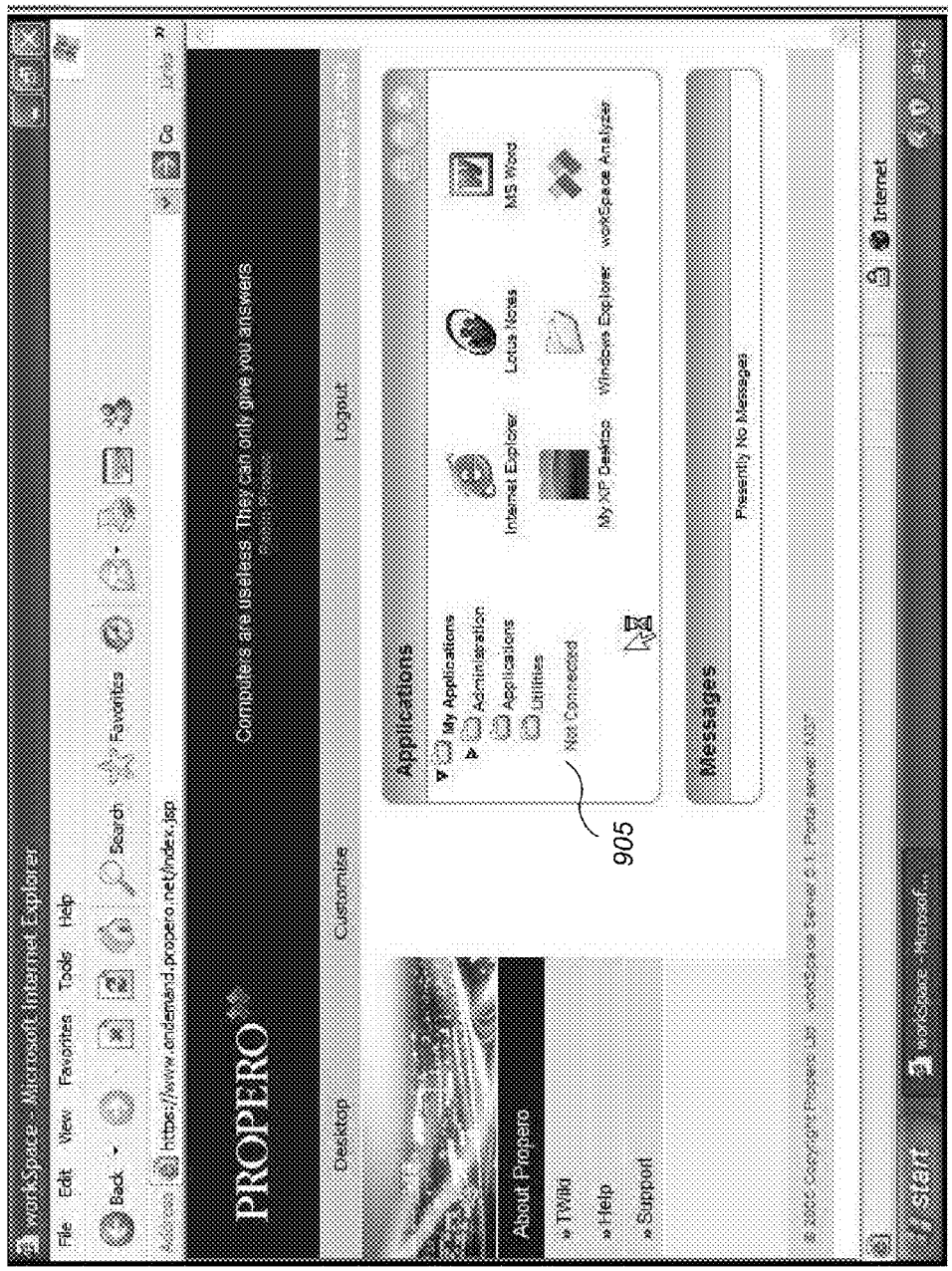
Figure 9D:
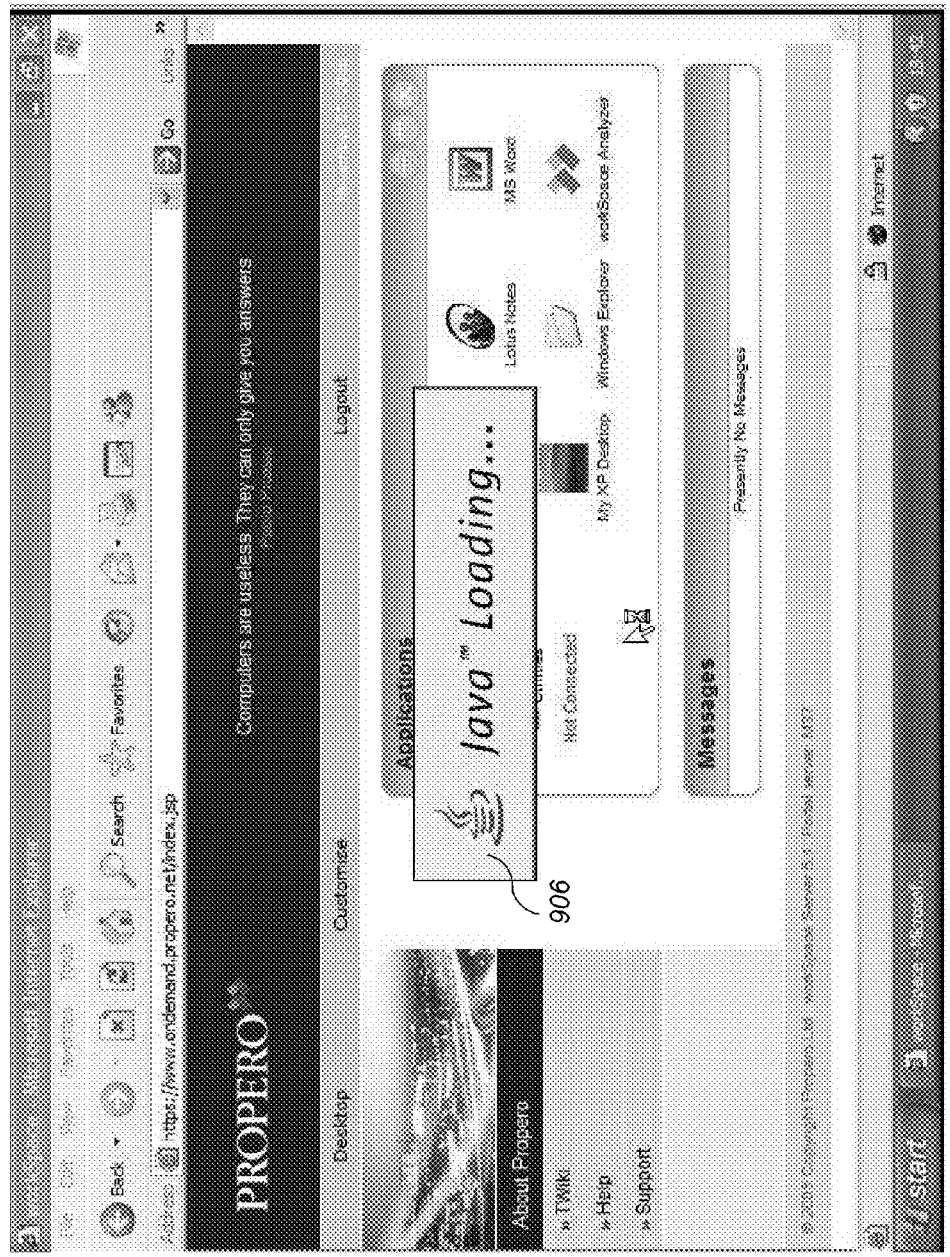
Figure 9E:
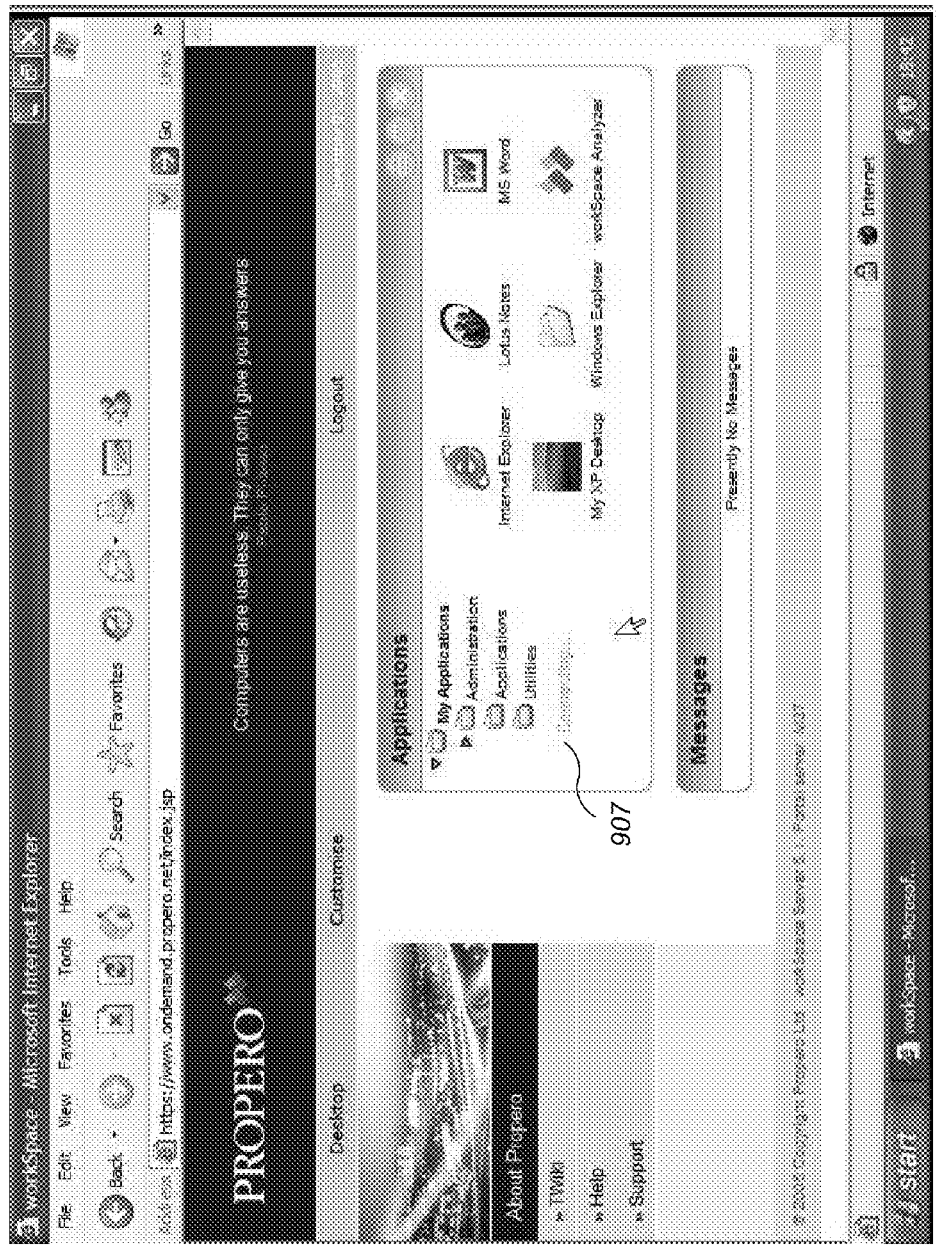
Figure 9F:
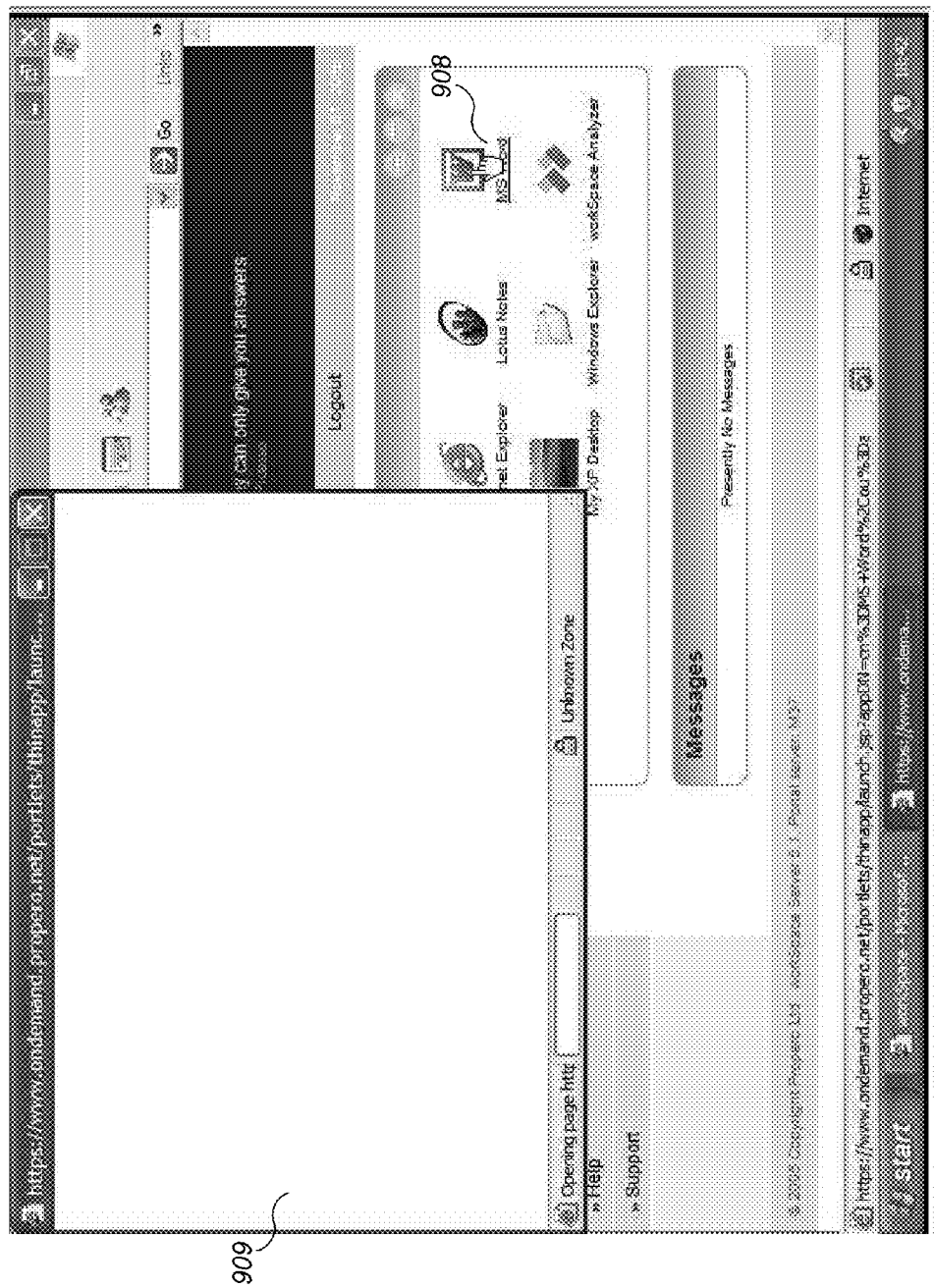
Figure 9G:
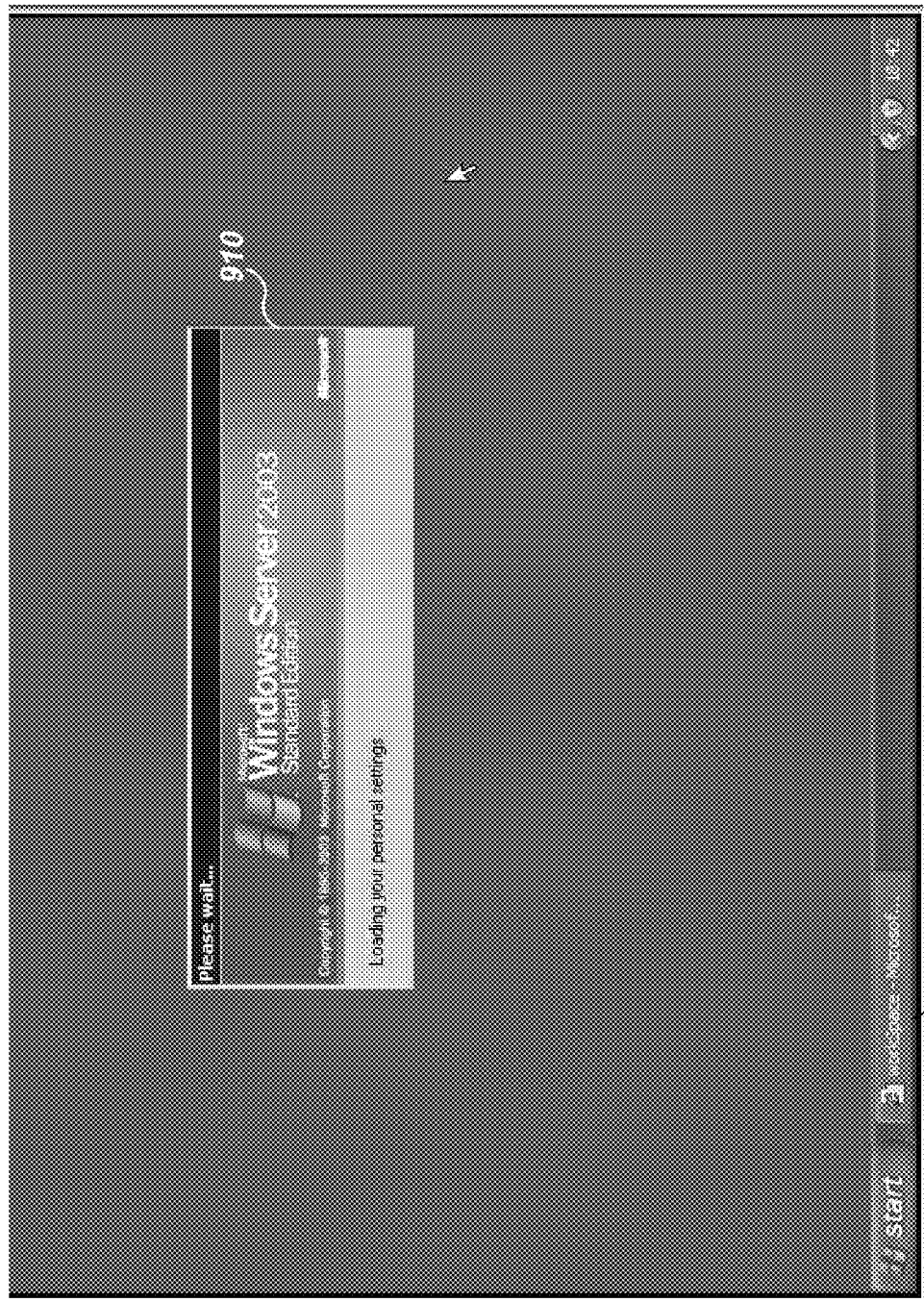
Figure 9H:
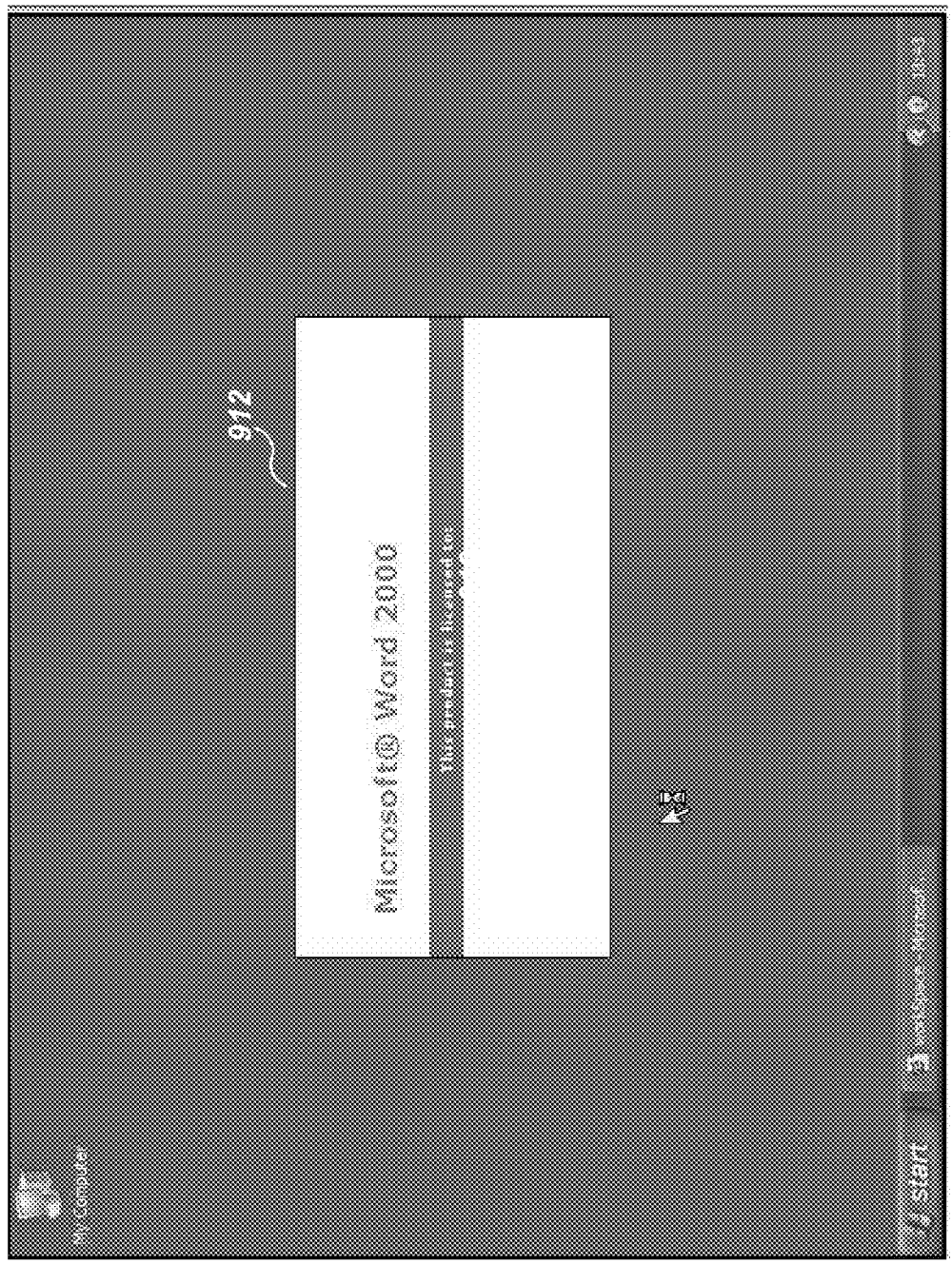
Figure 9I:
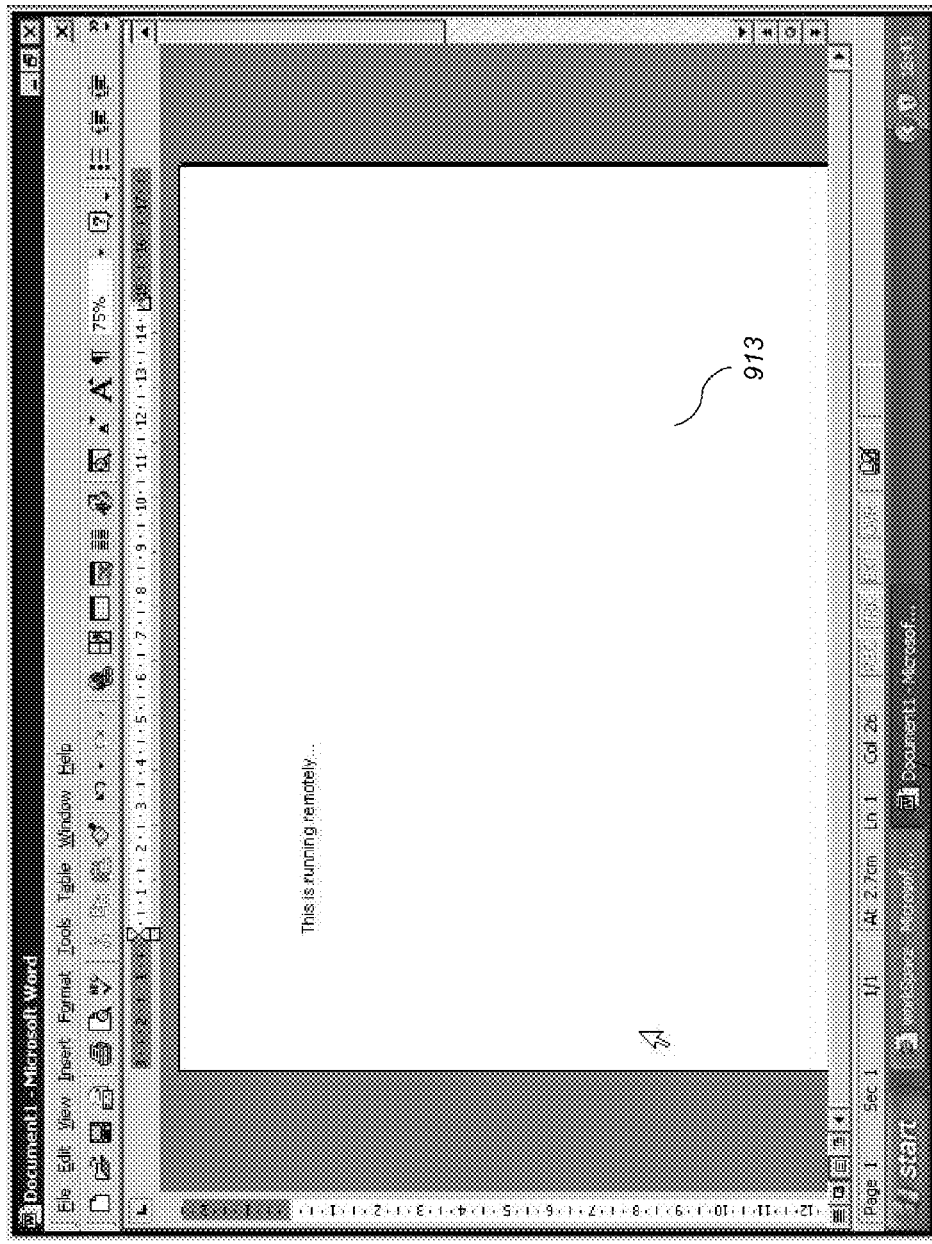
Figure 9J:
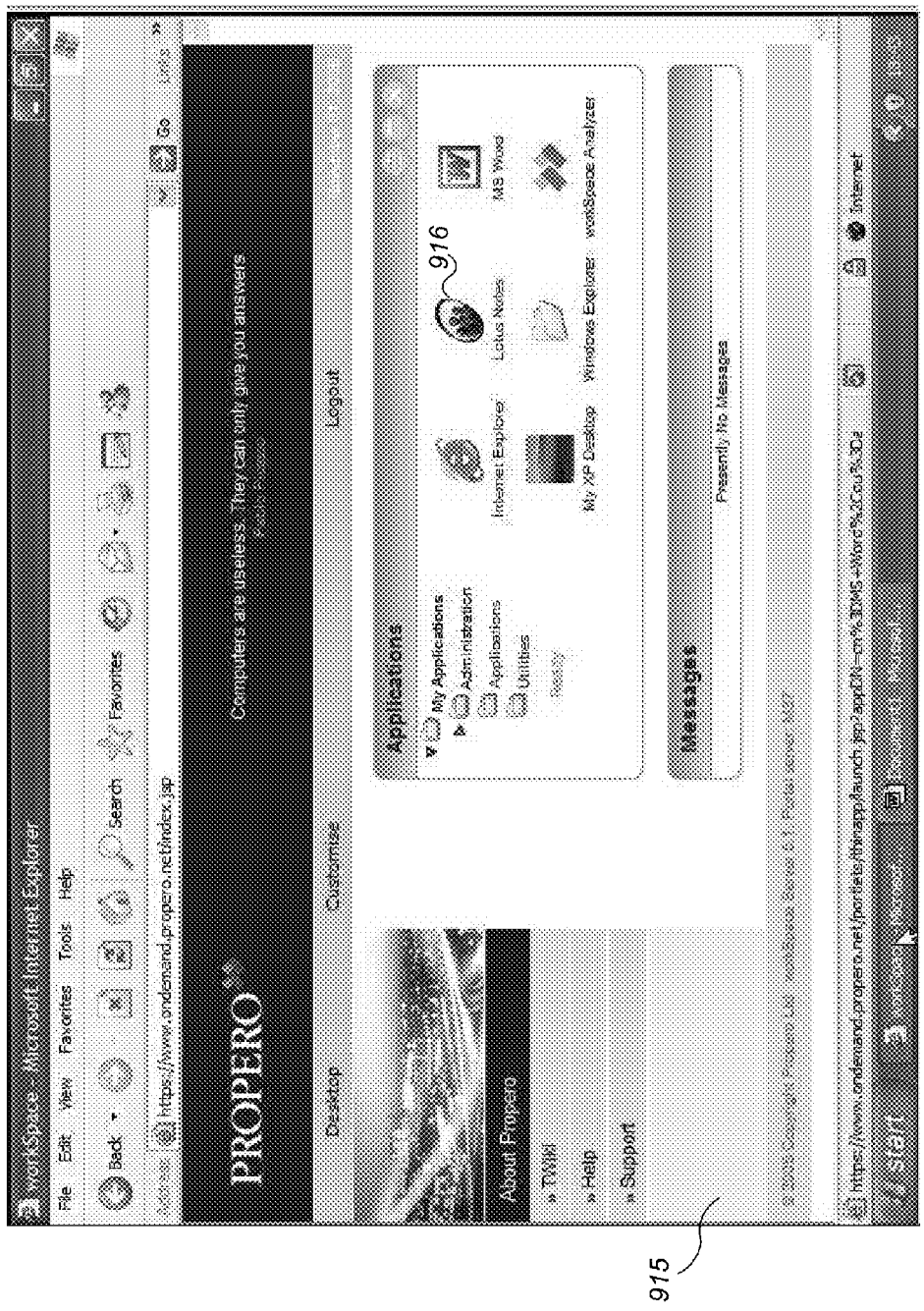
Figure 9K:
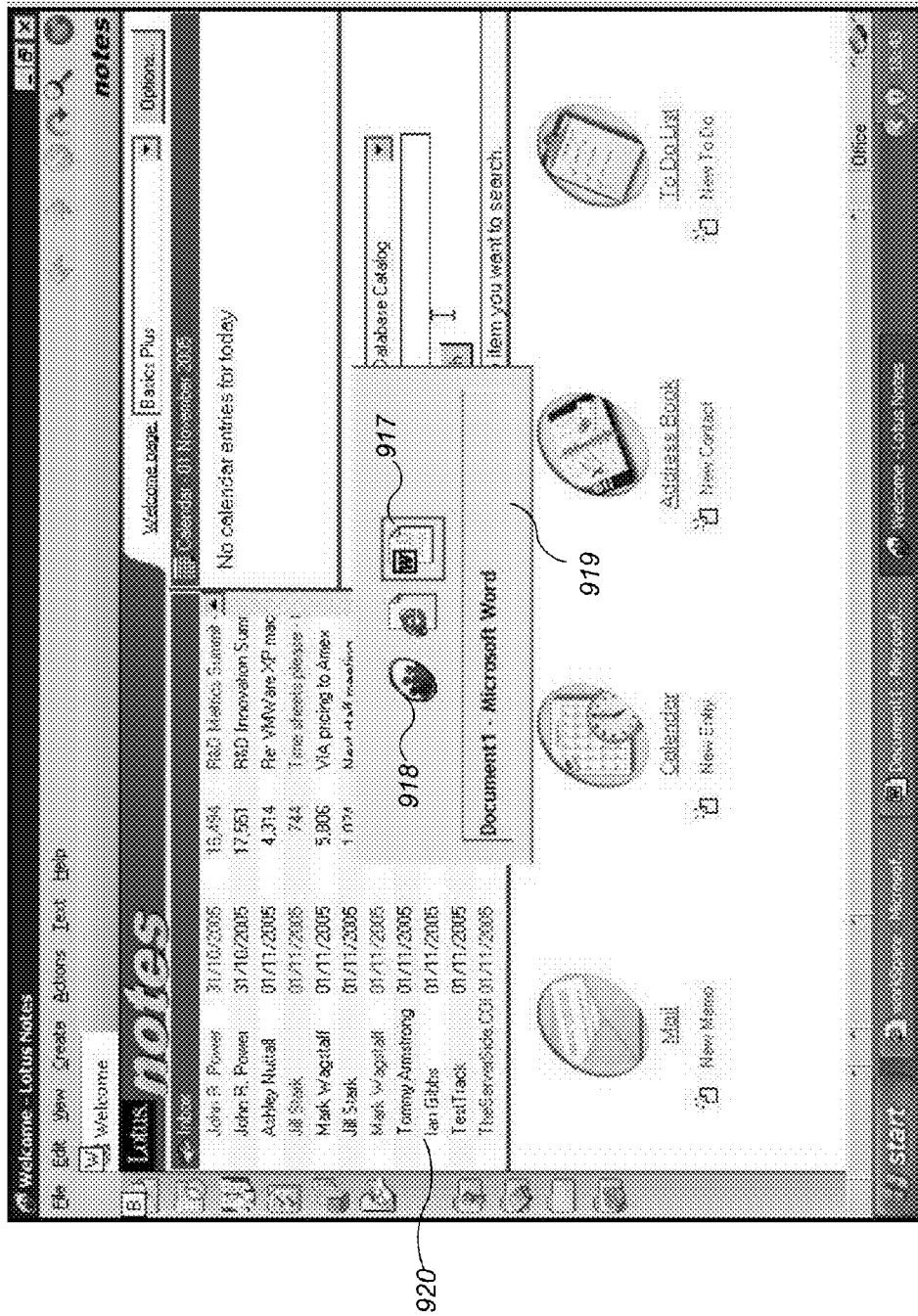
Figure 9L:
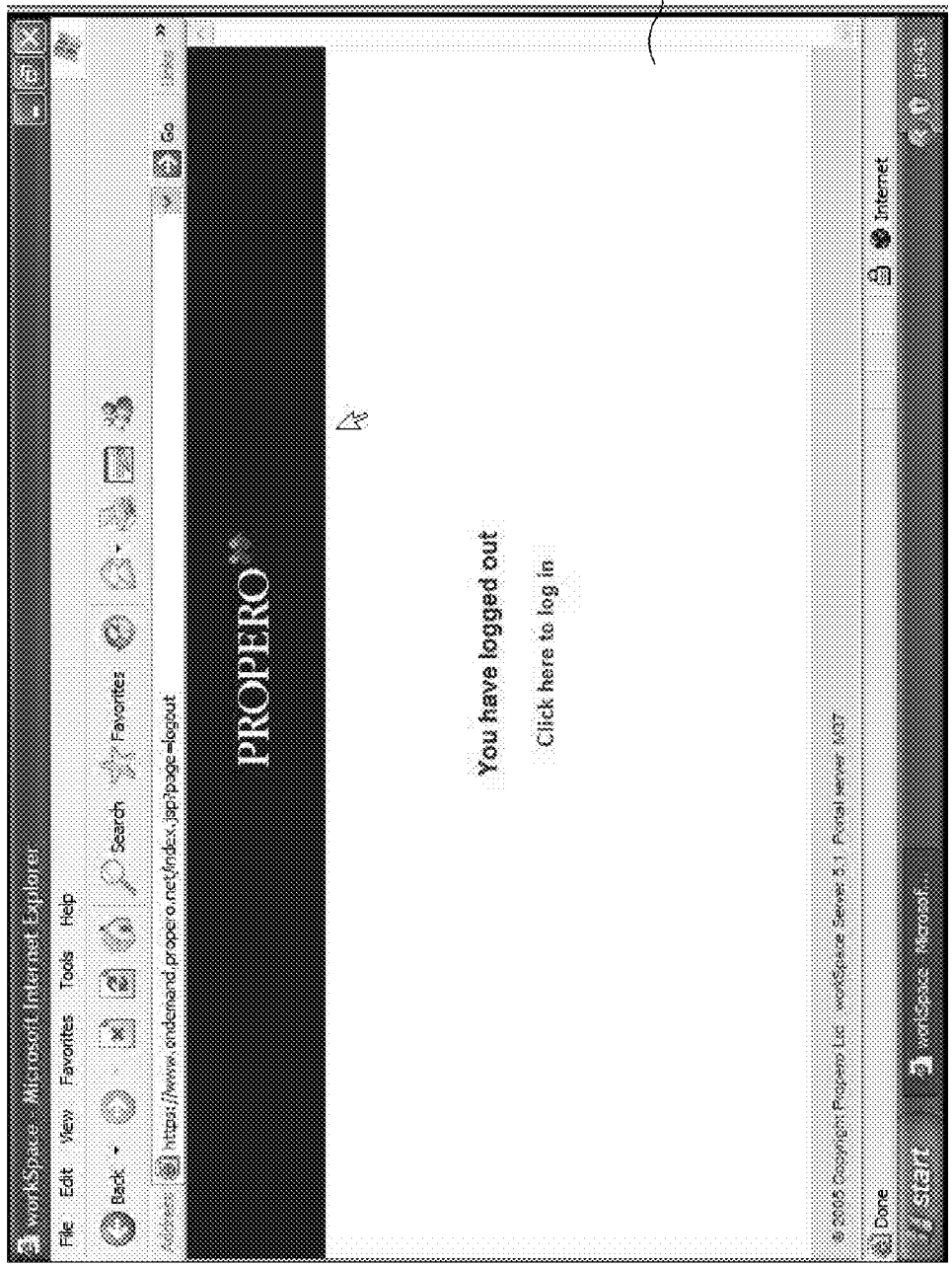

FIGS. 9A-9L are example screen displays illustrating how a user operates the virtual workspace provided by an example Application Workspace System through a web portal. For example, a user from a unmanaged workstation, a PDA, a cellular phone etc. may login to the web portal and access applications remotely. (The backend mechanisms used to support web portal access typically are also used when a user launches a remote application from a managed workstation.) FIG. 9A shows the user logging into the web portal through a uniform resource locator designation (URL). FIG. 9B shows the portal as it initially comes up, after several applications have been configured for that user. Based upon a current set of entitlements for that user, the user has access to Internet Explorer, Lotus Notes, MS Word, My XP desktop, Windows Explorer, and workSpace Analyzer. These applications demonstrate a mix of the type of remote applications that can be served by a virtual workspace—in this case, the majority are Terminal Server applications, whereas "My XP desktop" is a VM-Ware virtualized, hosted OS image. FIG. 9C shows the AWS responding to the user indicating that the user wishes to launch MS Word (by, for example double-clicking) the MSWord icon. At this point, the entitlements resolution process to determine the correct application to run begins and the application is run. FIG. 9D illustrates that a java virtual machine is being used to support the AWS in this current embodiment. In FIGS. 9E and 9F, the user is being connected to a server that can serve the application as a result of the entitlements resolution process. Appropriate user logons take place (for example, via single sign-on techniques), as shown in FIG. 9G, to allow the user access to the designated application. Notice in FIG. 9H, the virtual desktop that appears in the user's browser. FIG. 9I shows MSWord launched on a remote computer and servicing the user through the virtual desktop. The user interacts with MSWord just as the user would if the application were installed remotely. In FIG. 9J, the MSWord icon now shows in the user's taskbar of the user's virtual desktop. FIG. 9K shows that the user has invoked another application remotely, Lotus notes, in a similar manner. FIG. 9L illustrates what the virtual workspace looks like when the user subsequently logs off the session.

As mentioned, a user can launch a remote application from a managed computing device as well. Each application object when configured by the AWS contains launch item objects and document type objects. For launch item objects, these consist of a name (e.g., "Microsoft Word"), an icon, and a location attribute (e.g., "Program Files\Microsoft Office"). The AWS Manager generates a shortcut in the location as specified in the location attribute, with the specified icon and name, but referencing a identifier which is generated to include the address of a component in the AWS Web Services, and encoded with a parameter which is set to the identifying key of this launch item. As a result, when a user clicks on one of these shortcuts, a web browser is launched which sends a request to the AWS Web Services which launches the remote application.

Typically, the access device is only aware of the identification key of the remote application. Note that it is common for these keys to point to sub-entities of the remote application (cf, with an installed application having more than one "icon" that starts a subcomponent of the application). These identification keys are coded into shortcuts or links on the desktop or, if applicable, the portion of the access device's UI commonly used for application related links.

In addition, the system is configured with document types (also known as "file extensions" or "file associations" which are similarly linked to an identification key of the remote application that can handle that document type. There may be various implementations of a shortcut, link, launch item or dock item that represents an identification key that all achieve a common purpose—namely that of notifying a component on the access device that the user has selected or "click" on that shortcut or link.

When a user clicks on one of these links in order to request, or "launch" the associated application (or by selecting a document of a type configured to be associated with a remote application), the identification key, encoded as a URL, is sent to the system AWS Web Services.

Figure 10A:
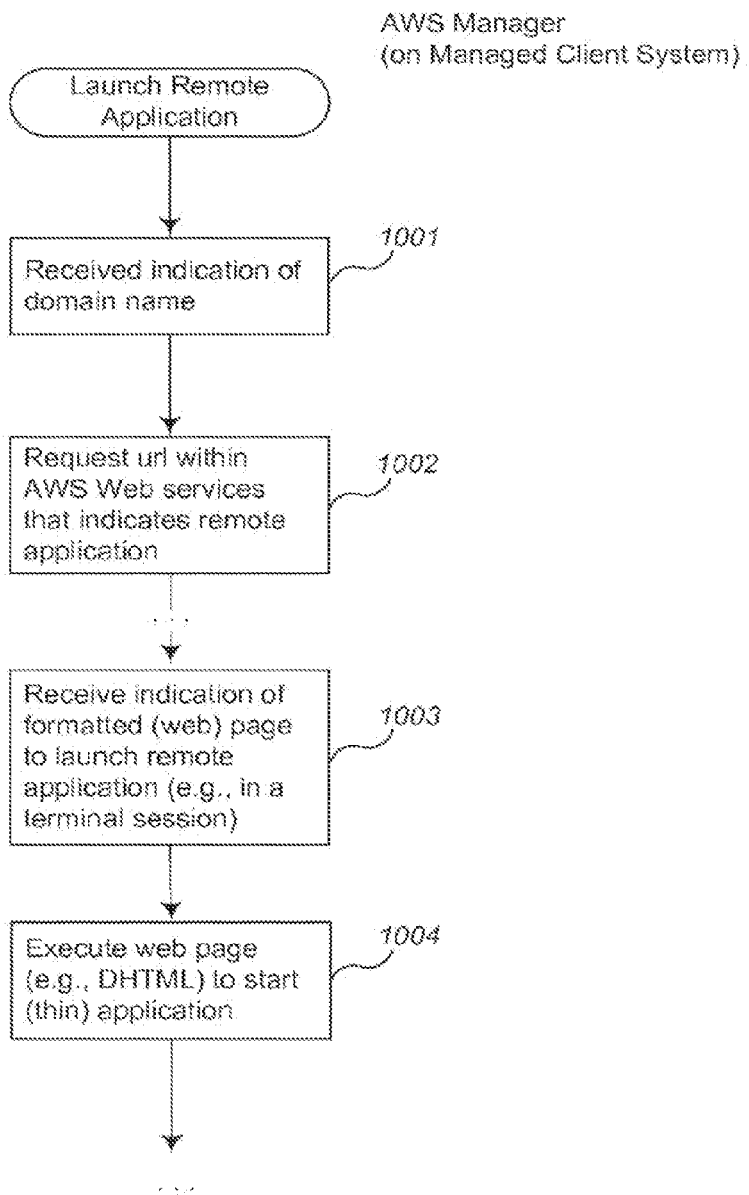
FIG. 10A is an example flow diagram of the client side processing in an example Application Workspace System performed when launching a remote application from a managed computing device.

FIG. 10A is an example flow diagram of the client side processing in an example Application Workspace System performed when launching a remote application from a managed computing device. The processing in FIG. 10A is performed in response to a user activating an icon (or document type) that refers to a remote application. Such icons or document types have references to the Distinguished Name ("DN") of the remote application encoded within them as an identifying "key" and this reference is passed to the AWS Manager when the code of FIG. 10A is invoked. Thus, in step 1001, the AWS Manager receive an indication of a DN and uses it in step 1002 to request a url within the AWS Web Services portal. (The portal, in response, may launch a browser with that url.) At this point the AWS Web Services takes over to figure out how to launch the specified application (see FIG. 10B). Sometime later, in step 1003 the AWS Manager receives an indication of a formatted web page which it can then use to launch the application in an appropriate environment, for example, a terminal session. In step 1004, the AWS Manager executes the web page and starts the "thin" application by rendering the information on the page. This information (commonly in Dynamic Hyper-Text Markup Language—DHTML) contains within it various script and object instructions to start a thin client application and to provide it with the connection information as determined by the a connection manager within the AWS Web Services. In the example of an WTS (Windows Terminal Server), the thin client application is a component that connects via a tunnel (VPN) to the WTS.

Figure 10B:
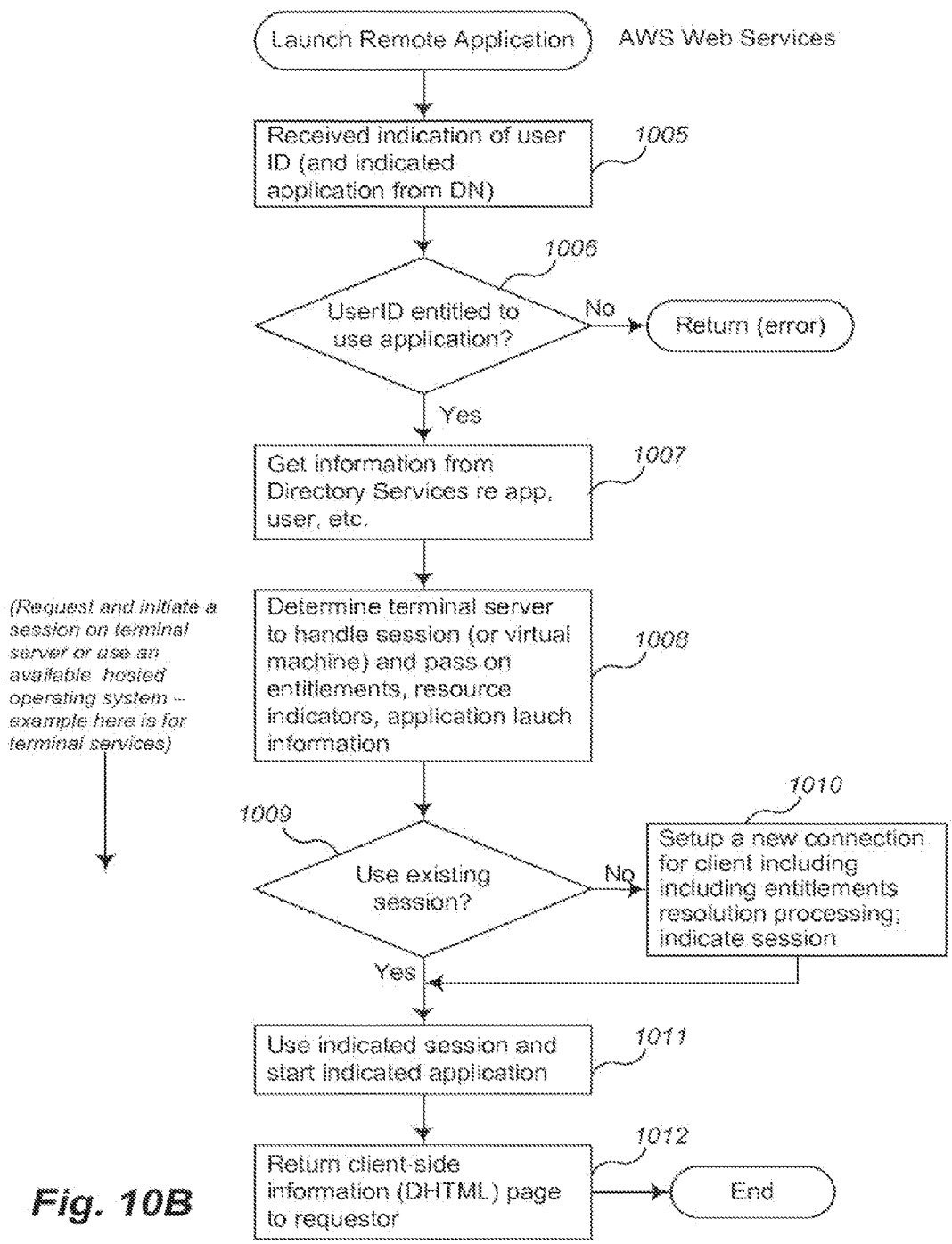
FIG. 10B is an example flow diagram of the server side processing in an example Application Workspace System performed when launching a remote application from a managed computing device.

FIG. 10B is an example flow diagram of the server side processing in an example Application Workspace System performed when launching a remote application from a managed computing device. Typically, this processing is performed by one or more components of the AWS Web Services, for example, components 311-314 in FIG. 3. In step 1005, the web service receives (from the AWS Manager) an indication of a user ID and an indication of the application (from the domain name/url). in step 1006, the web service determines that the user is entitled to the remote application. If so, processing continues in step 1007, else returns an error. In step 1007, the web service obtains information from an information services component (for example a directory service) regarding the application user, infrastructure location, etc. In step 1008, the web service determines an appropriate backend (for example, a session manager) to handle the application request (e.g., one that can talk to Terminal Servers, VMWare, etc.), and passes information onto the backend. In step 1009, the web service determines whether to use an existing session or not, and if so, continues in step 1011, otherwise continues in step 1010. More specifically, the code queries application (terminal) servers to see which one to use based on, for example, the number and type existing sessions, and load. In step 1010, having chosen a server, the code prepares it for the forthcoming connection (if new) including passing the entitlements, printer mappings and application to launch. The target server is notified that a new connection to it is pending, and it awaits the client connection. Any information required for the new connection (e.g., screen size) can be obtained from the configuration repository. Similarly, security and any additional functions related to preparing for a connection from the client computer to the target server are performed. In step 1011, if it is to use an existing session, then the application is started. In step 1012, the web service can now respond to the request from the AWS Manager with an appropriately formatted page to allow the remote application (thin client) to be launched.

Note that, similar to a managed computing device, when a user activates an icon in a web page rendered by the AWS web server on an unmanaged computing device, the mechanism for launching the application is similar. Most of the steps of FIG. 10B are executed, the designation of the user and application, however, arrive from the AWS web browser interface.

In an AWS such as the workSpace, users can view and manage existing sessions with remote applications. In the case of an unmanaged computing device, a user can use various user interface ("UI") controls/elements provided by the AWS Web Services to view and manage existing sessions (such as disconnect them, reconnect them and to kill executing processes within them if available). In the case of a managed computing device, the AWS Manager interacts with the AWS Web Services to retrieve the session data, and then presents this data using its own UI elements (usually handled by the Node Manager Session Support 421 in FIG. 4).

To perform session management on the unmanaged device, typically a session controller component of the AWS Web Services queries appropriate other components for any current sessions that exist for the calling user. The session controller compiles a session list, and encodes each session into a Session ID that is unique across all sessions. This session ID has the form: SessionManagerID;domain\\username(uid)/ID@serverDN:protocol.

The session controller parsers the SessionManagerID to locate a component responsible for the session then the rest of the text is passed to that component. The domain and username identify the user, the ID identifies the actual session itself on the backend server, the server DN identifies the backend server in LDAP, and the protocol is the physical protocol used to connect to that backend server (as some components may support more than one protocol).

Figure 11:
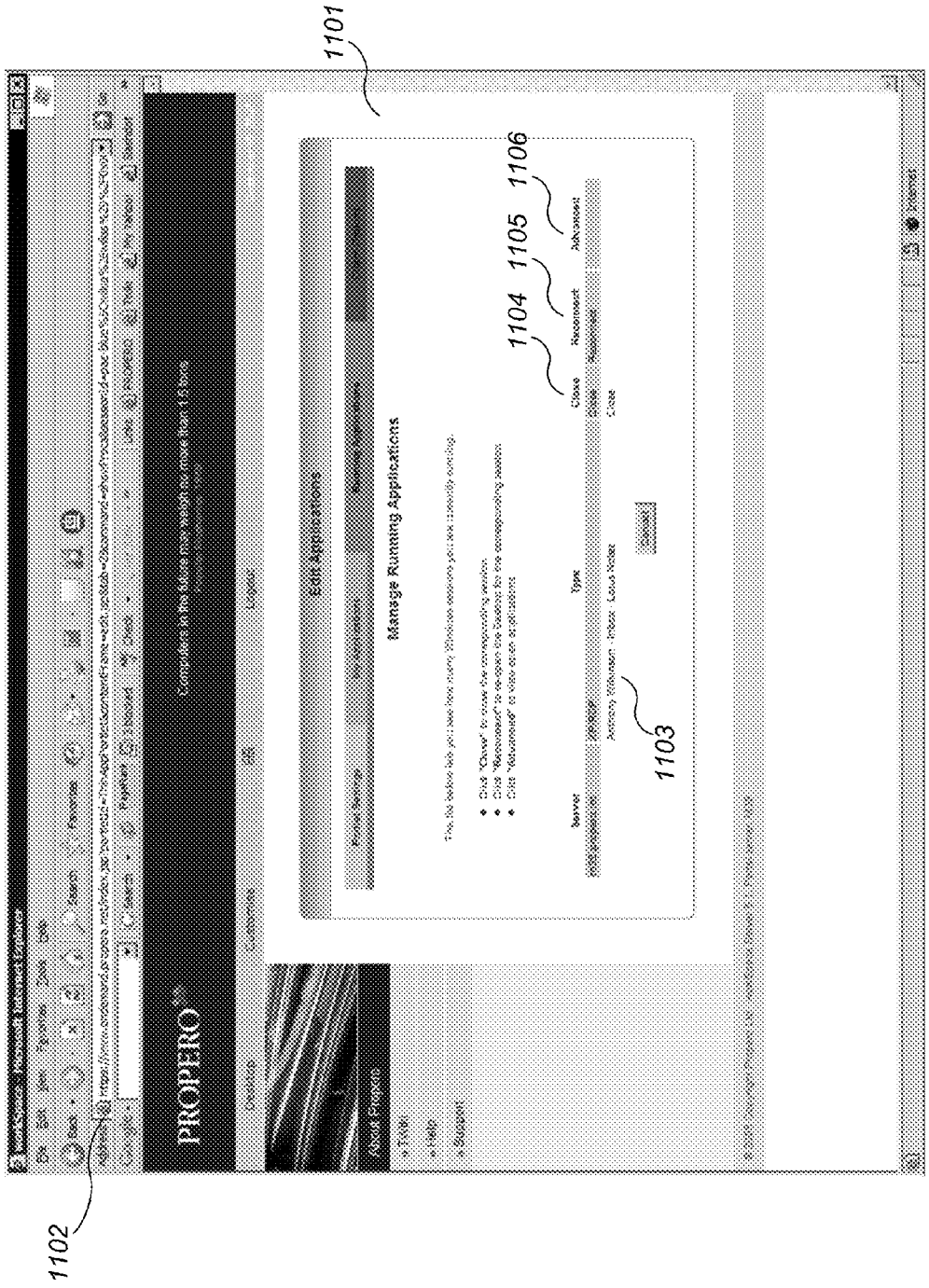
FIG. 11 is an example screen display of a user interface on an unmanaged computing device for performing session management of sessions controlled by an example Application Workspace System.

FIG. 11 is an example screen display of a user interface on an unmanaged computing device for performing session management of sessions controlled by an example Application Workspace System. In FIG. 11, one session 1103 of type XP/RDP (a workSpace Terminal Server session), containing one application (Lotus Notes) is currently displayed. The user can close (disconnect), reconnect, or perform advanced options by selecting links 1104, 1105, and 1106, respectively. Other than the reconnect operation, all of these operations typically only return status information. When a user attempts to reconnect a session, load balancing is not performed. Instead, the session manager is instructed to which particular session to connect.

Figure 12A:
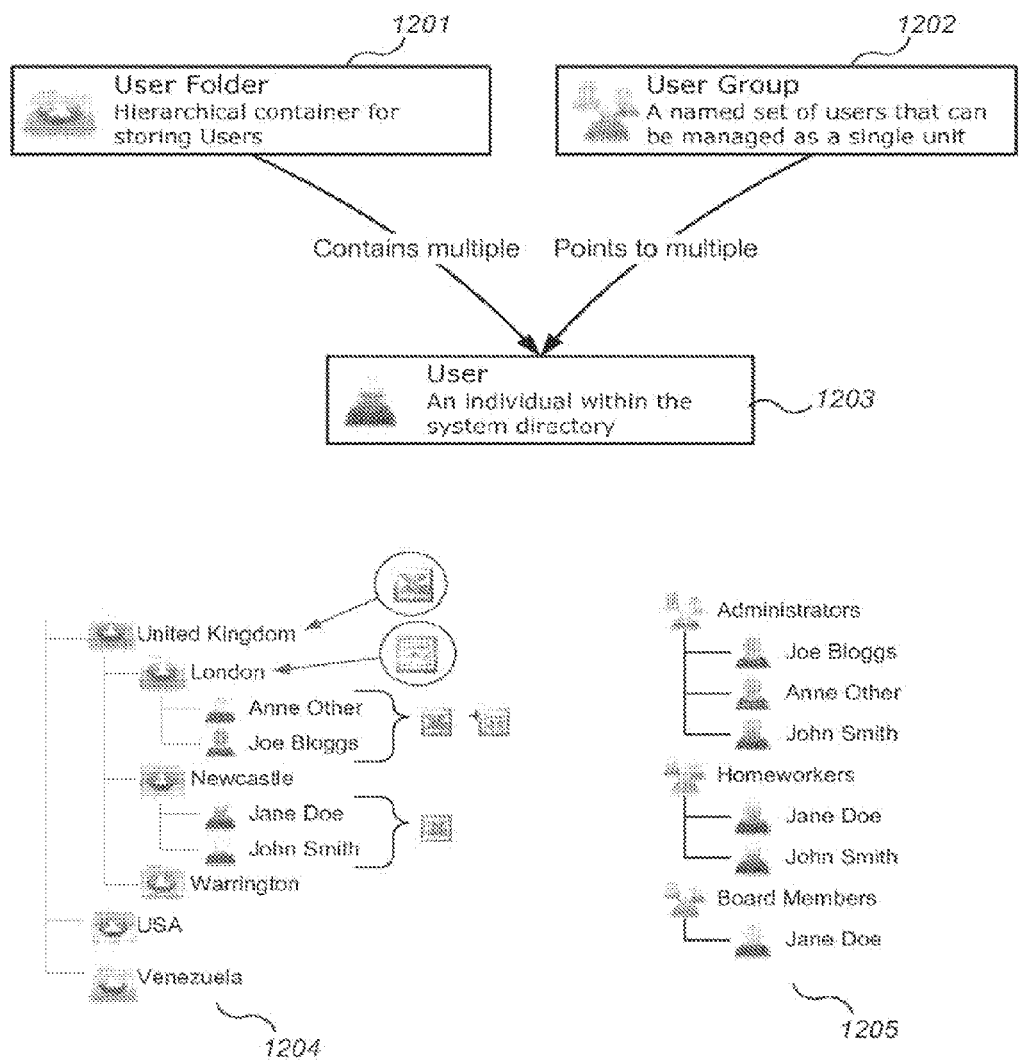
FIGS. 12A-12D are example block diagrams of the inter-relationships between Application Families, Applications, Application Folders, Users, User Groups, User Folders, Packages, and Package containers used to provide the AWS application abstraction model.

As mentioned previously, the AWS abstracts users from applications using a concept of an Application Family. FIGS. 12A-12D are example block diagrams of the interrelationships between Application Families, Applications, Application Folders, Users, User Groups, User Folders, Packages, and Package containers used to provide the AWS application abstraction model. FIG. 12A describes the mapping between users, user groups, and user folders. Users are individuals are stored as entities in a directory, containing standard fields like a user's name and login information. User entities also contain links to the applications that the user is entitled to use.

In order to make the administration of large numbers of users more convenient, they can be grouped together and managed as a single unit. There are two ways of performing this grouping: user folders and user groups. User folders are structures akin to directory folders within a filing system. Each user is contained in a single user folder that may in turn be nested inside a parent user folder. User folders provide inheritance. In the example shown in FIG. 12A, if the application "Excel" were assigned to the user folder "United Kingdom" and the application "PowerPoint" were assigned to the folder "London", the user "Joe Bloggs" would be entitled to use both "Excel" and "PowerPoint" while the user "Jane Doe" would only be entitled to use "Excel".

User groups are looser structures that allow users from anywhere in the user folder structure to be grouped together, independent of that folder structure. Like user folders, user groups can be used to assign applications to multiple users at one time. User groups cannot be nested inside one another, nor is there any inheritance between them.

Figure 12B:
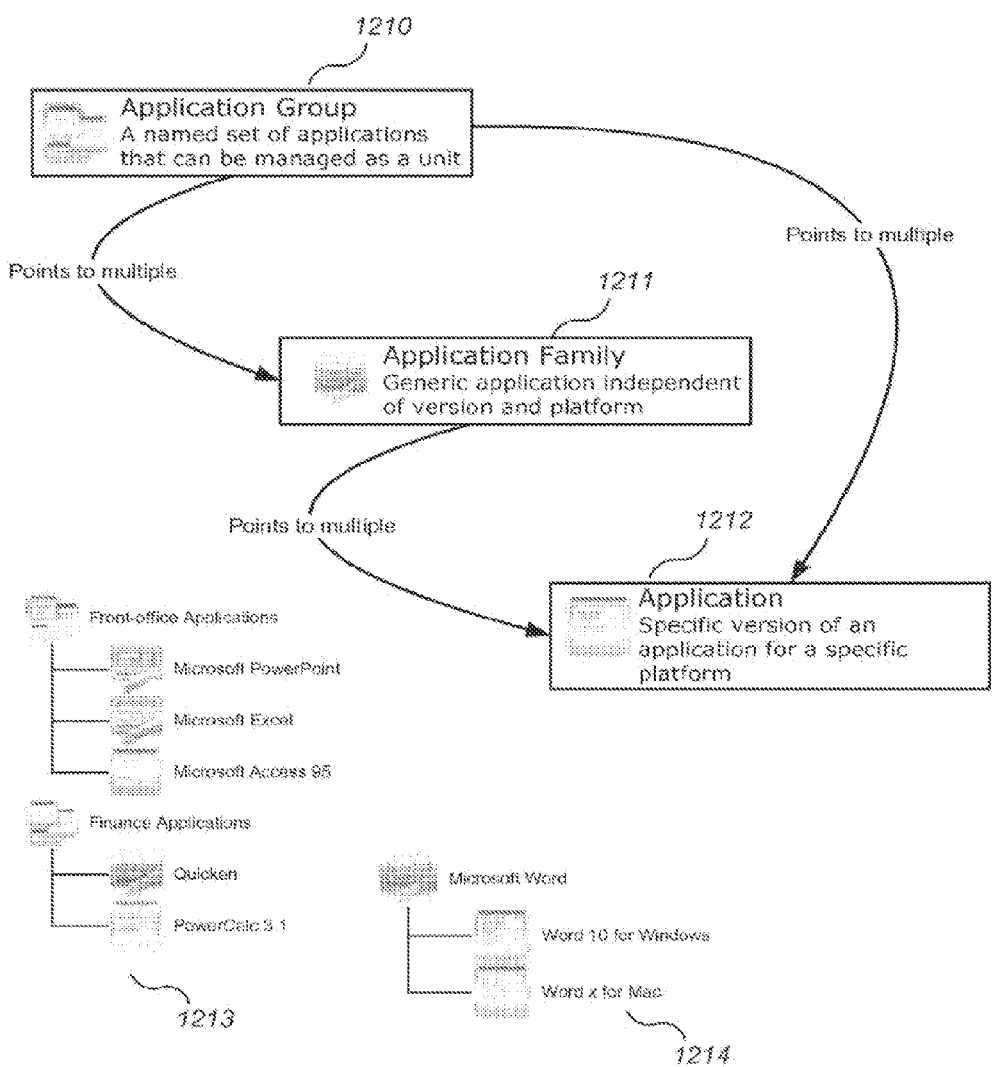

Applications in the AWS separate the business-oriented concept of a particular application (like "Microsoft Word") from the technical details of the package(s) that are used to deliver it (like "office2003.msi" and "office2003sr2.msi"). This separation allows changes to be made to the way that an application is delivered without having to change the entitlements of users to that application. As shown in FIG. 12B, there are three different application entities to allow flexibility in the specificity of application entitlements. These are: application families, application groups, and applications. For example, a user can just be assigned "Microsoft Word" to get the latest version, or be assigned a specific version such as "Microsoft Word 2003".

Application families allow entitlement assignments without concern for which version or platform of the application is used. For example, the application family "Microsoft Word" could be linked to separate application instances for the Windows and Macintosh editions. Entitlements processing will ensure that users assigned "Microsoft Word" would get the appropriate edition for their platform.

Application groups allow a group of applications to be bundled together and assigned as a single unit. With the example shown in FIG. 12B, users can be assigned the group "Front-office Applications" to get the latest versions of "PowerPoint" and "Excel" while stipulating a specific version of "Access."

Application instances describe specific versions of applications; they are what is ultimately presented to users on the 'Start Menu' or elsewhere. Generally, application instances are only directly assigned to a user if the user requires a specific version of an application.

Figure 12C:
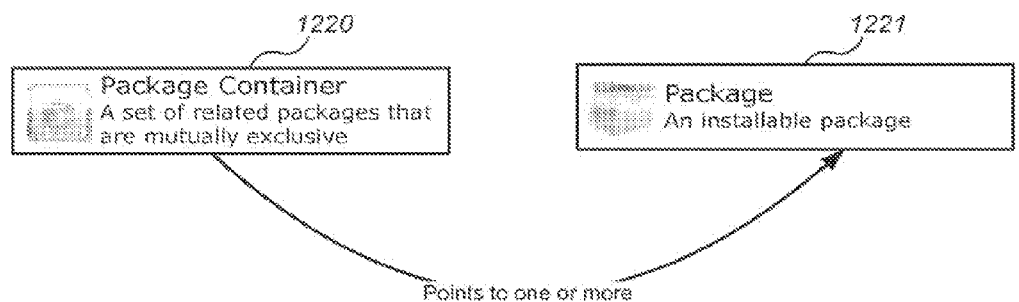
Figure 12C:
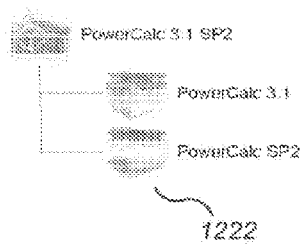

FIG. 12C illustrates a concept of packages and package containers. Package containers group together a mutually exclusive set of packages. This construction is needed to correctly manage the installation of MSI packages. Note that other types of installation and packaging protocols may be used as package instances. Package instances correspond to a single installable item, such as: special AWS Windows MSIs, Standard Windows MSIs, vendor-specific Windows SETUP.EXEs, and Macintosh PKGs. MSI is used as an exemplary package type for the description embodied herein.

Figure 12D:
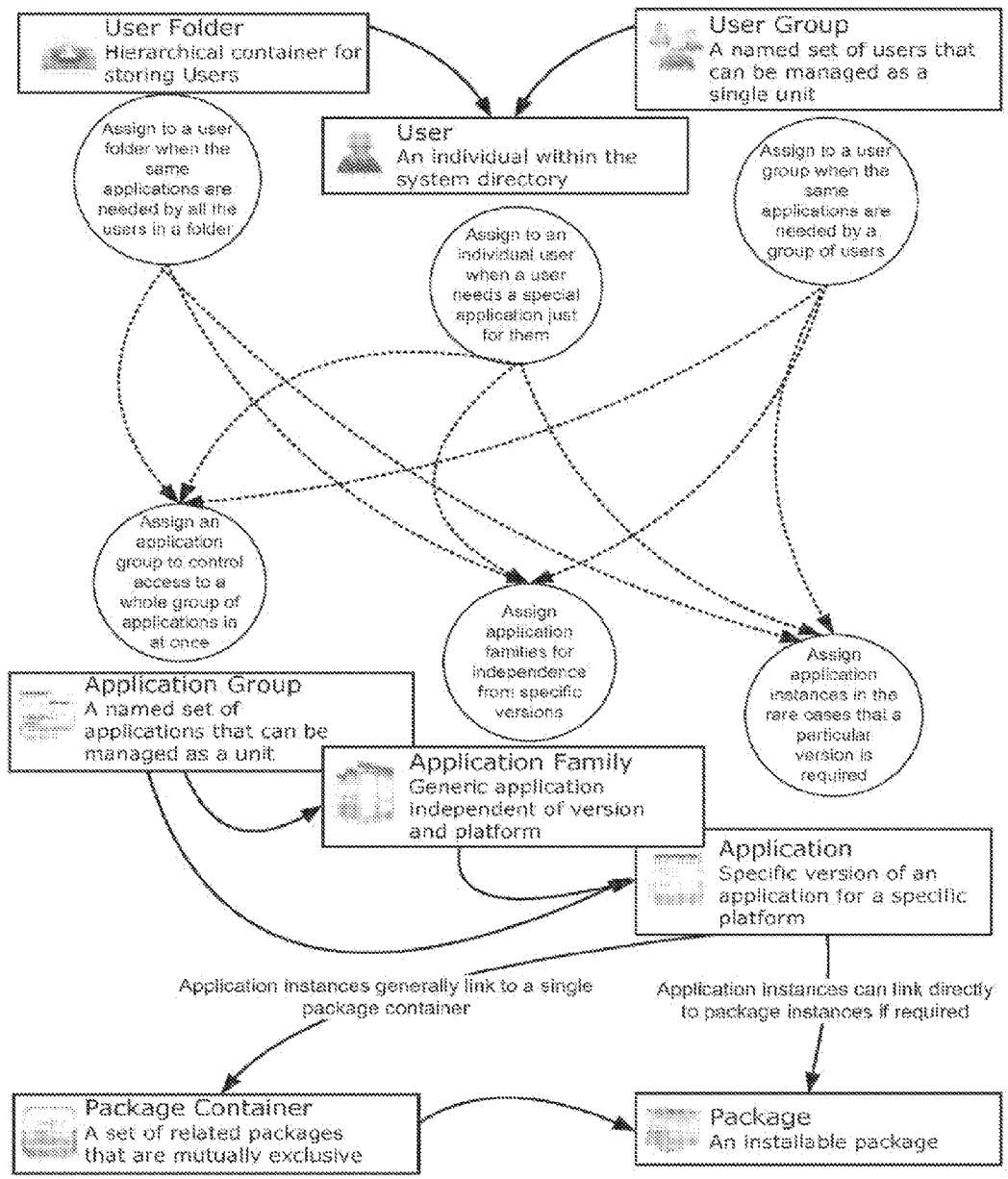

FIG. 12D is an block diagram showing how the abstractions described with reference to FIGS. 12A-12C can be mapped as entitlements. The AWS offers advantages over prior systems in that it decouples the business view from the IT view of delivering applications, and does so in a user centric manner. For some examples:

"Office", "Microsoft Office", "Winzip", "Business application" and "Stuff" are all Application Families. Note that they do not specify:

Platform

Version

Whether local or remote etc.

"Office 2003", "Winzip 9.0" are all Applications. They are specific major versions, and are for platforms.

Applications also contain information that specifies whether they are local or remote. As a result, an Application also embodies the delivery mechanism used for the application.

MSIs are Packages, as are vendor supplied MSIs.

A Package Container is a higher level object for Packages that creates the notion of a group from within which 1 Package can be installed at any time. The Package configuration object contain information describing how to upgrade and remove them in the case that another packages is to be installed.

So, while Application Families and Package Containers are the objects that are assigned (both in terms of an Application Class to a user, and a Package Class to an application instance), the AWS then decides based on the runtime environment which application (and package if a local application) is actually required and installed. This installation information is then stored on the workstation and associated with the users profile to allow for future decisions (such as exclusions) to be made. Applications as modeled in the data model described by FIGS. 12A-12D can contain dependencies and exclusions—dependencies are applications that must be available locally if this application is to be available locally, and exclusions are applications that if already are available locally will prevent this application being made available locally.

The term "Application" or "Package" may be used to refer to the configuration item in the configuration repository representing the application or package or it may refer to the application or package itself, depending upon context. In most cases, this description appends "object" when meaning the configuration item in the configuration repository.

Figure 13:
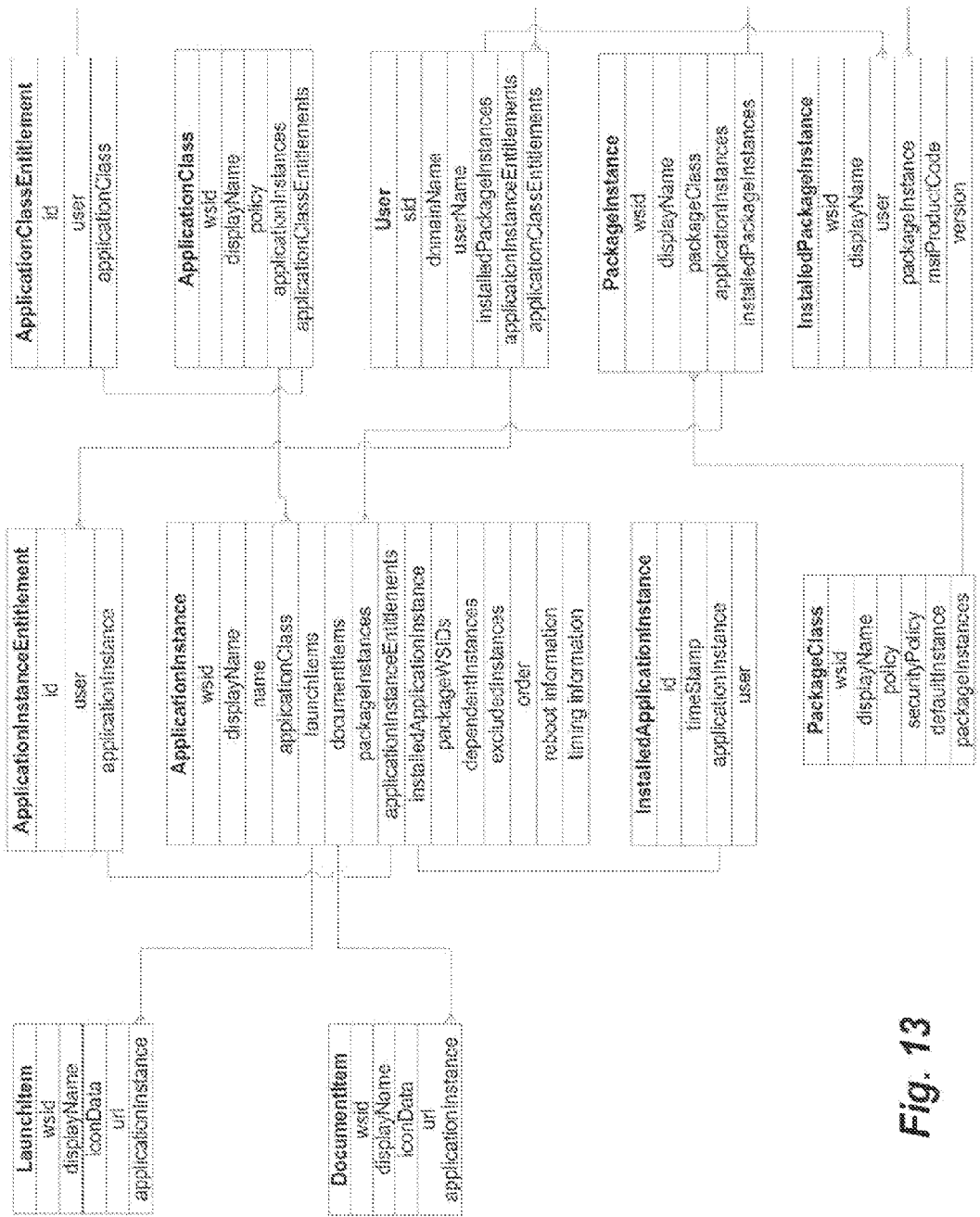
FIG. 13 is a block diagram of the internal data model used by one embodiment of a Node Manager component of an example Application Workspace System.

FIG. 13 is a block diagram of the internal data model used by one embodiment of a Node Manager component of an example Application Workspace System. In this embodiment, the configuration repository is implemented using an LDAP server (see FIG. 7, for example).

User objects are stored in hierarchy within the configuration repository. In an embodiment that uses an LDAP implementation, the AWS uses standard LDAP schema concepts of Organizational Units (OUs) to support this abstraction.

User Group objects contain sets of DNs (Distinguished Names—the LDAP concept of the primary key of an object) pointing to the users in the OU hierarchy, and DNs to application objects, application family objects and application group objects. They exist as LDAP object classes groupOfUniqueNames and pae-UserGroup, stored under ou=Groups, and contain, for example:

cn (Name)
Display Name
DNs of users who are members of the group
DNs of applications
pae-NameValuePairs—strings associated with this group Application groups are groups of DNs pointing to applications in the application Directory Information Tree (an LDAP term referring to an area within the LDAP directory), and may well point to another application group. They exist as LDAP object classes groupOfUniqueNames and pae-ApplicationGroup, stored under ou=Groups, and contain, for example:
cn (Name)
Display Name
DNs of applications
pae-NameValuePairs—strings associated with this group Application objects are chosen based on the policy as held in the application family object. A "policy" is a set of rules that describe which application object a particular application family object resolves to at a particular point in time and at a particular point of use. This policy may be "partially resolved" by the entitlements support of the AWS Web Services (as some parts refer to information that is only known at that point, such as the method of authentication to the AWS), and partially resolved by an AWS Node Manager based on information available locally to the managed workstation (such as packages already installed on the computer).

Policy is stored in the application family object as a goal of entitlements resolution is to resolve an application family object to an application object for that user at that time. While it is possible to assign an application object directly to a user object in the configuration store, this may not be advisable as it may result in the system attempting to do something inappropriate (e.g., installing the wrong application on the wrong operating system), or attempting to provide a remote application when there is no network connectivity, etc.

Examples of policy as expressed for local applications are:
If one is already installed, use that
Always use this one
If nothing else is installed, use this one
Use this one for this particular operating system
Use this one in these particular circumstances
Only install this particular one if this other application class is not installed
For this particular user community, use this remote application
Use this particular remote application if an older version is installed locally The nature of expressing circumstances is through the use of the name-value tuples (e.g., name-value pairs). These name-value pairs are available in the query language, and can form part of the expressions. In addition, the environment and user name-value pairs are available to the expression in the form of expansion variables (that take the form $(Variable)). Finally, some de-facto variables are available, most notably, the key of the application family object in question, and environmental information, such as whether a network connection is present, the IP address and DNS name of the computer, etc.

Each "rule" of the policy exists in an ordered list. This list is then evaluated, in order, with each successful evaluation (i.e., the policy returning a value) resulting in that value being pushed onto the back of a vector which represents the result of processing the policy for that application family object.

Examples using the above policies are as follows.
Example: If one is already installed, use that. Otherwise, application is not available. (applicationClass='$(WSID)' AND installedApplicationInstance IS NOT NULL)
Example: Always use this one.
(wsid='cn=1,0,0,1,ou=MyApp')
Example: If nothing else is installed, use this one, otherwise use the one that is installed.
(applicationClass='$(WSID)' AND installedApplicationInstance IS NOT NULL)
(wsid='cn=1,0,0,1,ou=MyApp')
Example: Use this one for this particular operating system.
(applicationClass='$(WSID)' AND (exists i: (nameValuePairs[i].name='_OS' AND nameValuePairs[i].value='$(OS)')))

A policy has three flavors—LOCAL, REMOTE, ALL/BOTH. The three flavors are because there are two different scenarios when a user can access workSpace:
From a managed workstation that can execute local applications
From an unmanaged workstation that can only access remote applications Policy is structured as follows: PRIORITY:TYPE:USERS:RULE
where:
PRIORITY: the order in which the rule is executed—each item is numbered
TYPE: one of REMOTE, LOCAL or ALL (some implementations use "BOTH")
USERS: applicable users, groups or OUs—this indicates to which users this policy applies
RULE: text of the rule, as above.

Once an application family object has been resolved to an application object, if the application object represents a local application, then package objects must then also be determined and associated with the application because packages are the ultimate item that gets physically installed on the computer to enable the application to function. One reason for the existence of package containers is that, when using Windows Installer Packages (MSIs), it is necessary to remove using the path to the old MSI, and install/upgrade using the path to the new MSI. As a result, the locations of both need to be available at the time of an upgrade, so simply modifying an existing package object to point at a new MSI would not be sufficient. The package containers allow administrators to group together the information needed for such removal.

Packages to be installed locally can be vendor supplied installation packages that do not require any further modification or they can be packages generated by the AWS. An example embodiment of the AWS packaging mechanism splits an application package into three separate parts—SYSTEM (containing shared data that is common across the whole computer system), USER (containing information that is stored for each user), and WSM that contains scripts which can perform configuration tasks when certain events are triggered.

The AWS creates a package using a mechanism of capturing the state of a sample access device (similar in nature to the access device that the package will eventually be installed on). This is not a run-time task, but an administrative task. The application is installed from its source media onto that same access device. The AWS then captures the state of the access device after the install as above has occurred, but applies rules to decide which parts of that install can be classified as "SYSTEM" (i.e., applies to all users and does not require access to any user specific configuration areas on the access device), and which parts can be classified as "USER" (i.e., are user specific, and would need to be added to any user specific configuration areas on an access device before a user was able to properly use that application on that access device). The system contains a default set of rules that may be provided to the Node Manager by the AWS Manager Workbench at the time the package is created, but they can be adjusted if required.

Figure 20:
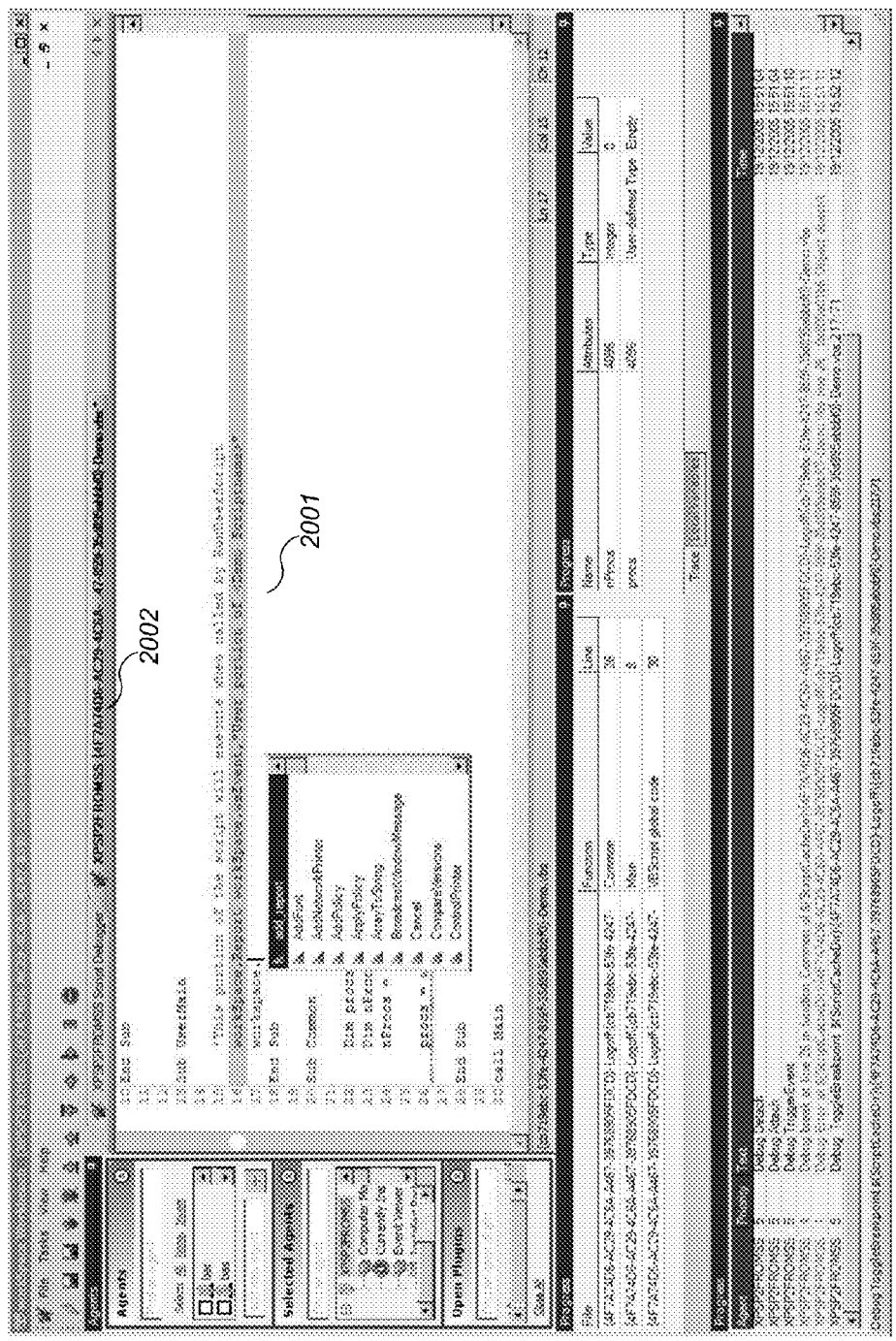
FIG. 20 is an example screen display of a debugger of an example Application Workspace System used to debug a script.

This package can then be adjusted using tools available in the system (the Workbench), and can have scripts added to the package that are triggered by the system when certain events occur (see FIGS. 18-20 described below). Also, this package can be digitally signed by the system to prevent tampering before being delivered to target access devices.

Once adjusted, this package can then be placed in the AWS' package repository—this process also involves configuration data relevant to the package being added to the AWS's configuration database (usually, a replicated LDAP directory).

As mentioned one of the features offered by the AWS application abstraction mechanism is that associations between the concepts of applications and users are actually between users and application families.

Figure 14:
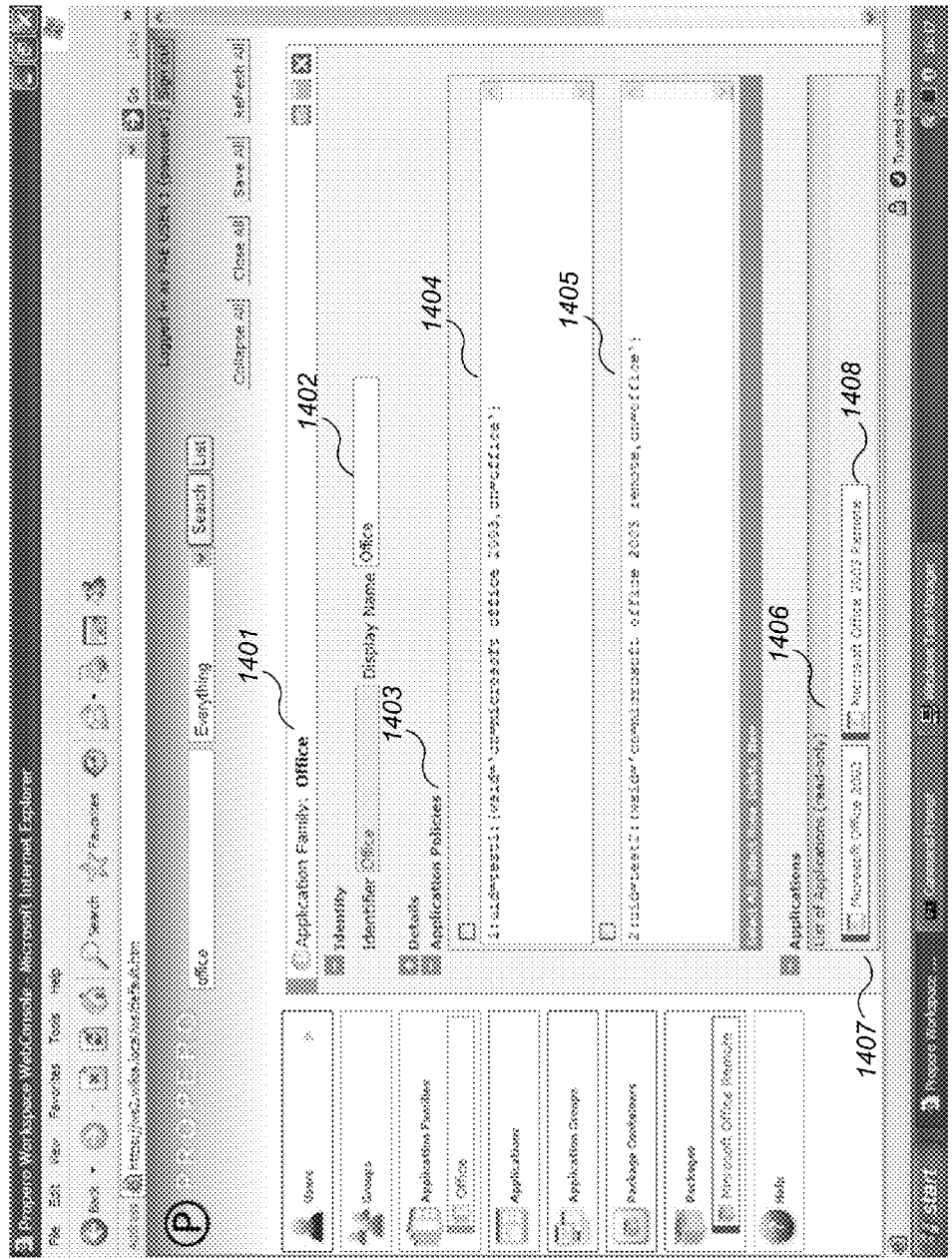
FIG. 14 is an example screen display of a user interface provided by an example AWS Web Services for configuring application family objects in an example configuration repository.
Figure 15:
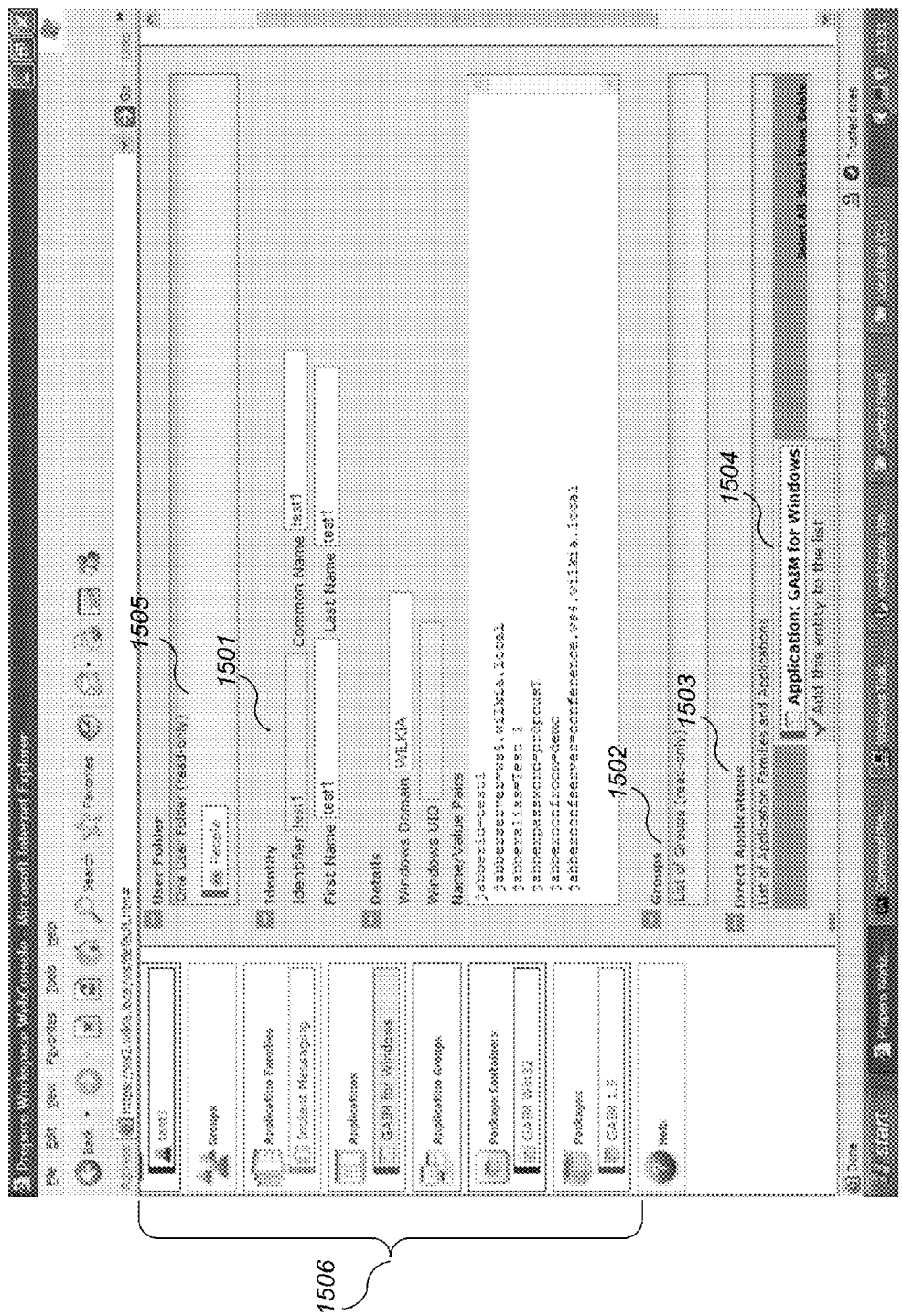
FIG. 15 is an example screen display of a user interface provided by an example AWS Web Services for associating application objects and application families with users in an example configuration repository.

FIG. 14 is an example screen display of a user interface provided by an example AWS Web Services for configuring application family objects in an example configuration repository. It shows a view of an application family 1401 called "Office" 1402 being configured, and two policy blocks 1404 and 1405 (sets of rules) that select a different application based in this instance on username. In this case, user "test1" is assigned a local application 1407 for Microsoft Office 2003 and user "test2" is assigned a remote application 1408 for Microsoft Office 2003.

Administrators can associate application family objects with users, groups etc. by using direct manipulation techniques (such as drag and drop). FIG. 15 is an example screen display of a user interface provided by an example AWS Web Services for associating application objects and application families with users in an example configuration repository. In FIG. 15, an application object 1504 "GAIM for Windows" is begin assigned (associated with) user "test1" 3601. Application families can be assigned in a similar manner. One can observe that the user "test1" 1501 is a member of a user folder 1505 "people" but is not part of any groups 1502. Hyperlinks 1506 provide easy access to other parts of the data model that may be configured.

In one embodiment of the AWS, the association between the user and application family is stored in LDAP as a DN link as an attribute of the user object in LDAP pointing to the Application object in LDAP. Where groups are used, the groups act as a form of intersection between the two objects—that is, they contain a list of DNs to the application objects, and a list of DNs to the users who are members of the group.

Figure 16:
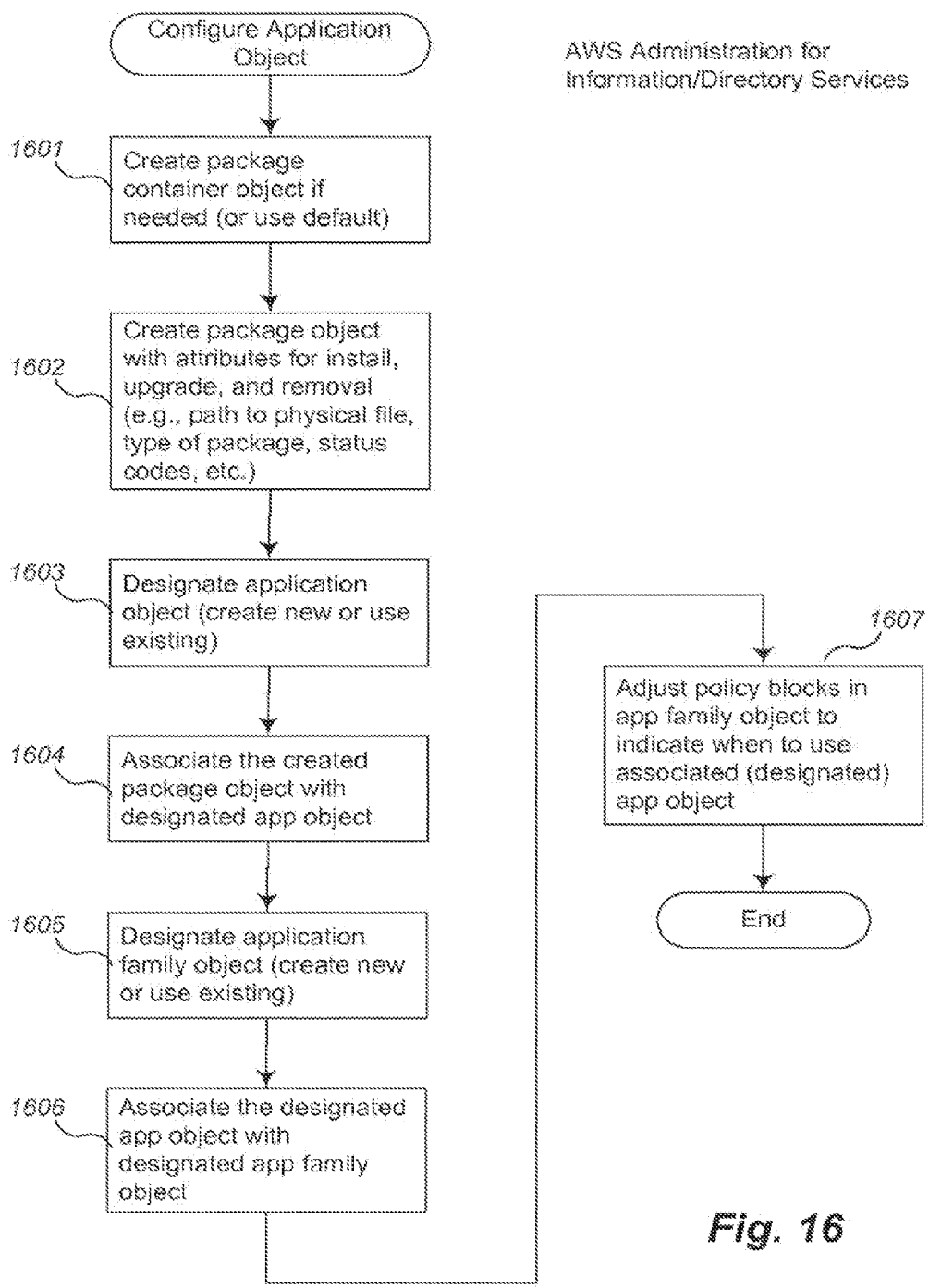
FIG. 16 is an example flow diagram of an administration process provided by an example AWS Web Services for configuring an application object in an example configuration repository.
Figure 17:
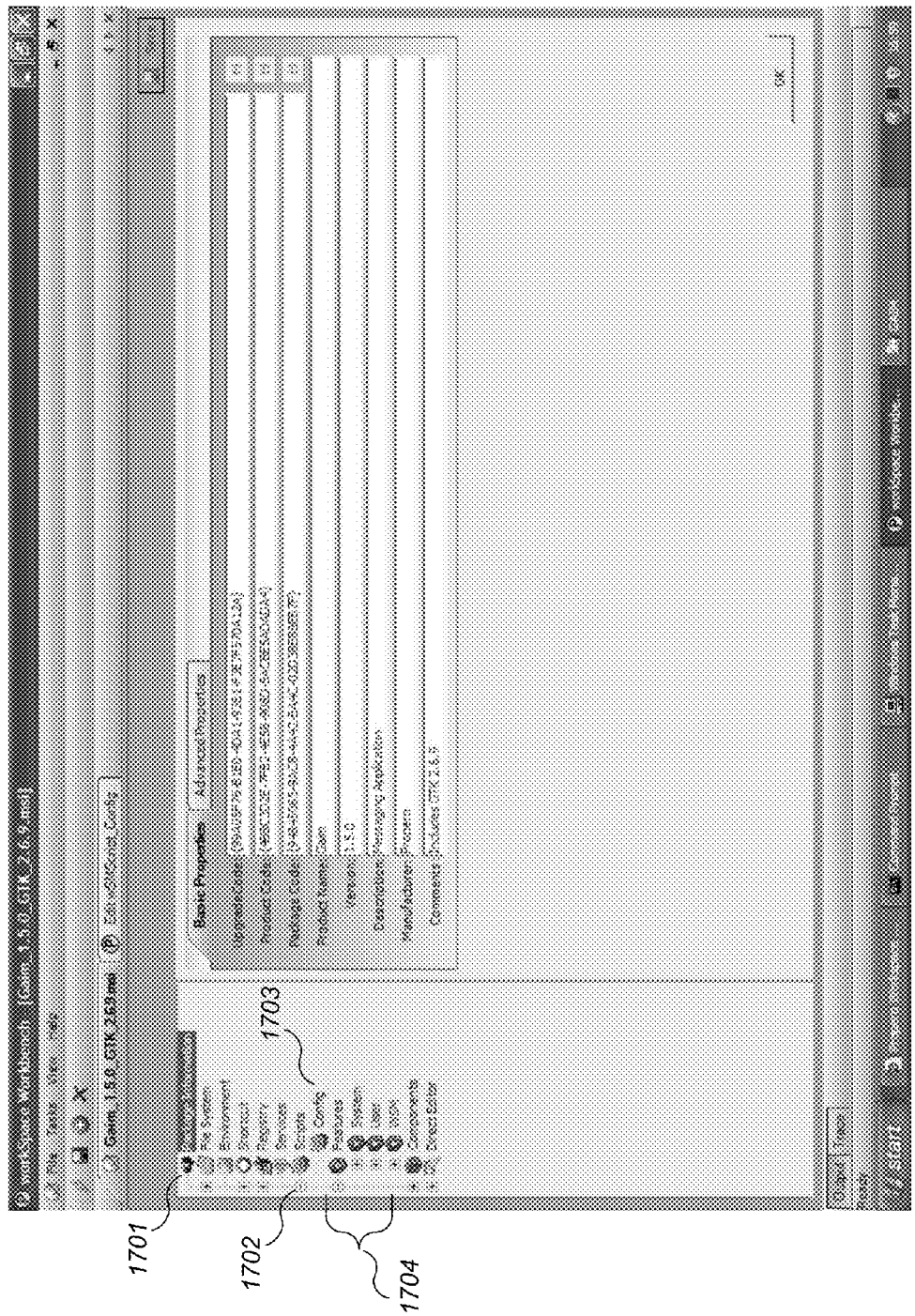
FIG. 17 is an example screen display that shows various properties that can be set for a package.

FIG. 16 is an example flow diagram of an administration process provided by an example AWS Web Services for configuring an application object in an example configuration repository. Typically, an IT administrator would carry out this steps. In step 1602, the administrator creates a package container object if needed or uses a default provided with the system. In step 1602, the administrator creates a package object with all of the attributes for installation, upgrading, and removal of the corresponding application. For example, such attributes may include a path to physical files, the type of package, status codes, or other information. FIG. 17 is an example screen display that shows various properties that can be set for a package. In step 1603, the administrator designates a new or existing application object, and in step 1604 associates it with the created/reused package object. In step 1605, the administrator designates a new or existing application family object, and in step 1606 associates it with the designated application object. In step 1607, the administrator adjusts policy blocks in the application family object to indicate when to use the newly associated application object.

Configuration and personalization of applications either on the managed workstation (i.e., local applications) or on application servers that are participating in the system (e.g., Terminal Servers) occurs when specific events are generated on these computers. In one embodiment of the AWS, a Node Manager component of the (see, for example, Node Manager 410 in FIG. 4) is a daemon process that resides on these computers and that causes the execution of scripts associated with application packages in response to certain defined system events (triggers). The Node Manager daemon is an asynchronous message based component that can respond and deliver events that can execute scripts either with elevated privileges ("root" or "administrator" privileges), or in the context of any user currently logged into the computer. In FIG. 4, the event runtime and script object support 411 is responsible for the event-based script system.

In order for customization to occur, an administrator needs to have defined scripts and associated them with the application object of interest. Adding scripts to a package to be triggered upon events can be performed using the AWS Manager Workbench. As described above, each package has three parts (called features), which include the SYSTEM, USER and WSM features. WSM stands for workSpace Manager, and is the portion into which scripts are stored. In FIG. 17, package information 1701 contains the three portions 1704. The scripts property 1702 is showing one script defined for a CONFIG event 1703.

Figure 18:
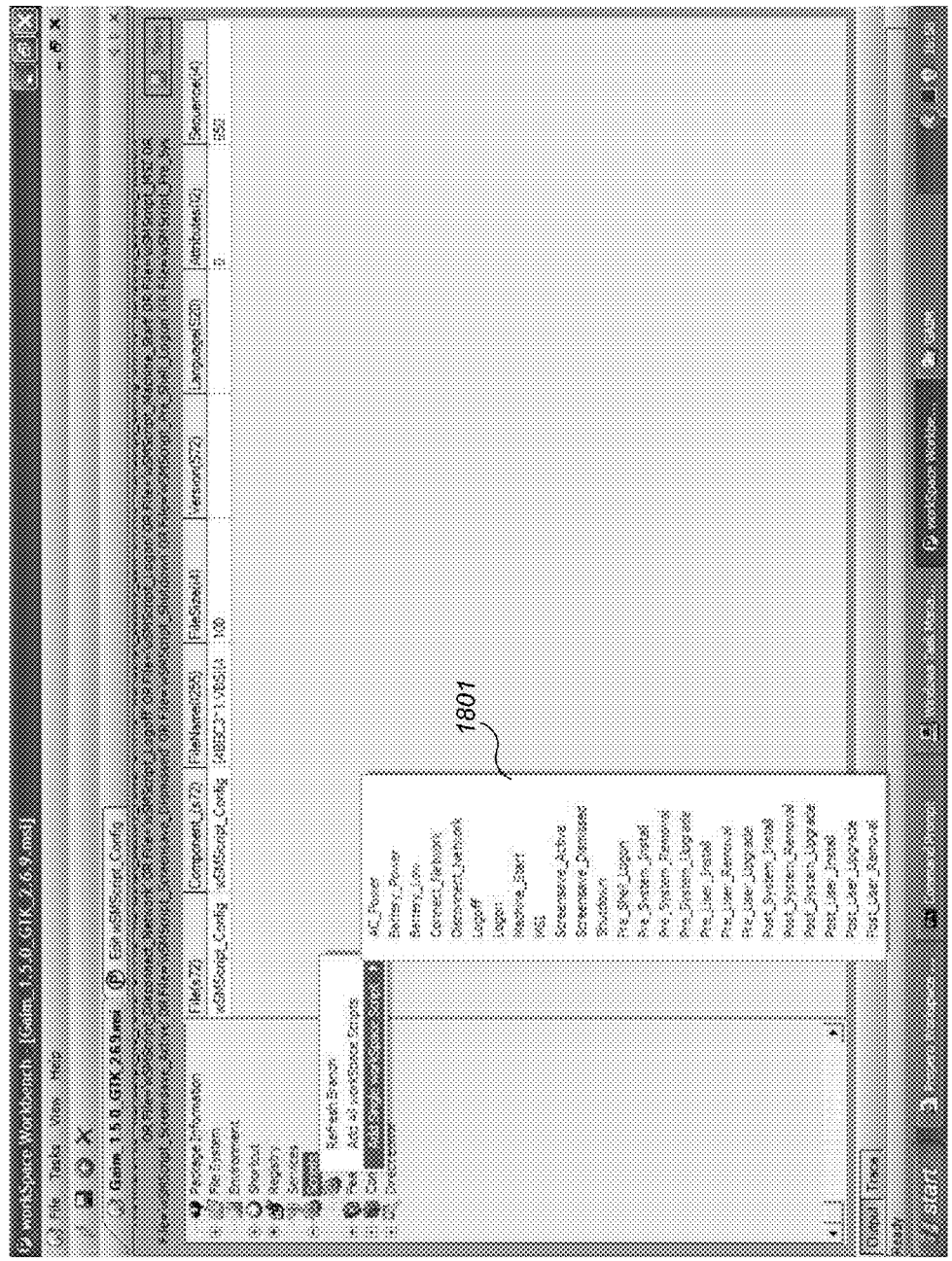
FIG. 18 is an example screen display that illustrates the assignment of a script to a package based upon a pre-defined script events.

FIG. 18 is an example screen display that illustrates the assignment of a script to a package based upon a pre-defined script events. A menu of events 1801 is displayed for adding a single script to the package.

Table 1 below includes explanations for example events which can trigger the execution of scripts associated with an application package:

TABLE 1

| | |
|---|---|
| SCRIPT_EVENT_MACHINESTART | // The Node Manager service has started |
| SCRIPT_EVENT_CONNECTNETWORK | // A network connect SENS event has been received |
| SCRIPT_EVENT_DISCONNECTNETWORK | // A network disconnect SENS event has been received |
| SCRIPT_EVENT_LOGON | // A logon SENS event has been received. This shouldn't<br>// be used for application configuration, but rather system<br>// processing or notifications to be done on logon |
| SCRIPT_EVENT_PRESHELLLOGON | // A user has logged on and profile/session is available, but the shell is not yet started - use this to configure email systems and shell related settings |

TABLE 1-continued

| | |
|---|---|
| SCRIPT_EVENT_CONFIG | // Main configure the package - this usually happens after the shell<br>// has started for apps that are entitled & installed, and<br>// after the final user install for apps that are installed<br>// after the user has logged on. Also triggered for all<br>// installed apps when an "Update my computer" or forced<br>// update occurs. |
| SCRIPT_EVENT_LOGOFF | // A user has logged off |
| SCRIPT_EVENT_PRESYSTEMINSTALL | // System features are about to be installed |
| SCRIPT_EVENT_POSTSYSTEMINSTALL | // System features have been successfully installed |
| SCRIPT_EVENT_PREUSERINSTALL | // User features are about to be installed |
| SCRIPT_EVENT_POSTUSERINSTALL | // User features have been successfully installed. Note that<br>// if this script fails, then the User features will be removed |
| SCRIPT_EVENT_PRESYSTEMUPGRADE | // System features are about to be upgraded (repaired) |
| SCRIPT_EVENT_POSTSYSTEMUPGRADE | // System features have been successfully upgraded (repaired) |
| SCRIPT_EVENT_PREUSERUPGRADE | // User features are about to be upgraded (repaired) |
| SCRIPT_EVENT_POSTUSERUPGRADE | // User features have been successfully upgraded (repaired) |
| SCRIPT_EVENT_PRESYSTEMREMOVAL | // System features are about to be removed (for major upgrade) |
| SCRIPT_EVENT_POSTSYSTEMREMOVAL | // System features have been successfully removed (for major upgrade) |
| SCRIPT_EVENT_PREUSERREMOVAL | // User features are about to be removed (for major upgrade) |
| SCRIPT_EVENT_POSTUSERREMOVAL | // User features have been successfully removed (for major upgrade) |
| SCRIPT_EVENT_STARTSCREENSAVER | |
| SCRIPT_EVENT_STOPSCREENSAVER | |
| SCRIPT_EVENT_ACPOWER | |
| SCRIPT_EVENT_BATTERYPOWER | |
| SCRIPT_EVENT_BATTERYLOW | |
| SCRIPT_EVENT_SHUTDOWN | |

Note that scripts have access to all of the tuples (e.g., name-value pairs) configured for that package in the configuration repository, as well as tuples for all applications already installed on the local computer (so that application level settings can be shared), as well as tuples configured for that user and associated groups. (There are a number of different precedent orders that can be applied when merging the set of tuples to deal with tuples that have the same name). These tuples typically exist as a multi-valued string attribute on each object in the configuration repository.

By nature of being able to manage, configure and supply configuration information via these tuples stored in the AWS configuration repository, the AWS as a whole is able to deliver, manage, configure and personalize applications for users. For example, a script that responds to changes in the network state could change the default document location of a word processor to the user's home directory on a network server if the network is present, and to a local directory on the computer when the network is no longer present.

Figure 19:
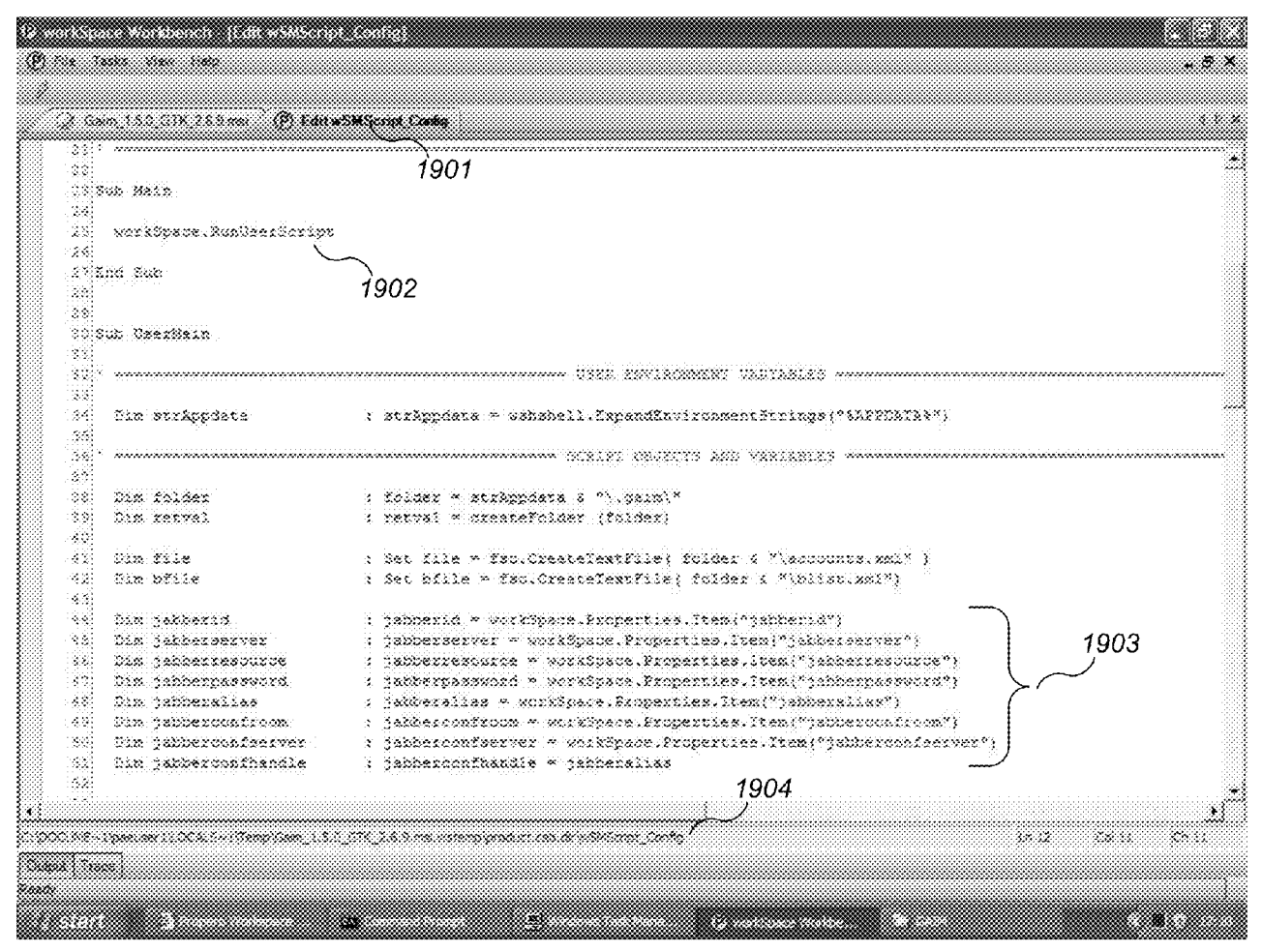

FIG. 19 is an example screen display of a script used to configure applications. It illustrates a script being edited by an administrator—in this instance, it is a CONFIG script (the most commonly used script event), as can be observed from the name of the script 1901 and pathname 1904. This screen display also demonstrates the use of an AWS script object to access tuples 1903 defined for the user. The use of tuples by scripts is described with reference to FIGS. 34 and 35.

Of note, the scripts execute in an environment that allows full remote debugging of their execution, even though they are asynchronously triggered. FIG. 20 is an example screen display of a debugger of an example Application Workspace System used to debug a script. In addition, the AWS supports an Application Programming Interface ("API") for script object capabilities. An explanation of the API for script objects is included in Appendix D, which is hereby incorporated by reference in its entirety.

The AWS Node Manager implements an asynchronous event handler for invoking appropriate application scripts when an event is triggered. Events can be system triggered or defined by the AWS. In one embodiment, events are triggered by four distinct mechanisms:

WMI—"Windows Management Instrumentation" which is a Windows Mechanism that allows processes to subscribe to particular Windows events. The AWS Node Manager subscribes to ones pertaining to (but not limited to) process start/stop and print job creation.

SENS—"System Event Notification Services" which is a Windows mechanism for dealing with processes that need to react to specific hardware or session events. The AWS Node Manager subscribes to logon, logoff, shell start and power state changes.

Process injected events—AWS Node Manager ships with a component called WSUTIL that when executed will inject an event into the executing Node Manager process. For example, WSUTIL can be scheduled with the Windows scheduler to trigger an event at a specific time on a specific date.

WSSM—This term refers to the portion of the AWS Node Manager which runs in USER space. For example, in one embodiment the WSSM runs as the Node Manager Message Support 421 in FIG. 4. This is called out as a separate event creation component, because, by the very nature of it being executed (as it is configured into the Windows registry as a replacement for the Windows shell), the script knows that an actual logon and shell start has been requested by Windows. As a result, the script can trigger events into the executing Node Manager process. For example, the entitlements resolution process is actually triggered by Windows starting WSSM (and hence WSSM knowing that a user logon has occurred).

Other types of events can be similarly integrated.

Each time one of these external events occurs, an external event handler (e.g., a WMI subscriber, a SENS subscriber etc.) calls the Node Manager daemon process (either through an internal API or by invoking WSUTIL) with the name of the event (see SCRIPT_EVENT_XXX definitions), specifies the target queue/service name as the script service ("ScriptManager" with ID "{E8F61878-8DA6-494c-829D-017773AF1F05}"), and builds a parameter block if appropriate containing parameters for the event (e.g., a network connect event may indicate which interface was connected at which speed).

Figure 21:
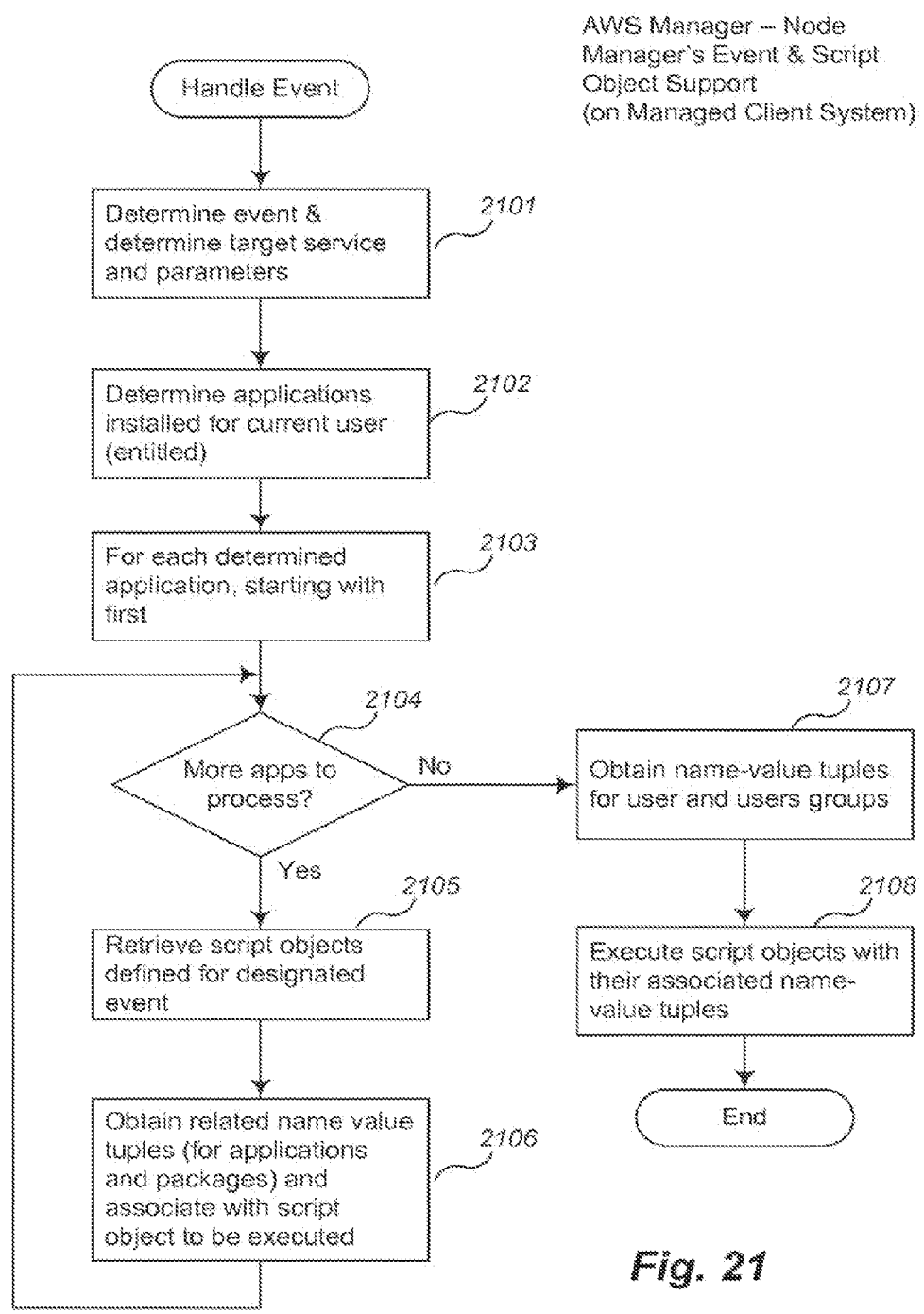
FIG. 21 is an example flow diagram of an event handling and script invocation mechanism provided by the client side of an example Application Workspace System.

FIG. 21 is an example flow diagram of an event handling and script invocation mechanism provided by the client side of an example Application Workspace System. In an example embodiment, this handler is invoked as a part of the ScriptManager service. In step 2101, the handler determines the event, a target service, and the various parameters stored in the created parameter block. In step 2102, if a user identification is supplied, the handler determines what applications have been installed for that user. The purpose of this check is to provide the Node Manager from invoking scripts for applications present on the computer but not entitled to the user. In steps 2103-2106, the handler performs a loop to retrieve the script objects defined for each application for the detected event. Specifically, in step 2103, the handler starts the loop relative to the first application. In step 2104, the handler looks to see if there is a current application to process and, if so, continues in step 2105, otherwise exits the loop to step 2107. In step 2105, the handler retrieves the script objects defined for the designated events.

In particular, the script name for a package that is part of an application is stored in the installed database (on the managed computing device), as it was an attribute of the package object that led to the installation of that package. Each script is stored in a sub directory named according to the external event type. For example, if a package had a script name of "TEST", and defined a script for STARTSCREENSAVER and STOPSCREENSAVER, then the actual files on the disk would look like:

C:\Program Files\Propero\workSpace\Scripts\STARTSCREENSAVER\TEST.VBS

C:\Program Files\Propero\workSpace\Scripts\STOPSCREENSAVER\TEST.VBS

By querying the installed database, the Node Manager can build a list of script names to execute. By examining the name of the event as passed to it, it can identify the directory in which to find the scripts. Thus it is able to execute the correct scripts for the event. If no username is passed in, then the Node Manager by default will execute all the scripts for that event.

In step 2106, the handler obtains the relevant name-value tuples that correspond to the applications and their associated family objects and associates them as appropriate with the scripts. The handler then returns to the beginning of the loop in step 2104. In step 2107, when all applications having scripts triggered by the current event have been handled, then the handler obtains name-value tuples for users and for the user's groups. Finally, in step 2108, the accumulated script objects are executed.

In order to be able to provide personalized customization for the applications, each script needs to have access to the correct tuple set for the user, for that application. Therefore, for each script that is executed, a set of tuples (also referred to as NVPs, or Name Value Pairs) is compiled that the script can access.

The installed database records all the tuples associated with users, application objects (and the associated application family object that resolved to that application object) and package objects that Node Manager has installed. These are stored in the installed database with their owning object, allowing the Node Manager to build different sets of tuples at different times. (These sets are refreshed every time Node Manager reads an entitlements document thus allowing new configuration values that administrators may set in the configuration repository to be used even if the application/package has already been installed.)

Therefore, whenever a script needs to be executed, NM builds a set of tuples from the installed database that is correct for that package. The precedence order of building this set is as follows:

1. User (this will includes ones from the user's groups)
2. Package (this particular package for which the script is about to be executed)
3. Applications (all applications that have been configured on this computer for this user)

This set is available to the script as part of an AWS script object.

Figure 22:
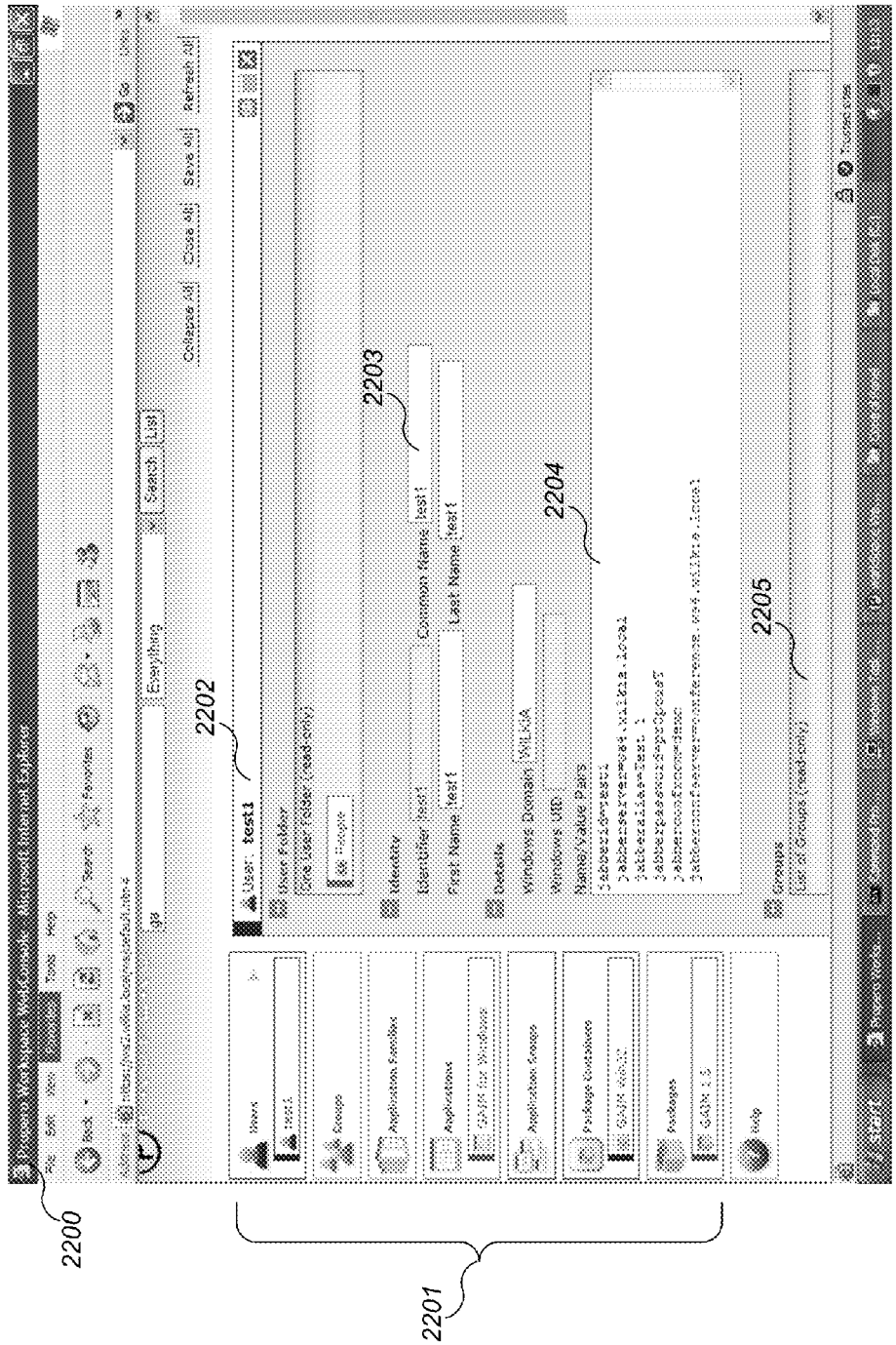
FIG. 22 is an example screen display illustrating user level name value tuples usable by AWS scripts.
Figure 23:
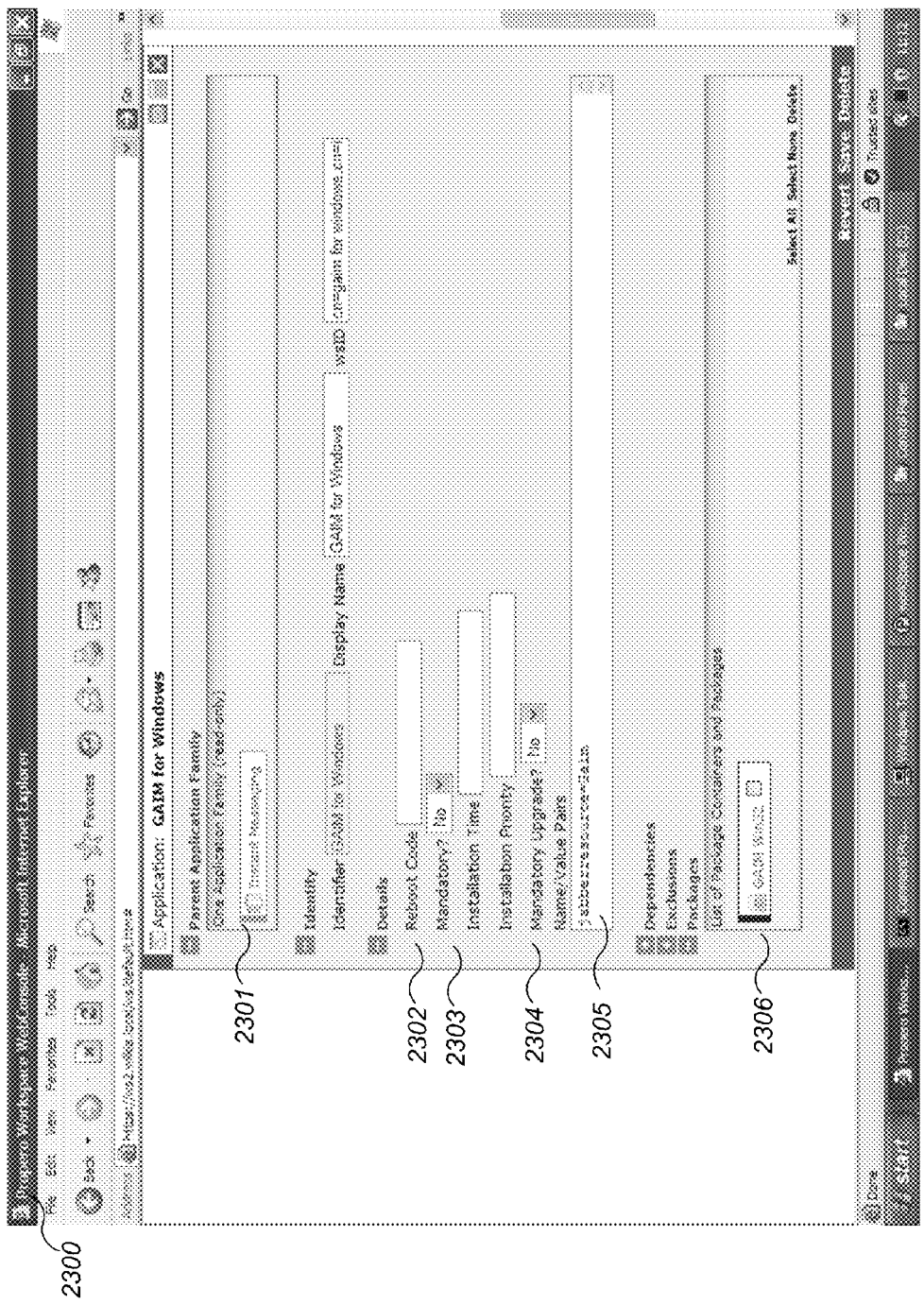
FIG. 23 is an example screen display illustrating application level name value tuples usable by AWS scripts.

FIG. 22 is an example screen display illustrating user level name value tuples usable by AWS scripts. In FIG. 22, multiple name-value pairs 2204 have been associated with the user "test1" 2202. FIG. 23 is an example screen display illustrating application level name value tuples usable by AWS scripts. Name-value pairs 2305 contain one value "jabberresource=GAIM" 2305. Note that other details regarding configuring this application are also present as parameters 2302-2304.

Appendix C, incorporated herein by reference in its entirety, provides an example Visual Basic script that configures GAIM Instant Messaging for each user. This is the script used in FIGS. 8A-8F and 9A-9L. The script accesses tuples to write configuration files for GAIM. The per-user tuples are "jabberid, jabberserver, jabberalias, jabberpassword, jabberconfroom, jabberconfserver." The application level tuple in this instance is "jabberresource," (Note that for the sake of this example, plain credentials have been used. Normally, these would be encrypted). These are the same tuples shown in FIGS. 23 and 22.

Referring back to FIG. 6, once all of the various administration of applications and users has taken place and the entitlements have been stored in the configuration repository for one or more users, applications, application families, etc., it is possible for the AWS to perform its automatic configuration and personalization when the relevant events are on a managed computing device. Steps 602-604 overview what happens when a logon event triggers, thereby triggering the WSUTIL script described above. Specifically, upon receiving notice that a user has logged on, the AWS performs entitlements resolution to figure out which applications to install/ upgrade, automatically installs/upgrades certain applications, and presents a user interface to the user for further installation and/or upgrade.

Entitlements resolution is the overall decision process that takes information stored in the AWS configuration repository and decides which applications a user is allowed to use, over which delivery mechanisms, and at the point of use. Thus, entitlements resolution is central to providing a virtual workspace. The AWS resolves the application families that are assigned to a user into the actual applications that are to be used at the point in time they are being requested, whether local or remote.

In one embodiment, entitlements resolution is performed by an AWS Node Manager querying the Entitlements Support and Information Services components for entitlement information and then performing a rules-based set of actions as described above in the discussion regarding policy.

Entitlements resolution is typically performed whenever a new user logs into the system as described with reference to FIG. 6, however, refreshing this information can be done at any time. For example, an event that refreshes the user's entitlements and associated information can be triggered from scripts, the command line, or from menu options within the user interface of an AWS Node Manager.

Figure 24:
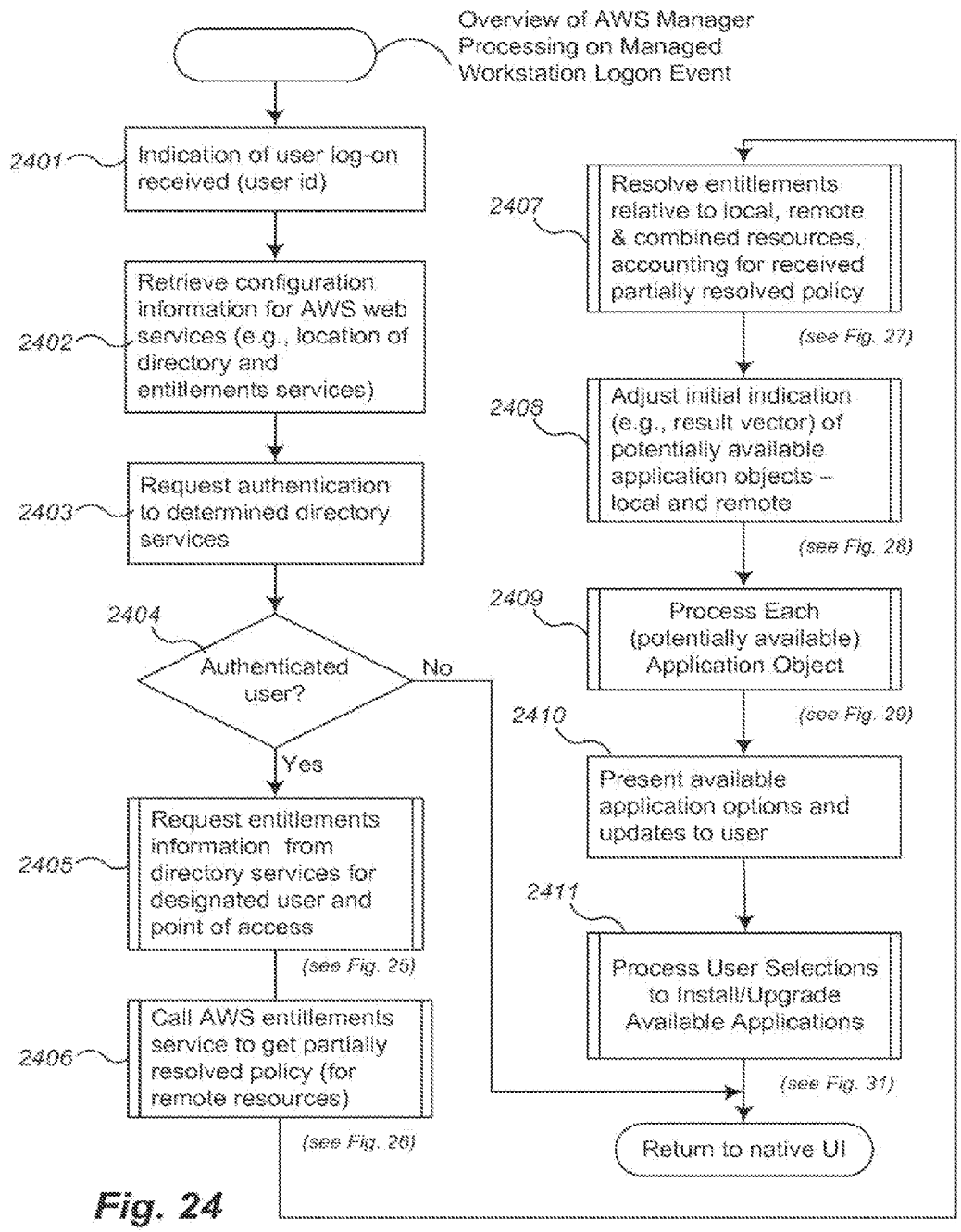
FIG. 24 is an example overview flow diagram of processing performed by the client side of an example Application Workspace System when a logon event is detected on a managed computing device.

FIG. 24 is an example overview flow diagram of processing performed by the client side of an example Application Workspace System when a logon event is detected on a managed computing device. As mentioned, the processing is typically performed by a Node Manager component of an AWS Manager executing on a managed computing device. FIGS. 25-31 describe the details of the steps illustrated in FIG. 24. Specifically, in step 2401, the Node Manager determines a user ID, typically from the login event. In step 2402, the Node Manager retrieves configuration information to determine the location of the information (directory) services and entitlements services. In step 2403, the Node Manager requests authentication of the indicated user ID from the determined directory service. In step 2404, if the user authenticates, then the processing continues in step 2405, otherwise, the Node Manger typically returns control to the native UI, for example the Windows desktop. In step 2405, the Node Manager requests entitlements information from the directory (information) services for the designated user and point of access. The process for generating this information on the server side is described further below with respect to FIG. 25. In step 2406, the Node Manager requests the AWS entitlements support of the AWS Web Services to generate a partially resolved policy for the remote resources. The steps for generating a partially resolved policy are described further below with respect to FIG. 26. In step 2407, the Node Manager resolves the (received) entitlements information relative to local, remote, and combined resources accounting for the received partially resolved policy. The details of this process are described further with respect to FIG. 27. A results vector of potentially available application objects is available at this time. In step 2408, the Node Manager adjusts the initial indication of potentially available application objects. The details of this process are described further with respect to FIG. 28. In step 2409, the Node Manager initially processes each potentially available application object to eliminate exclusions, account for dependencies, and to automatically configure applications that result in mandatory installation. The details of this process are described further with respect to FIGS. 29A-29B. In step 2410, the available applications are presented as options for downloading and configuring if desired. Any user selections of such options potentially result in the Node Manager installing/upgrading an application. In step 2411, the routine processes the user selections, completes, and control is returned to the native operating system.

Figure 25:
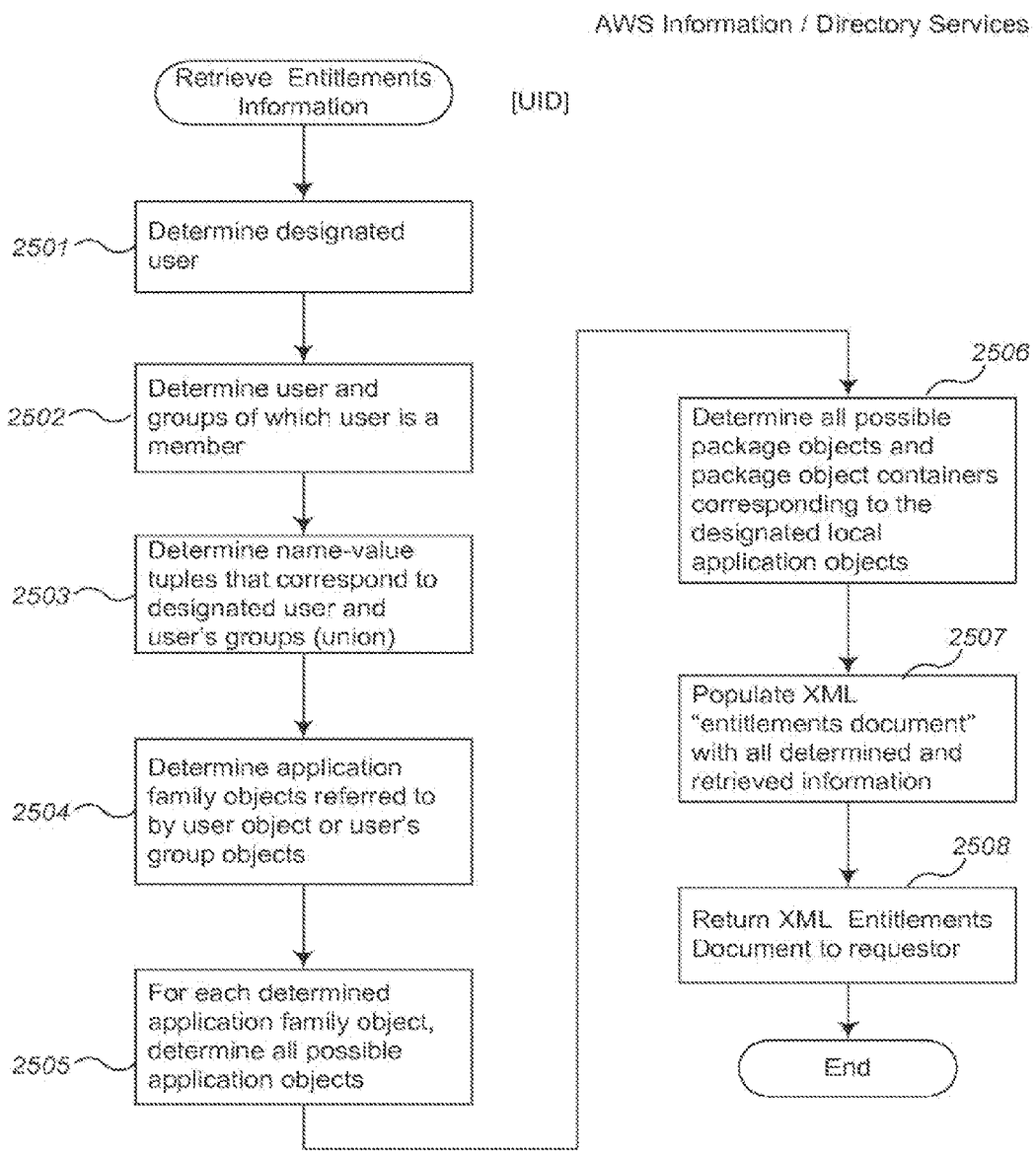
FIG. 25 is an example flow diagram of processing performed by an example web services component of an example Application Workspace System to retrieve entitlements information from a configuration repository.

FIG. 25 is an example flow diagram of processing performed by an example web services component of an example Application Workspace System to retrieve entitlements information from a configuration repository. The entitlements information is typically stored as an XML document. As mentioned, the Node Manager may request the entitlements information from a directory (information) services component of the AWS Web server, such as information services 313, through entitlement support 311 in FIG. 3. The information service retrieves the entitlements information from the configuration repository and returns it via an XML document. Note that other forms of recording the information could also be supported.

Specifically, in step 2501, the service determines the designated user, either from the request itself (via optional parameter <UID>) or implicitly from an authentication request. In step 2502, the service determines which user the user ID corresponds to (the designated user) and retrieves the groups the user is a member of from the configuration repository. In step 2503, the service determines the name-value tuples that correspond to the designated user and the user's groups. In step 2504, the service determines which application family objects have been associated with the designated user or the designated user's groups. In step 2505, the service determines all of the possible application objects that could be available to the designated user by looking at the application object associations of each determined application family object. In step 2506, the service determines all of the possible package objects and package object containers that correspond to the determined application objects that are local. In step 2507, the service populates an output report, here an XML "entitlements document" with all of the determined and retrieved information from the configuration repository. In step 2508, the output report is returned to the request, and the processing completes.

Thus, after processing, in the example embodiment, the information stored in the XML entitlements document includes:
User name, and any other user attributes, and tuples associate with the user;
Groups the user is a member of, and tuples associated with those groups;
All Application Family Objects the user is entitled to (whether by a direct assignment, or via a group membership), with their associated attributes including tuples.
All Application Objects that could possibly be resolved to by the Application Family Objects above, with their associated attributes including tuples.
All possible Package Objects (and Package Container Objects) that may be used by the Application Objects above, with their associated attributes including tuples.
Confidential information is preferably encrypted.

Appendix A, incorporated herein by reference in its entirety, is an example entitlements document stored as an XML document.

Figure 26:
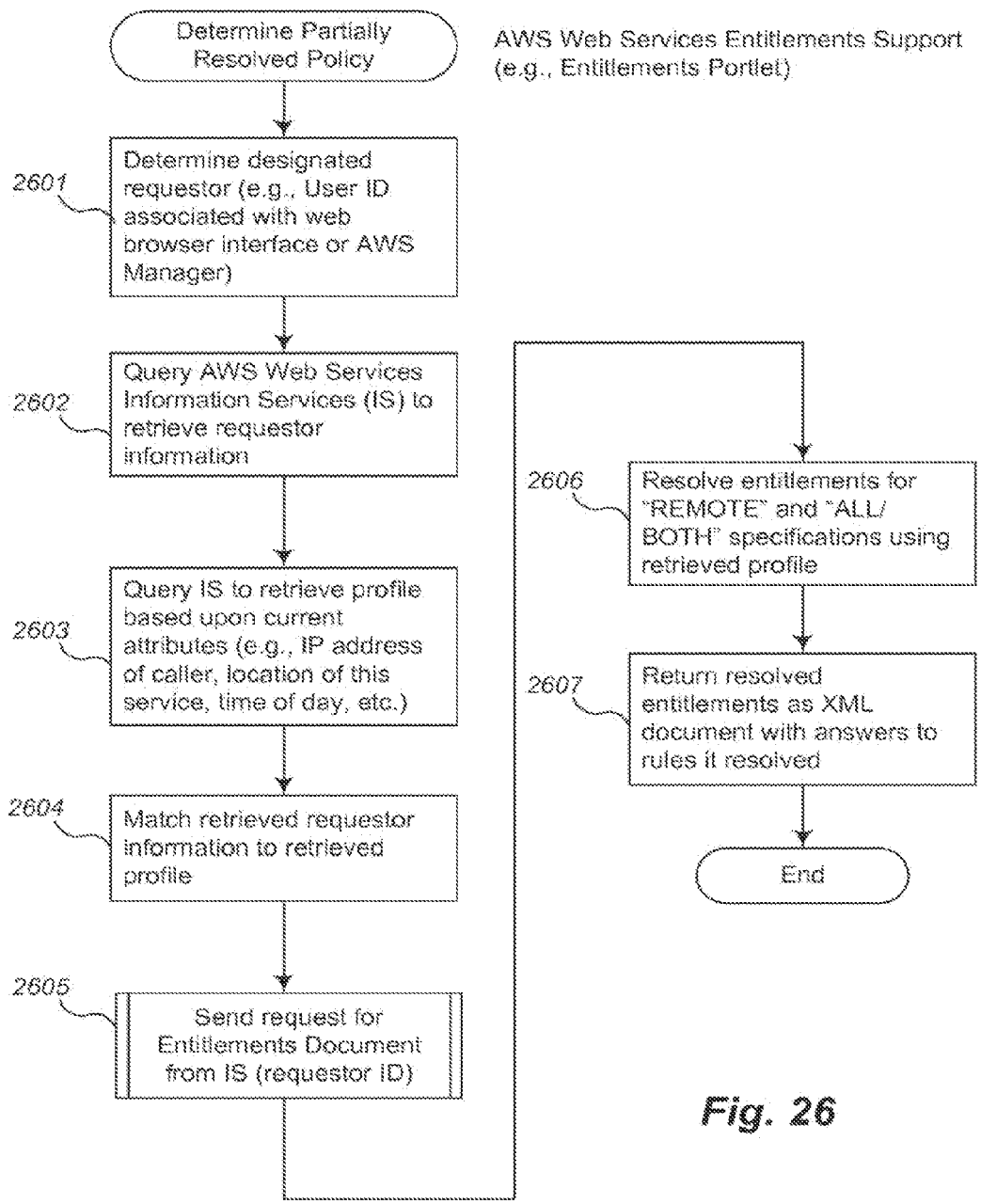
FIG. 26 is an example flow diagram of processing performed by an example web services component of an example Application Workspace System to resolve entitlements for remote applications.

FIG. 26 is an example flow diagram of processing performed by an example web services component of an example Application Workspace System to resolve entitlements for remote applications. This processing may be performed, for example, by the entitlements support 311 of the AWS Web Services 310 in FIG. 3. This process is sometimes referred to as building a partially resolved policy document and was invoked, for example, in step 2406 in FIG. 24. Partially resolved policy documents are produced for remote applications by the AWS Web Services, and for local applications by an AWS client process such as the Node Manager. In the described embodiment, the Node Manager subsequently puts the two partially resolved policy results together to fully resolve the policy (i.e., evaluate the rules in the entitlements document). Partially resolved policy for remote applications is retrieved from the AWS Web Services as there are certain aspects of remote policy that use what is termed a "profile" to choose the correct application object. A profile may depend on information such as the IP address of the caller, where the entitlements service is physically, time of day etc. These values may be subsequently used in the REMOTE policy statements being evaluated. For example, a particular profile may only be active during working hours, and if outside working hours, the service will not return that application object in the partially resolved policy document.

Specifically, in step 2601, the service determines the designated requestor (typically a user ID associated with the web browser interface or the AWS Manager). In step 2602, the service requires the information services component (which interfaces to the configuration repository) to retrieve information specific to the requestor. In step 2603, the service queries the information services component to retrieve a profile based upon a set of current attributes, as described above. In step 2604, the service matches the retrieve requestor information to the retrieved profile to make sure the profile is applicable. At this point, in step 2605, the entitlements support sends a request to the Information Services (e.g., the LDAP support) to obtain an entitlements document (as described with reference to FIG. 25) based upon the user ID associated with the designated requestor. When the entitlements document is received, then in step 2606, the service resolves all of the policy rules for "REMOTE" and for "ALL" or "BOTH," using the retrieved profile. In step 2607, it then returns the entitlements document with answers to the rules it resolved to the requestor.

Note that although many of these service routines are shown in the flow diagrams as sequential steps, it is to be understood that many of these services are written as asynchronous event handlers that process requests and data as they arrive. Equivalent synchronous flows are correspondingly incorporated.

At this stage, the entitlements document retrieved from the AWS Information Services contains a list of application family objects that have been assigned to the user or via group memberships, and the partially resolved policy document from the entitlements support contains a partial resolution of the policies contained in the entitlements document. The next step is for the AWS Node Manager to resolve these entitlements into vectors of possible application objects. The reason that vectors are used, rather than single items, is to provide alternatives if a user does not select the most appropriate application (e.g., the one at the beginning of the vector). If another application is available, then the Node Manager will use it instead. For example, if a local install of an application is not desired, and a remote one is available, then the Node Manager will make available the remote application.

Figure 27A:
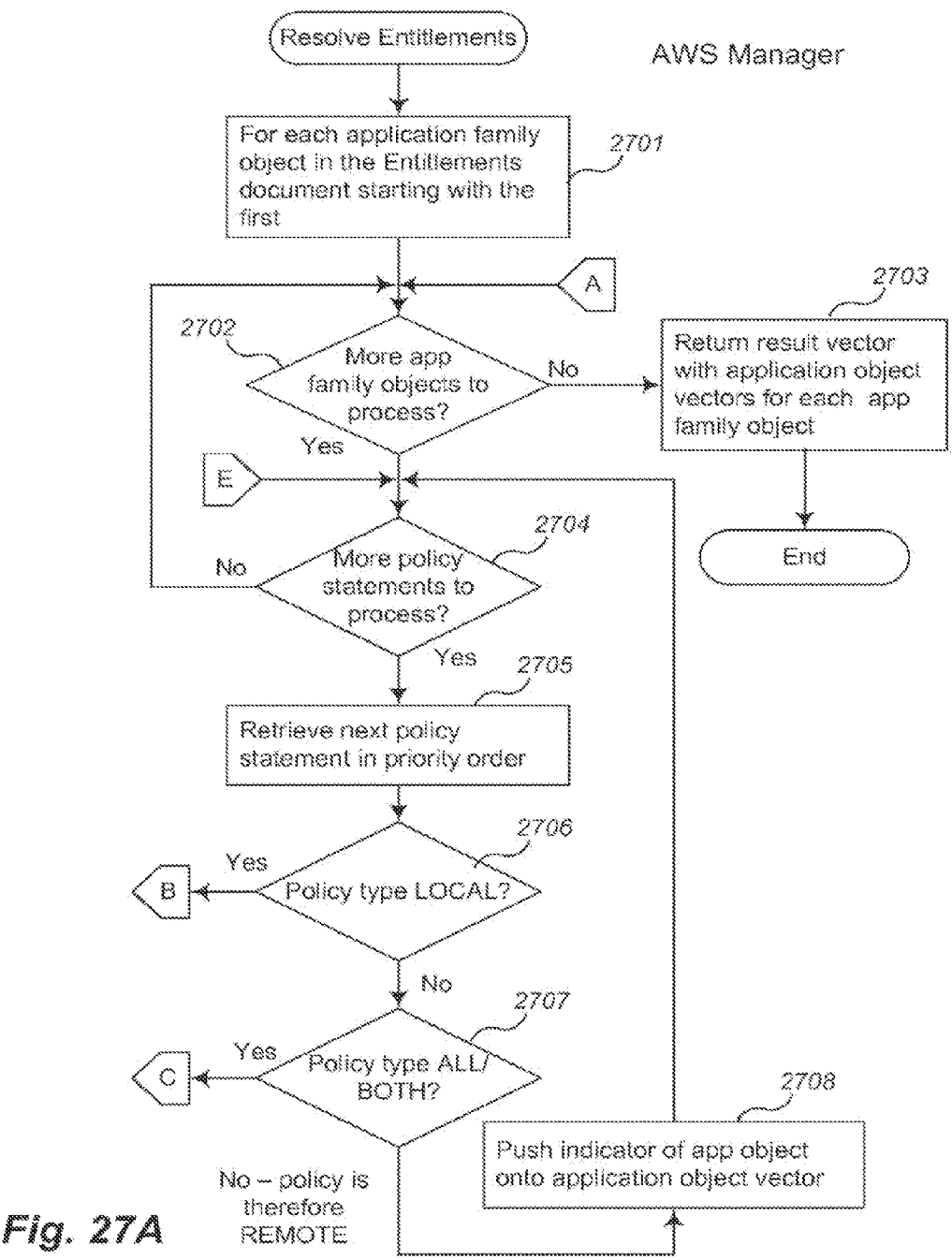
FIGS. 27A-27B are an example flow diagram of processing performed by an example client component of an example Application Workspace System to resolve entitlements for a managed computing device.
Figure 27B:
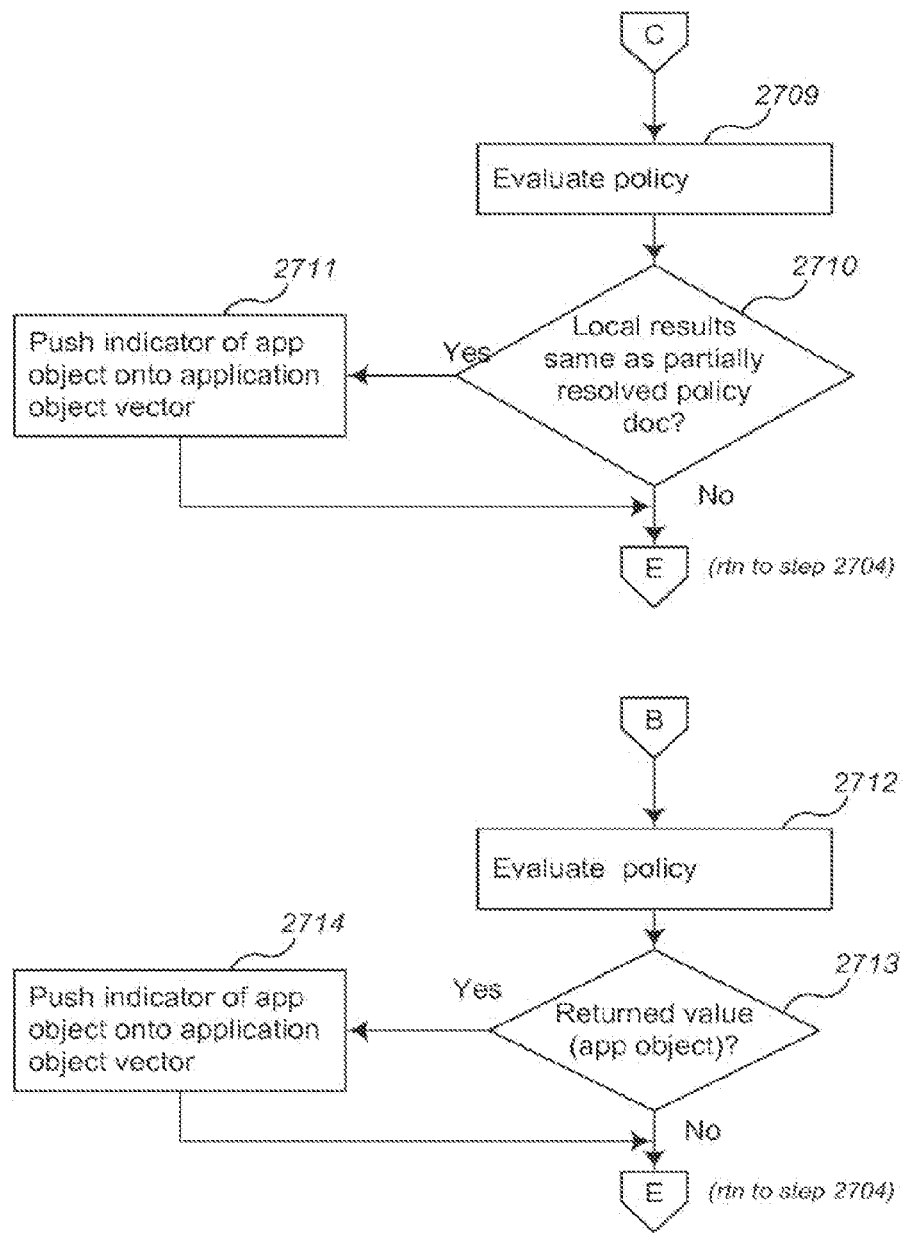

FIGS. 27A and 27B are an example flow diagram of processing performed by an example client component of an example Application Workspace System to resolve entitlements for a managed computing device. This is the processing that puts together the prior partially resolved policy with Node Manager resolved policy, and may be performed, for example by the Node Manager component of an AWS Manager. It may be invoked, for example, from step 2407 of FIG. 24.

In summary, the routine performs a loop on each application family object found in the entitlements document and evaluates each corresponding policy resolving the results where appropriate with the information returned by the partially resolved policy document. Specifically, in step 2701, the routine processes each application family object starting with the first. In step 2702, the routine determines whether there are more application family objects to process, and, if so, continues in step 2704, else continues in step 2703. In step 2704, the routine determines whether there are more policy statements to process, and, if so, continues in step 2705, else returns to the top of the outer loop to obtain the next application family object to process. In step 2705, the routine evaluates the next policy statement in priority order. In step 2706, if the policy statement is tagged as "LOCAL", then the routine continues in step 2712. If in 2706, the policy is not tagged as "LOCAL," then in step 2707, then determines whether the policy statement is tagged "ALL" (or "BOTH" in some versions). If so, then the routine continues in step 2709, otherwise continues in step 2708. In step 2708, the policy statement is tagged "REMOTE," and the routine looks up the corresponding result in the partially resolved policy document (to make sure there is a value), pushes an indicator to the resulting application object onto the application object vector, and returns to process the next policy statement in step 2704.

In step 2709, the routine has determined that the policy statement is tagged "ALL" or "BOTH." It evaluates the policy and then in step 2710 compares the resulting value with the value returned by the remote results communicated in the partially resolved policy document. In step 2711, if the results match, then the routine pushes an indicator to the resulting application object onto the application object vector, and returns to process the next policy statement in step 2704.

In step 2712, the has determined that the policy statement is tagged "LOCAL." It evaluates the policy and then in step 2713 determines whether the evaluation resulted in an application object (it succeeded). If so, in step 2714, the routine pushes an indicator of the resulting application object onto the application object vector associated with the current application family object, and returns to process the next policy statement in step 2704.

Once all of the entitled application family objects have been processed and all of the respective policies, then the routine returns a result vector (step 2703) with application object vectors for each application family object.

Figure 28:
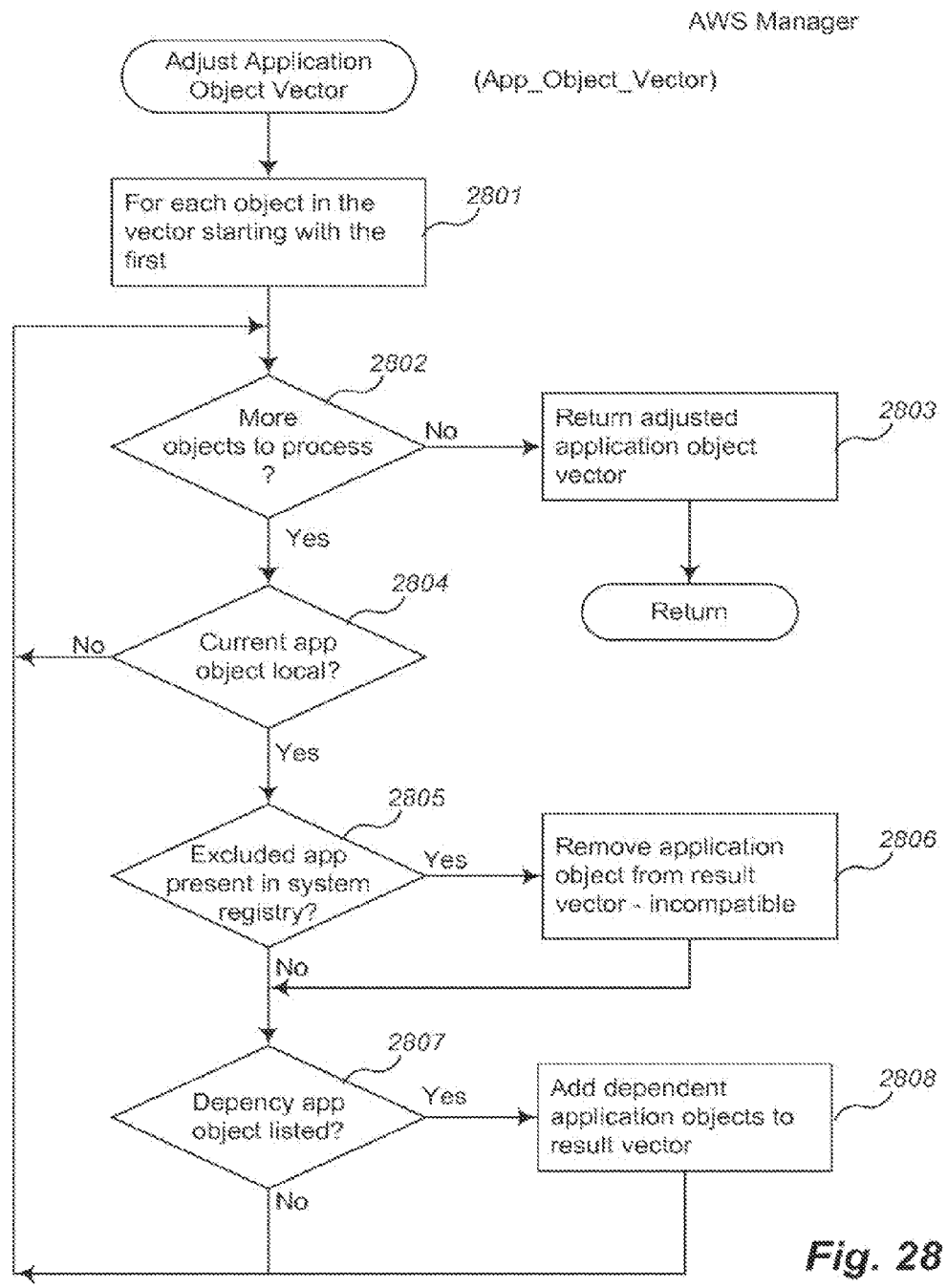
FIG. 28 is an example flow diagram of a routine to adjust an application object vector.

Once the results vector is completed, then, per step 2408, the Node Manager adjusts each application object vector to account for dependencies and exclusions. FIG. 28 is an example flow diagram of a routine to adjust an application object vector. It is performed on each of the application object vectors in the result vector (not shown). In one example embodiment, this routine is also performed by the Node Manager. In step 2801, the routine starts a loop on each application object in the vector starting with the first. In step 2802, the routine determines whether there are more objects to process, and, if so, continues in step 2804, otherwise in step 2803 returns the adjusted application object vector and then returns. In step 2804, the routine determines whether the current application object being examined is a local application and, if so, continues in step 2805, otherwise skips the object and returns to the beginning of the loop in step 2802. This is because the exclusions and dependencies are applicable for local applications, not for remote applications. In step 2805, the routine determines whether the application object lists an exclusion on one or more application objects and the excluded object is present in the system registry. If so, then in step 2806 the routine removes the application object from the result vector because it is incompatible with an already installed application. The routine then continues in step 2807.

To perform this determination, the Node Manager maintains what is termed an "installed database" on the managed computing system (commonly stored in the Windows Registry) in which it records the keys of all package objects and application objects installed on the computer. This database is partitioned into the SYSTEM part, which records which actions occurred system wide on the computing system, and the USER part, which records which actions occurred for that user. The exclusion check is made against the SYSTEM part of the database. In other words, if the computing system has had an application installed on it that a potential application object lists as an exclusion, then this potential application object (potential in that it exists in the set of vectors above) is then removed from that vector. The purpose of this exercise is to prevent incompatible applications being installed on the same workstation which may occur if two or more users share a workstation, and different applications are assigned to them in the configuration respository.

In step 2807, the routine checks if the current application object being examined has a dependency on one or more additional application objects. If not, the routine continues back to the beginning of the loop in step 2802 to examine the next object. Otherwise, then in step 2808, each of the dependent application objects is added to the vector (or a new vector added for each and added to the application object vector).

Figure 29A:
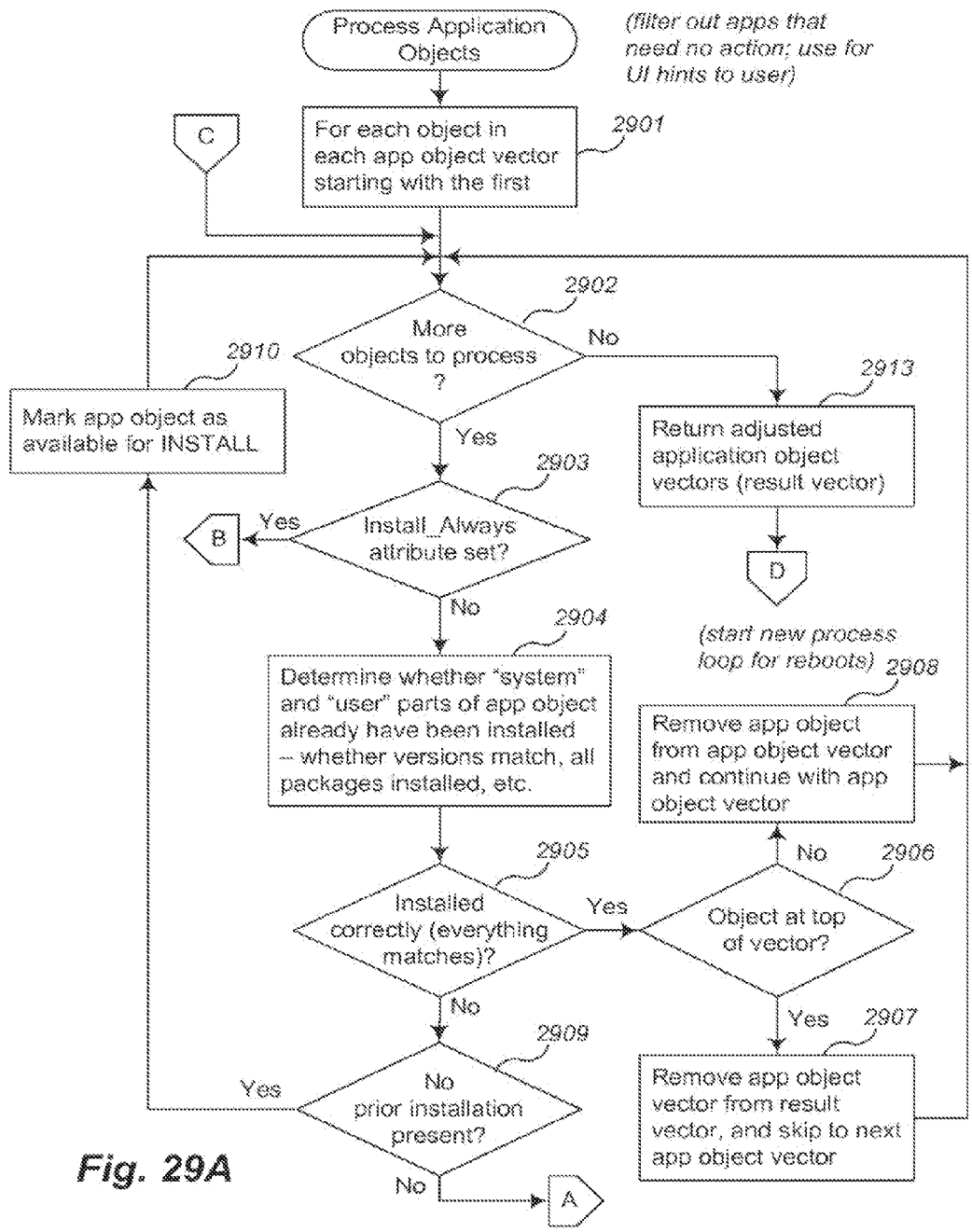
FIGS. 29A-29B are an example flow diagram of processing performed by an example client component of an example Application Workspace System to process application objects in preparation of installation and upgrade.
Figure 29B:
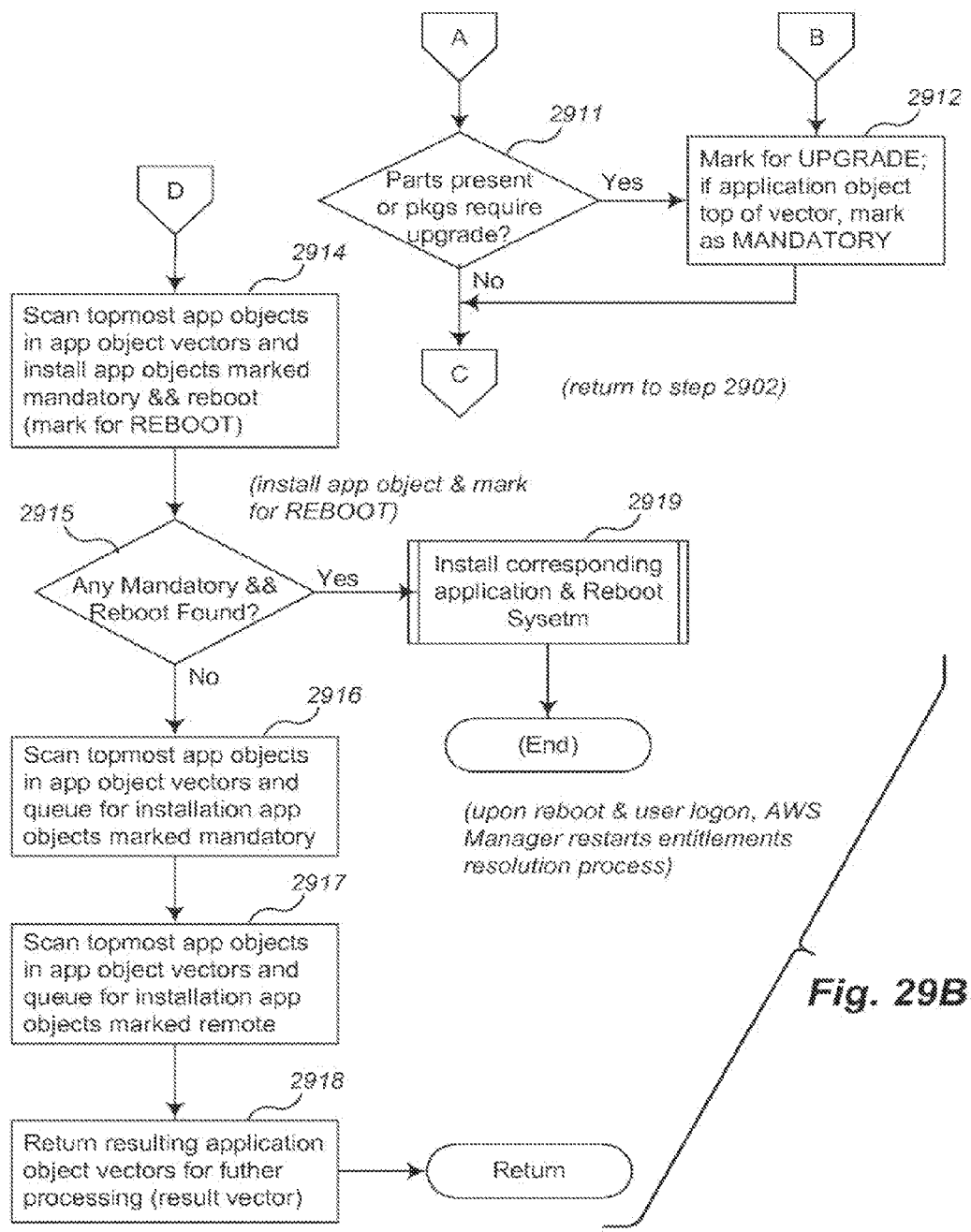

After the results vector is has been adjusted, then, per step 2409, the Node Manager processes each application object to determined whether to queue applications for installation or upgrade. This involves using the installed database on the computing device as mentioned above. FIGS. 29A-29B are an example flow diagram of processing performed by an example client component of an example Application Workspace System to process application objects in preparation of installation and upgrade. In one example embodiment, this processing is also performed by the Node Manager.

In summary, the Node Manager iterates through all of the package objects referenced by each application object, and checks in the installed database to determine whether some or all parts of packages associated with the possible application objects have already been installed and are correct. The Node Manager then decides whether an application needs to be installed or updated and marks it according.

Specifically, in step 2901, the routine processes each application object in each application object vector starting with the first. In step 2902, the routine determines whether it is done. If there are no more objects to process, then the routine continues in step 2913 to return the application object result vector and then starts a new loop (steps 2914-2919) to process any applications that must be installed and will cause a reboot. If there are more objects to process, then in step 2903, the routine determines whether an "Install_Always" attribute has been set, and if so continues in step 2912 (to require an upgrade and potentially mark as mandatory, including identifying packages that are no longer required), otherwise continues in step 2904. In step 2904, the routine determines whether both the SYSTEM and the USER parts have been installed. This check involves checking that the versions of the package objects match as well as that all of the packages have been installed. This includes identifying packages that are no longer required. If in step 2905 everything matches, then the application object is considered to have been already installed correctly. Then in step 2906, if this application object is at the top of its containing vector, the whole vector is removed from the set in step 2907 and the routines skips to the next application object vector in step 2902. Otherwise, in step 2908, the application object is removed from the vector (it isn't the top object) the remainder of the vector is processed in step 2902.

In step 2905, the check for a match could fail either because no corresponding application has been installed, or some portion didn't match. Therefore, in step 2909, the routine checks to determine whether nothing was installed. If true, then in step 2910 the application object is marked as available for installation (which is used for UI hints in the workspace presentation) and the remainder of the vector is processed in step 2902. If false (the application was previously installed and the packages and values don't match), then the routine continues in step 2911 to determine whether the parts that are present or the packages require an upgrade. If so, the application object is marked for UPGRADE in step 2912, and, if at the beginning (top) of the vector, it is marked also as MANDATORY. The routine then skips to the next application object.

Note that this process of deciding what needs to be done is primarily performed to filter out which application objects need no action—this process is repeated later on when applications and packages are actually installed/upgraded/removed.

In steps 2914-2919, the Node Manager then scans all of the application objects at the top of each vector in the set (step 2914) to see if any have both the mandatory attribute set and also have a reboot attribute set (step 2915). The reboot attribute may be used as a UI indicator to warn the user that this application may require a reboot after installation, but if this attribute is present in combination with the mandatory attribute, then in step 2919 the routines causes these applications to be installed and the system rebooted before anything else happens. If the shell (as in the operating system user interface such as Windows Explorer) has not been started yet, it is not started at all if the Node Manage is configured with the "DontShowShellIfRebootRequired" flag is set. This prevents user activity as the machine will be rebooted after these mandatory operations have completed. This approach is commonly used for critical application or security fixes. After the machine reboots, the whole entitlements resolution process is restarted as the user logs on.

In step 2916 (by the time the Node Manager arrives at this step again) then scans all of the application objects at the top of each vector in the set to see if any have the mandatory attribute set. Those that do are queued for installation processing immediately. Immediate processing can be achieved as the Node Manager is an asynchronous queue based system. In step 2917, the Node Manager then scans all of the application objects at the top of each vector in the set to see if any are remote application objects. Any found are queued for remote application processing immediately. In step 2918, the resulting application object vectors are returned for further processing.

Figure 30:
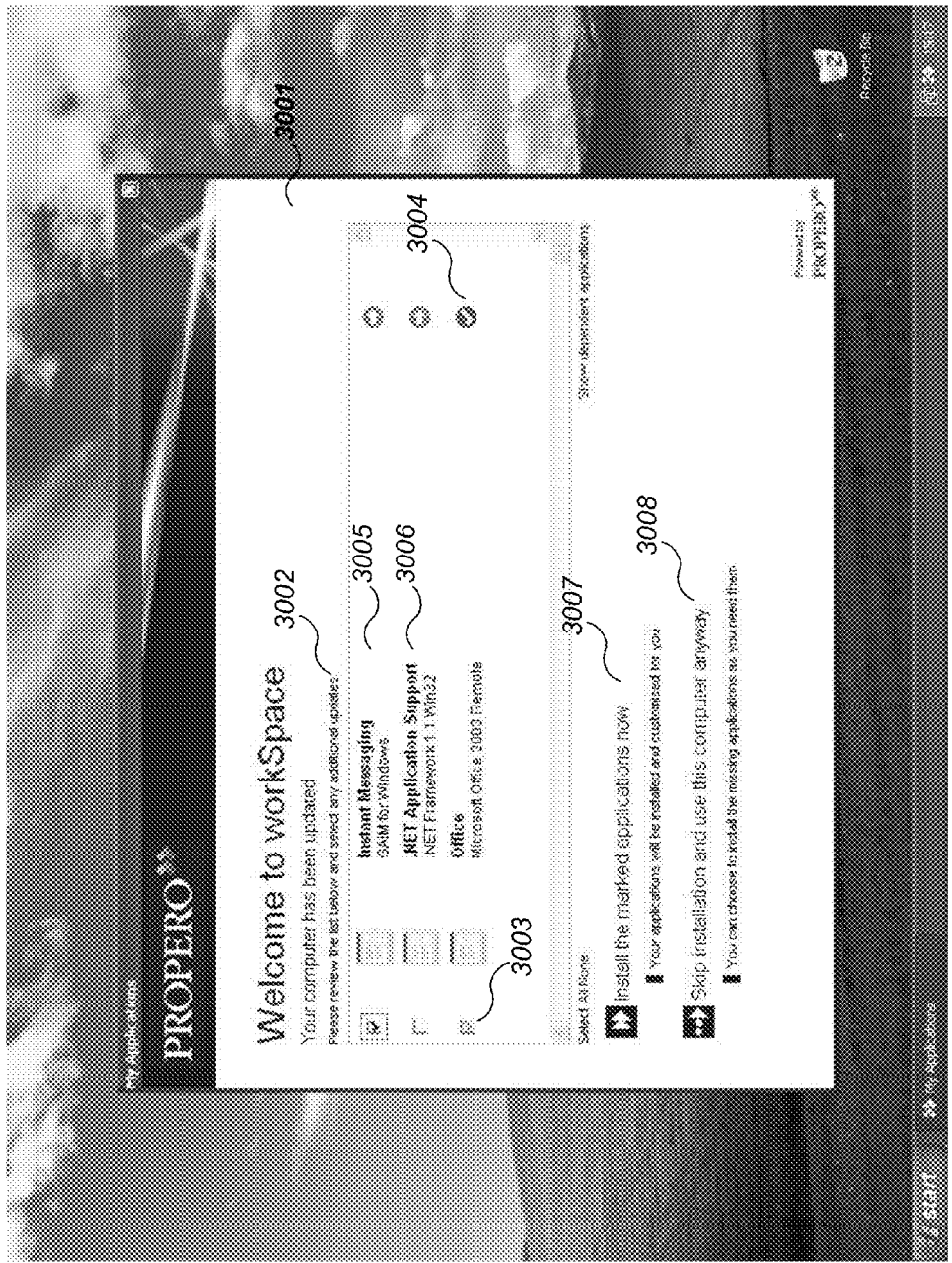
FIG. 30 is an example screen display of a virtual workspace presented to a user after the automated configuration processing performed by an example client component of an example Application Workspace System.

In step 2410 of FIG. 24, the remaining application objects at the top of each vector are presented to the user. FIG. 30 is an example screen display of a virtual workspace presented to a user after the automated configuration processing performed by an example client component of an example Application Workspace System. In FIG. 30, a remote application 3003 has been processed (successfully—with a green tick 3004), and two other applications 3005 and 3006 are available to the user. The attributes "available for installation" or "requiring upgrade" are used to change the icons and/or text next the items in the dialog box. The user can choose to install the optional applications by selecting link 3007, or can skip any further installation by selecting link 3008.

Figure 31:
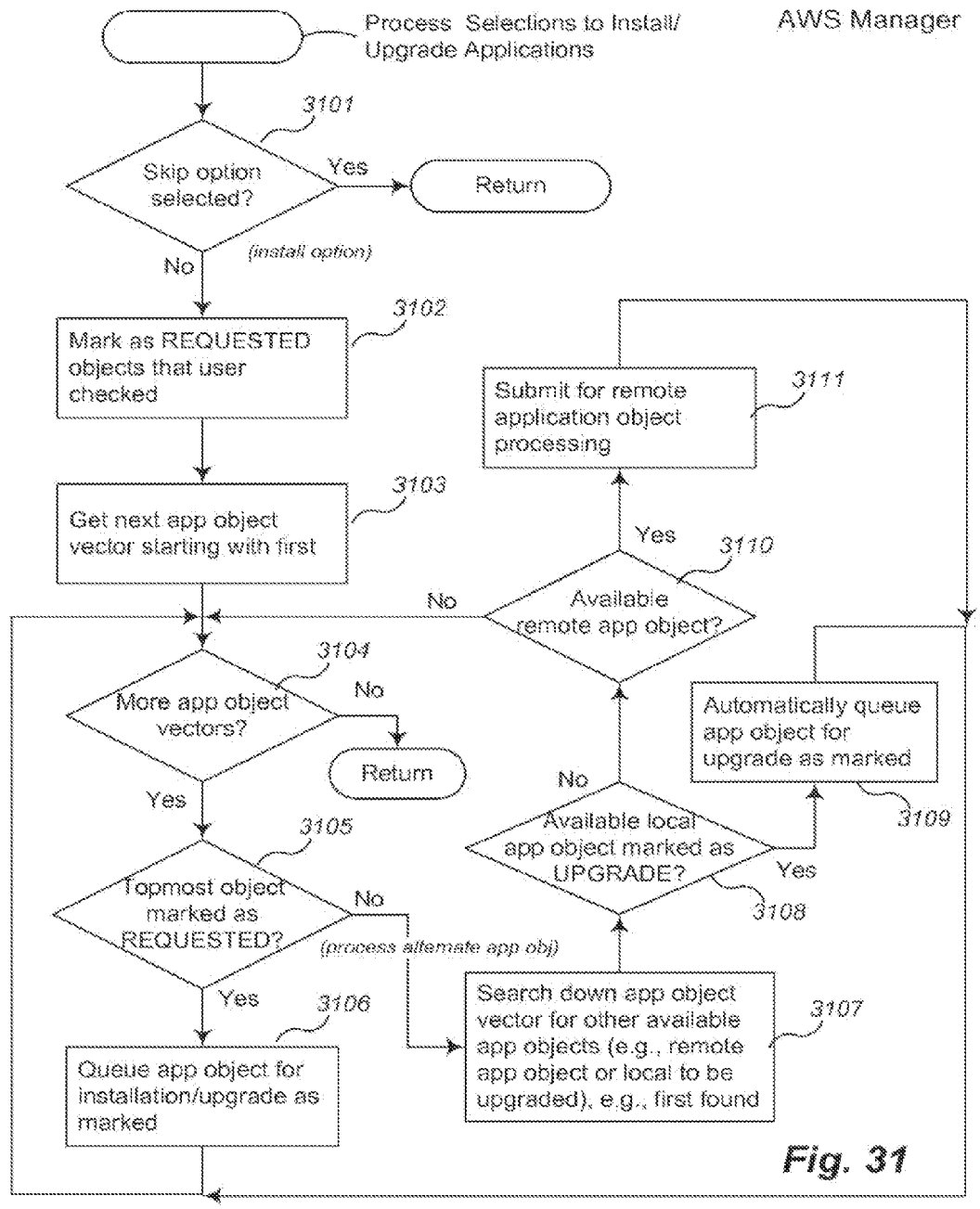
FIG. 31 is an example flow diagram of processing performed by an example client component of an example Application Workspace System to process user selections to install or upgrade optional applications.

The Node Manager then continues processing the user selections in step 2411 of FIG. 24. FIG. 31 is an example flow diagram of processing performed by an example client component of an example Application Workspace System to process user selections to install or upgrade optional applications. In step 3101, if the "Skip" option was selected, no application objects are marked as requested for install/upgrade and the routine returns. If not (the "Install" option was selected), then in step 3102 any application objects that the user checked are marked as requested (this is an attribute of the application object).

The routine then performs a loop to queue for installation/upgrade all requested objects, or to install/upgrade alternatives if they are available applications (to which the user is entitled).

Specifically, in step 3103, the Node Manager searches each application object vector in the set, starting with the first. In step 3104, if there are no more vectors to process then the routine is done; otherwise, it continues to examine the vector in step 3105. In step 3105, if top application object has been marked as requested, then in step 3106 this application object is submitted for installation processing and the next vector is processed. On the other hand, if the top application object has not been marked as requested, then in step 3107, the Node Manager moves down the vector to see if any further application objects are available. Note that no further choices are presented to the user—this technique is usually used to provide the user with a remote application if the user chooses not to install a local application, or to ensure that an existing local application is upgraded, if required, if the user chooses not to install a different local application. In step 3108, If the NM finds an alternate application object in the vector, and this application object is a local one marked requiring an upgrade, it is submitted for installation processing in step 3109. In step 3110, f the application object is remote, then it is submitted for remote application object processing in step 3111. The routine then continues back to step 3104 to process the next vector.

At this point, the Node Manager will have resolved all the contents of the entitlements document, and will have submitted the relevant application objects for either installation processing, or for remote application object processing (note that "installation processing" performs any steps involved in managing local installs, including upgrades or removals). The Node Manager now deletes the set of vectors, as important state is now held in three places:

The queue of work for installation processing
The queue of work for remote application object processing
The installed database on the managed computing system.

As each application object is processed by installation processing, the installed database is updated. Remote application object processing does not update the installed database, as nothing is actually installed in the database for remote applications.

The Node Manager then triggers the SCRIPT_EVENT_CONFIG script for each application that is present in the installed database as installed for that user.

As mentioned, applications for install or upgrade are queued because they can be processed asynchronously by a Node Manger of the AWS client side processing. Installation processing is a term used for synchronizing the state of the packages that comprise an application with the desired state as described with the application objects and package objects that exist in the configuration repository. Installation processing can occur at multiple times.

Figure 32A:
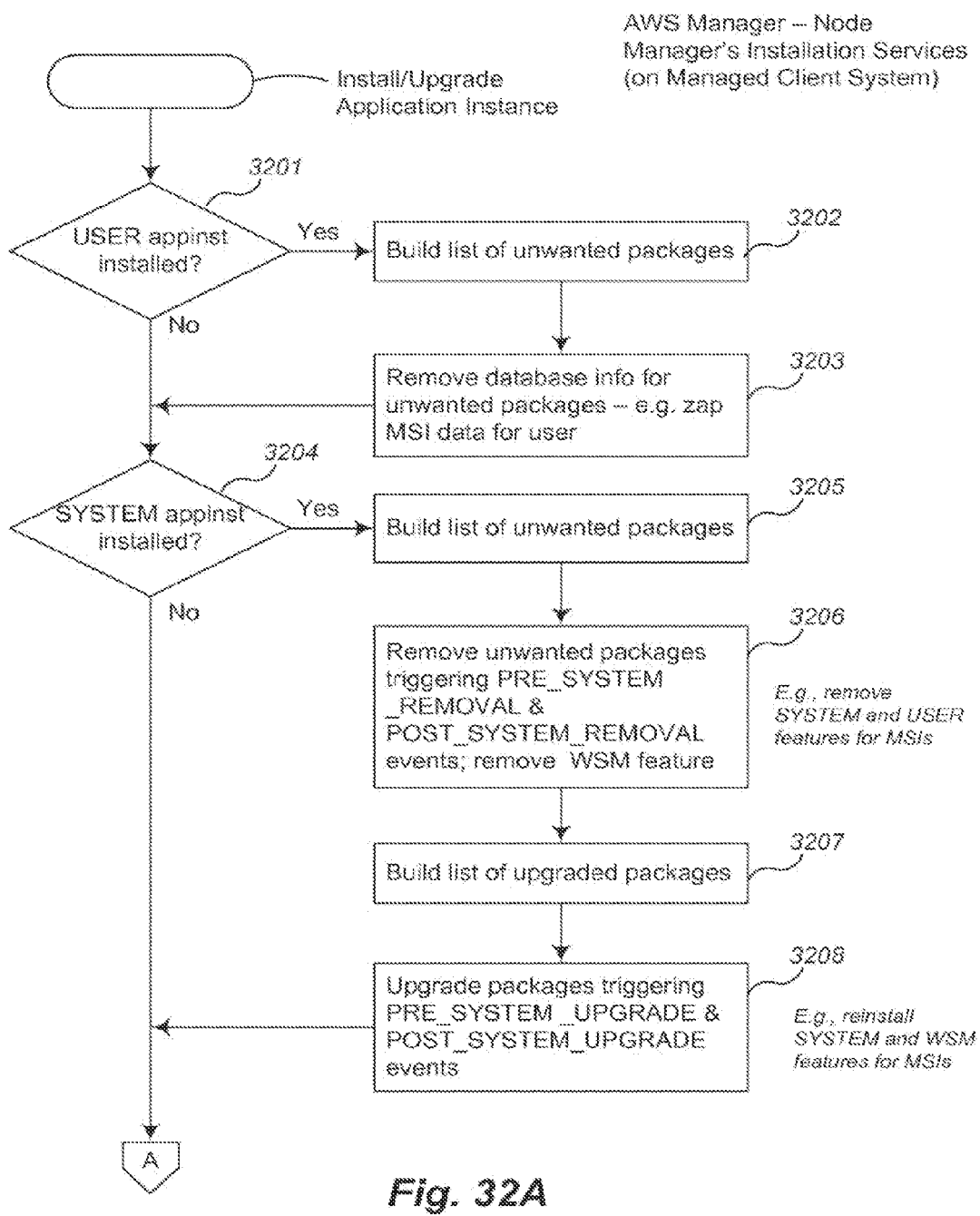
FIGS. 32A-32B are an example flow diagram of the overall processing performed by an example client component of an example Application Workspace System to install or upgrade an application instance.
Figure 32B:
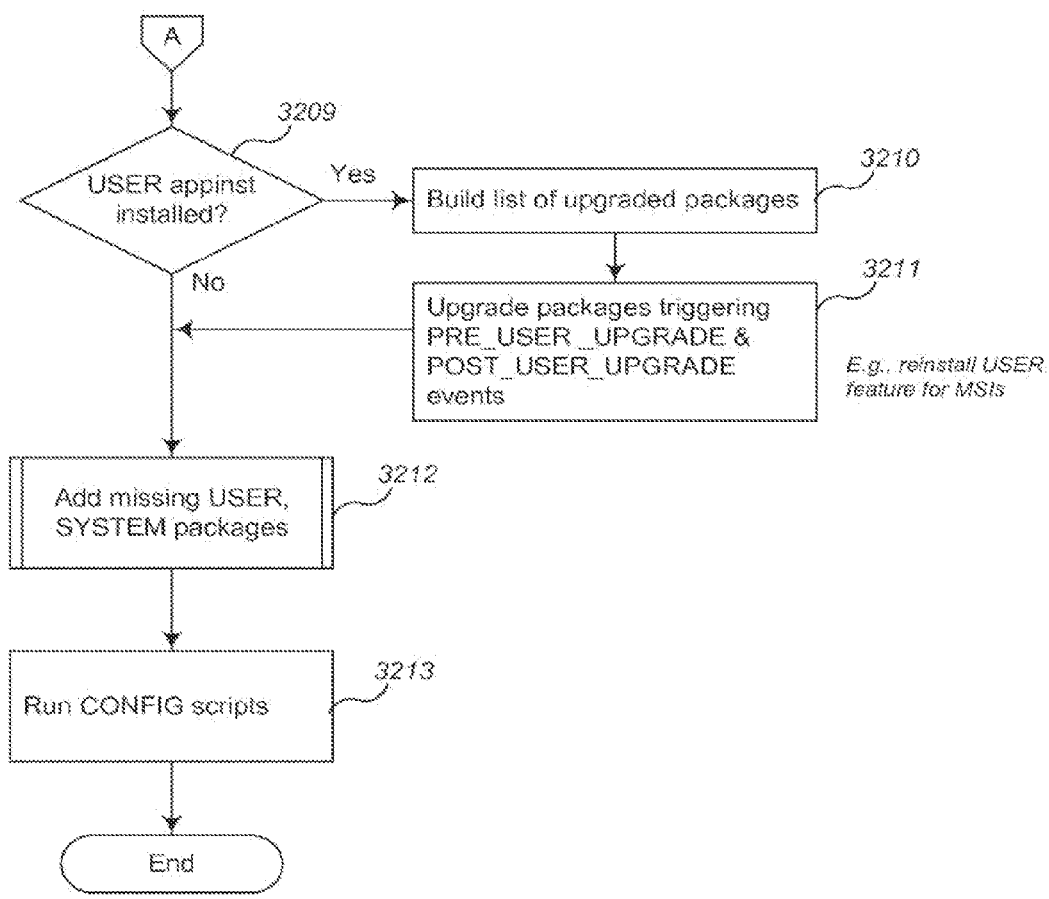

As a result of installation processing, the Node Manager may determine whether to install or upgrade an application. FIGS. 32A-32B are an example flow diagram of the overall processing performed by an example client component of an example Application Workspace System to install or upgrade an application instance. This process typically occurs when a user logs onto a managed workstation, for example, or through the web portal to a remote application executing on a Terminal Server (where it is installed on the Terminal Server). In summary, the Node Manager compares the state of the packages installed on the workstation and for the user against the desired state, and adds/removes packages as appropriate. For an installation, the initial state will be that nothing is present—for upgrades, some existing state will be present.

The first part of the processing involves removing unwanted packages in an orderly fashion. The second part involves then upgrading the packages and causing the appropriate events to occur so that the scripts can be triggered. The third part of the processing involves installing the "missing" packages, for example as occurs with either an install or upgrade.

Specifically, in step 3201, the routine looks to see if the USER portion of the packages associated with the application instance has been installed. If not, it continues in step 3204. Otherwise, the routine builds a list of unwanted packages (step 3202), and removes the installation database information for the unwanted packages (step 3203).

In step 3204, the routine looks to see if the SYSTEM portion the packages associated with the application instance has been installed. If not, it continues in step 3209. Otherwise, the routine builds a list of unwanted packages (step 3205); removes unwanted (SYSTEM and USER) packages triggering the PRE_SYSTEM_REMOVAL and POST_SYSTEM_REMOVAL events (step 3206); and builds a list of packages to upgrade (step 3207). In step 3208, the routine upgrades (reinstalls) the SYSTEM and WSM features and triggers the PRE_SYSTEM_UPGRADE and POST_SYSTEM_UPGRADE events.

In step 3209, the routine looks to see if the USER portion of the application instance has been installed. If not, it continues in step 3212. Otherwise, routine builds a list of packages to upgrade (step 3210) and upgrades (reinstalls) the USER feature, triggering the PRE_USER_UPGRADE and POST_USER_UPGRADE events. Note that the USER portion is installed after the SYSTEM and WSM portions.

In step 3212, the routines then adds missing (not yet installed) USER and SYSTEM packages as described below with respect to FIG. 33, runs the CONFIG scripts, and then completes processing.

Figure 33:
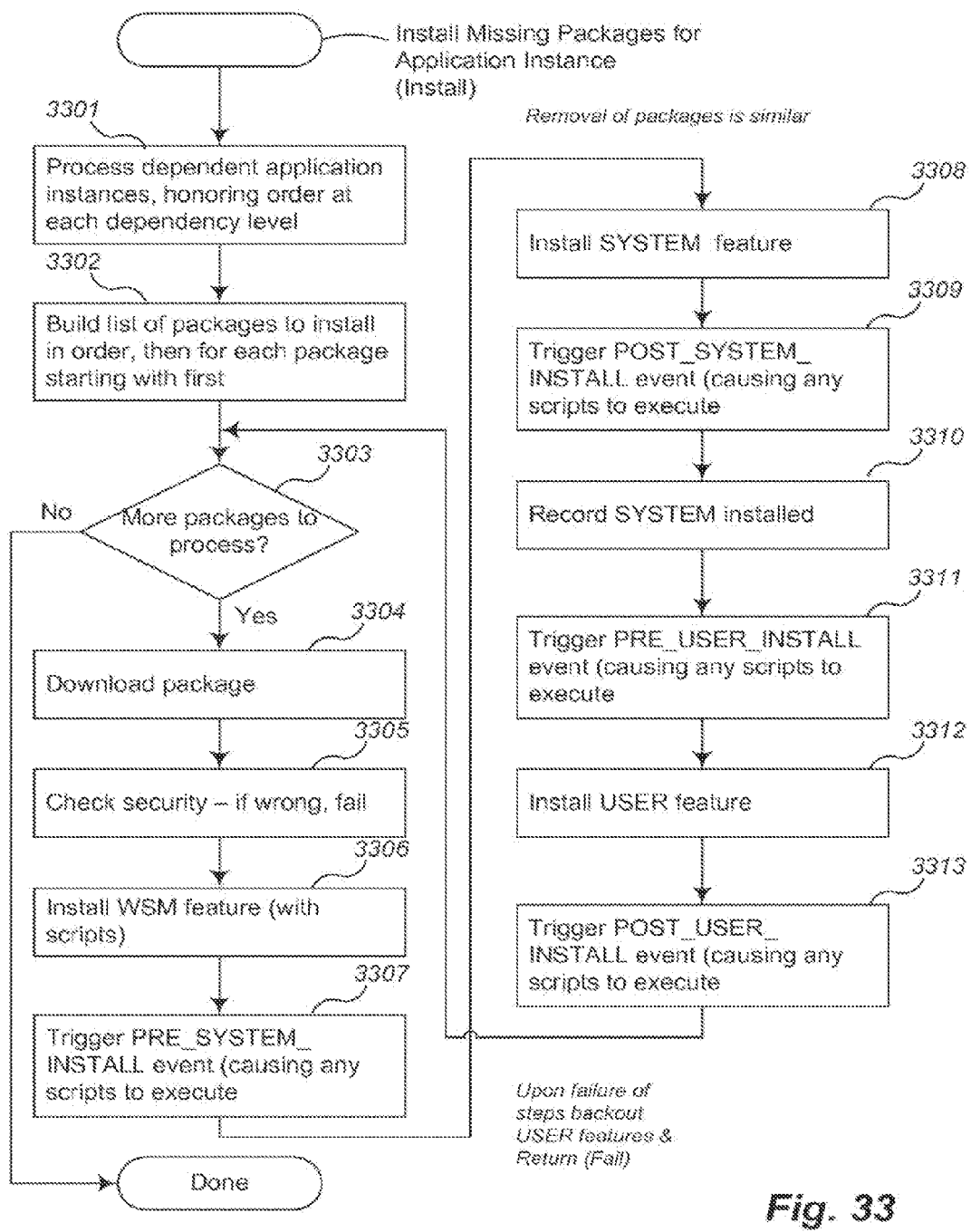
FIG. 33 is an example flow diagram of processing performed to install missing (new or replacement) packages on a managed computing device.

FIG. 33 is an example flow diagram of processing performed to install missing (new or replacement) packages on a managed computing device. "Features" are the package portions that correspond to items that need to be configured for everyone (the SYSTEM feature) or on a per user basis (the USER feature). The WSM feature contains the event scripts. As shown in FIG. 33, script events are performed when installing a package.

More specifically, the Node Manager engages in an orderly process to process application objects one at a time. For each object, NM first checks to see if any dependent application objects need to be processed, and if so, recursively processes these (step 3301).

After this, the NM checks to see if any new packages need to be installed. If they do, the packages are installed as follows:

The WSM feature is installed (for example, by invoking the Windows Installer to install the WSM feature) (step 3306)

The PRE_SYSTEM_INSTALL script is invoked (step 3307)

The System feature is installed (as above, e.g., using the Windows Installer) (step 3308)

The POST_SYSTEM_INSTALL script is invoked (step 3309)

The PRE_USER_INSTALL script is invoked (step 3311)

The User feature is installed (as above e.g., using the Windows Installer) (step 3312)

The POST_USER_INSTALL script is invoked (step 3313)

If any of these steps fail (not shown), portions may be backed out. In particular if the POST_USER_INSTALL script fails, then the Node Manager typically removes the User feature. The User feature usually contains the shortcuts etc. of the local application—therefore this implies that if the post install script fails, the application is not apparently available to the user.

The result of all of this processing is recorded in the installed database on the computing device where the processing occurred. For removals, the relevant package records are removed. For upgrades, fresh information is recorded. For installs, new records are added.

In addition to resolving entitlements, and installing applications and customizing them through the use of scripts, the AWS offers tools to remotely monitor data, state, and status of managed computing devices and terminal servers. For example, the AWS Manager Workbench (see FIG. 5) can also be used to view the configuration data stored by the Node Manager and possibly data from the native operating system as well as monitor accesses to the computing system.

Figure 34:
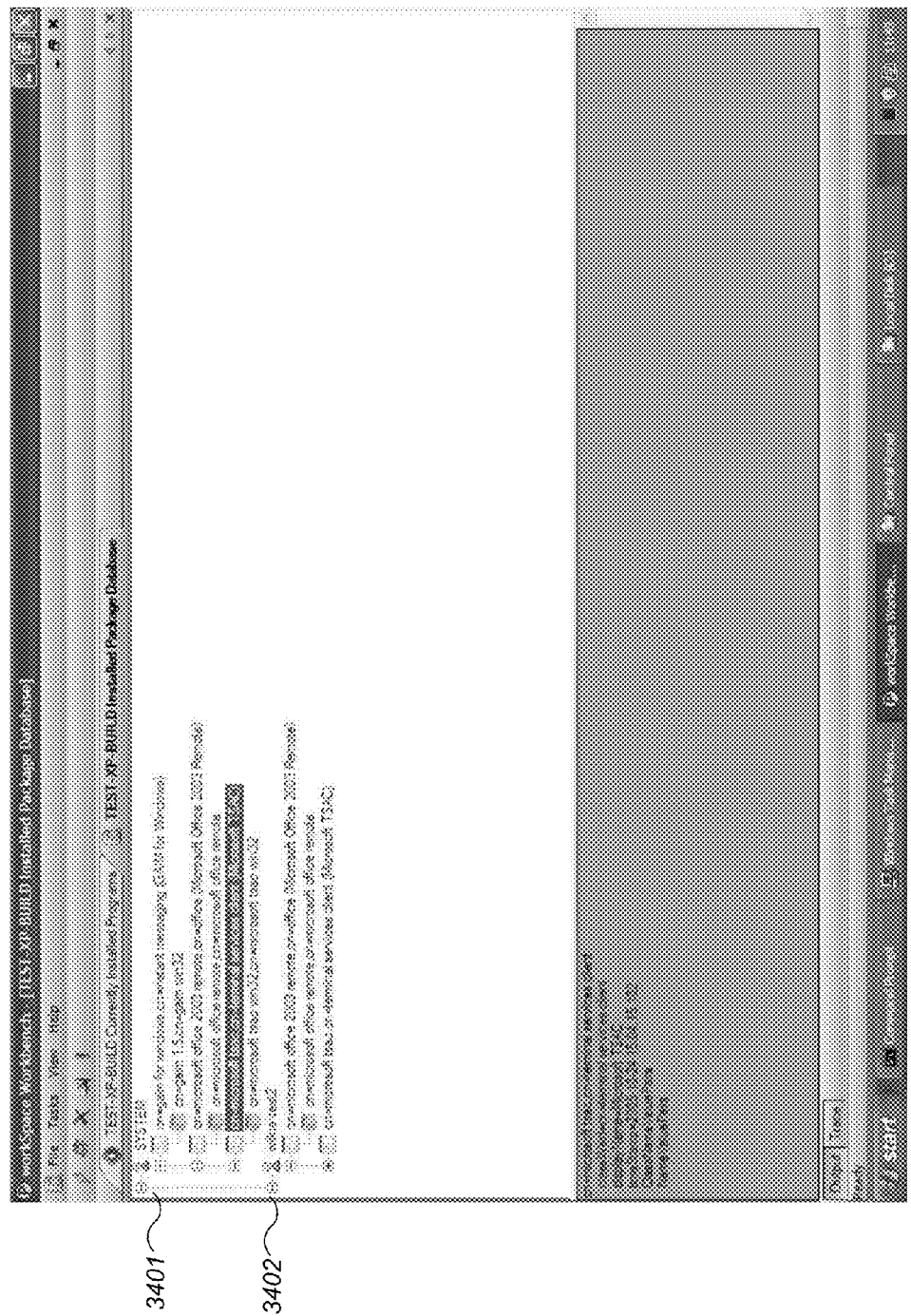
FIG. 34 is an example screen display of a portion of user configuration data stored by example client component of an example Application Workspace System on a managed computing device.

FIG. 34 is an example screen display of a portion of user configuration data stored by example client component of an example Application Workspace System on a managed computing device. For example, the configuration data may be data stored by a Node Manager on a managed workstation. In some embodiments, this data is actually stored in the Windows Registry on the computer. In FIG. 34, the application labeled "GAIM" has been installed as a SYSTEM feature 3401 which has not yet been installed for the user. FIG. 34 shows how the Node Manager stores application object and package object data as the Distinguished Names (ala LDAP) for the applications and packages.

Figure 35:
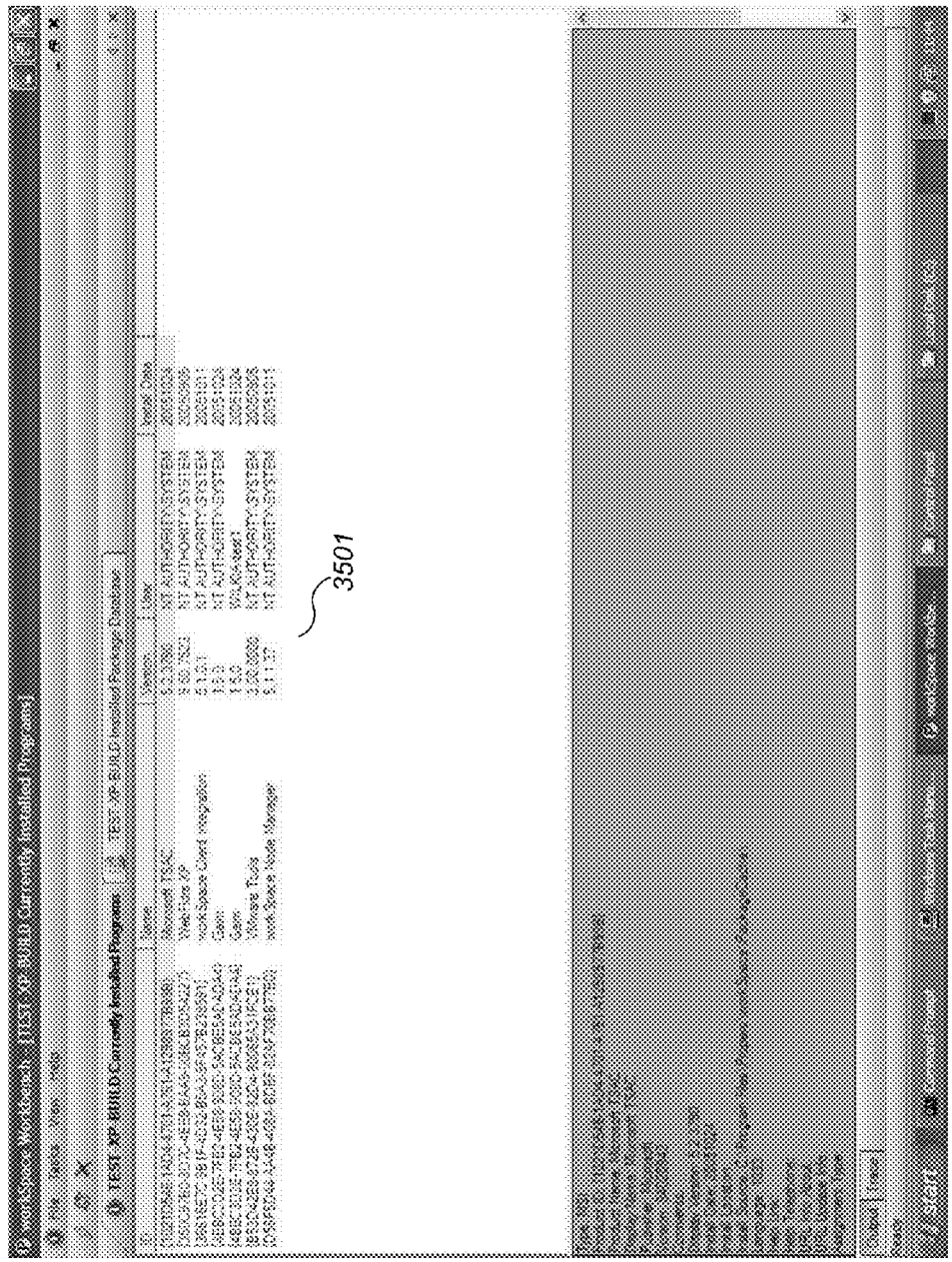
FIG. 35 is an example screen display of the installed package set in a computing system repository of the same computing device shown in FIG. 34.

A Node manager can also interact with the native operating system's database of installed applications. FIG. 35 is an example screen display of the installed package set in a computing system repository of the same computing device shown in FIG. 34. For packages that resulted in an MSI install, it is possible to see the same packages appearing in both the Node Manager's database and the operating system's package database.

Figure 36:
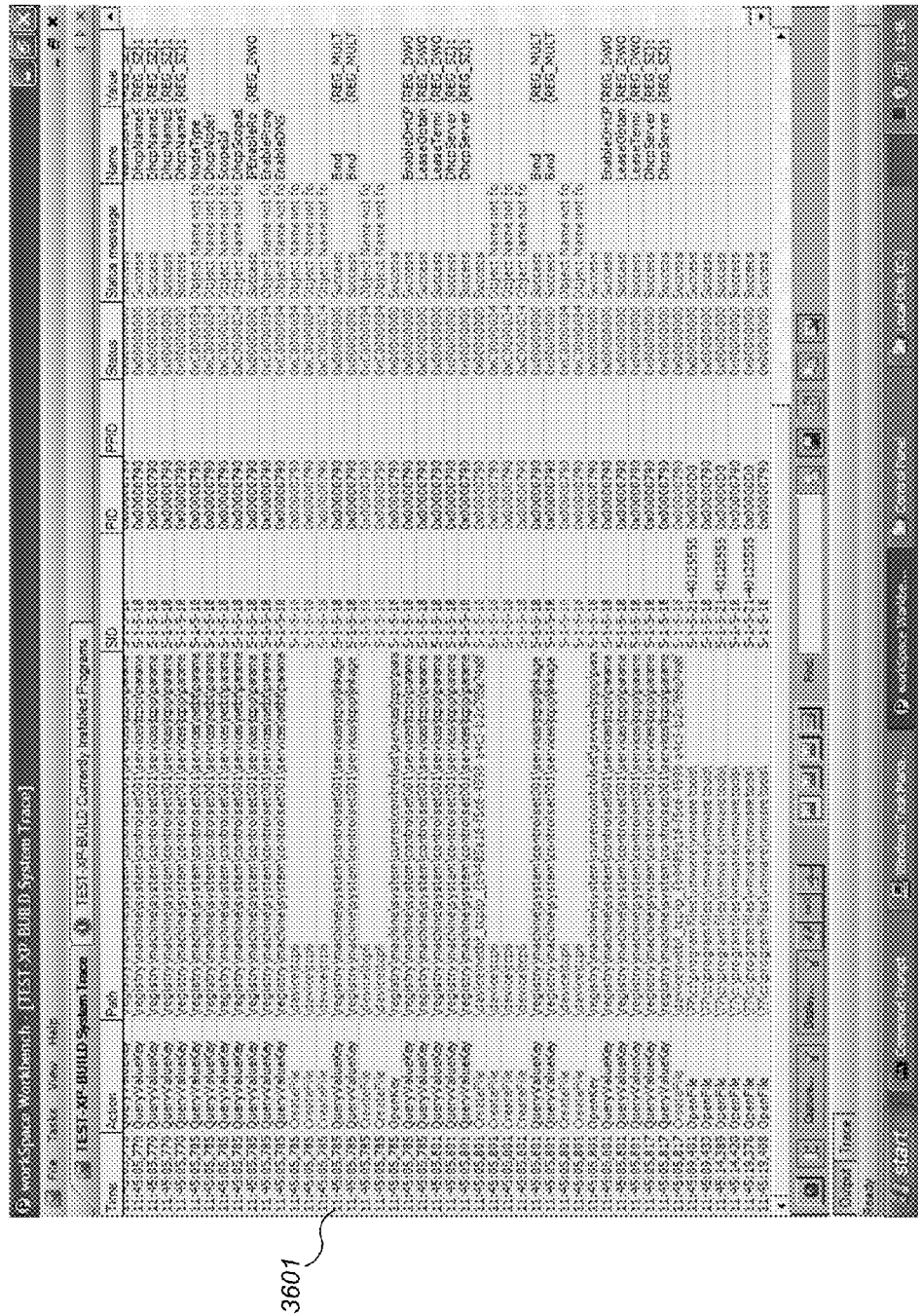
FIG. 36 is an example screen display of remote monitoring of a managed computing system in an example Application Workspace System.

A Kernel Manager component, briefly described above, typically resides on the Terminal Server or on the managed computing device and can trace all the system calls it intercepts in order to achieve behavior modification (it runs in "kernel" mode, which is privileged like a device driver). A Node Manager can retrieve this trace information and send it to the AWS Manger Workbench for further analysis. FIG. 36 is an example screen display of remote monitoring of a managed computing system in an example Application Workspace System. File and registry accesses can be seen in the trace window.

A trace is capable of showing:
File/Directory/Network share accesses
Registry Accesses
Process Start/Stop
Module Load/Unload
Device Driver Load/Unload
Network listens
Network connects
Network disconnects
Other accesses could be similarly incorporated.

Figure 37:
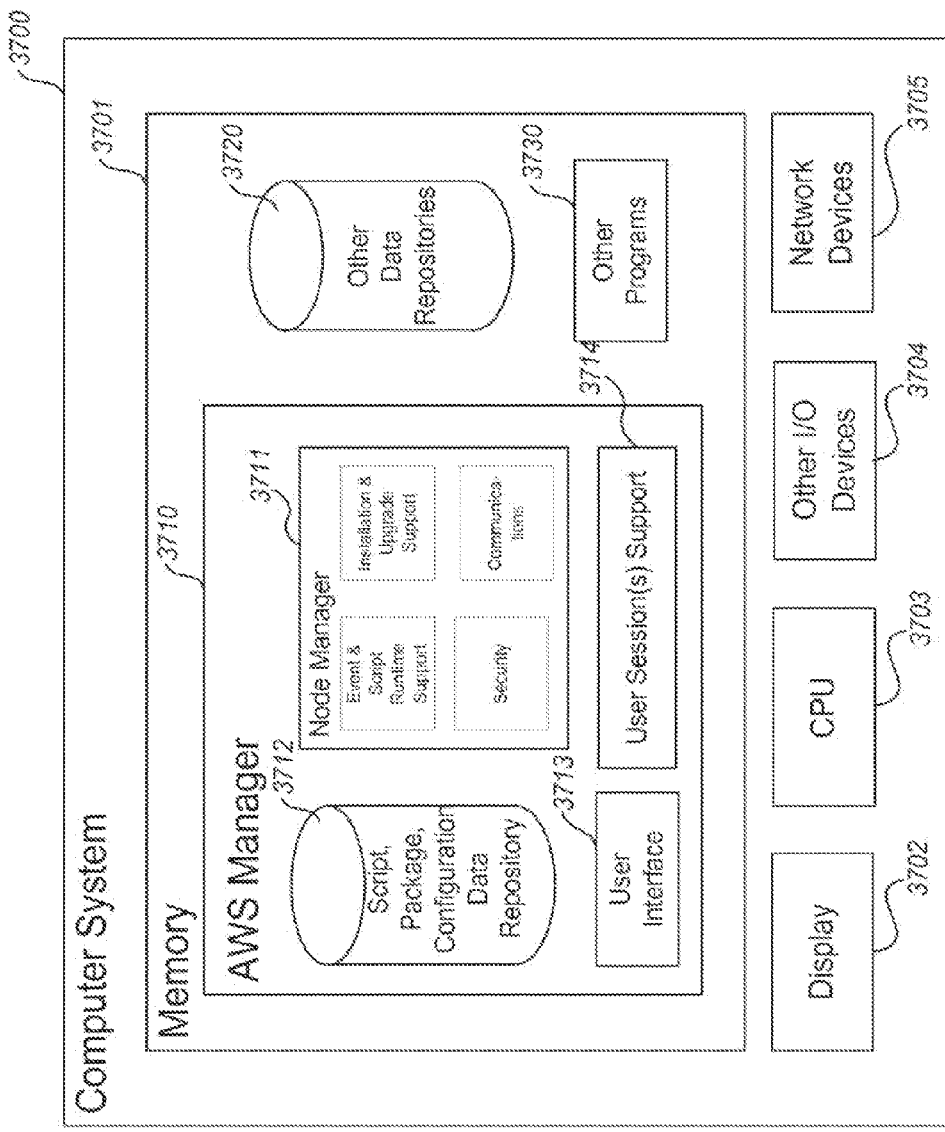
FIG. 37 is an example block diagram of a general purpose computer system for practicing embodiments of a Application Workspace System.

One or more of the components of an example AWS can be implement on a general purpose computing system. FIG. 37 is an example block diagram of a general purpose computer system for practicing embodiments of components of a Application Workspace System. The general purpose computer system 3700 may comprise one or more server and/or client computing systems and may span distributed locations. In addition, each block shown may represent one or more such blocks as appropriate to a specific embodiment or may be combined with other blocks. Moreover, the various blocks of the Application Workspace System 3710 may physically reside on one or more machines, which use standard or proprietary interprocess communication mechanisms to communicate with each other.

In the embodiment shown, computer system 3700 comprises a computer memory ("memory") 3701, (optionally) a display 3702, one or more Central Processing Unit ("CPU") 3703, and (optionally) Input/Output devices 3704. The Application Workspace System ("AWS") 3710 is shown residing in memory 3701. The components of the Application Workspace System 3710 preferably execute on CPU 3703 and manage the generation and use of a virtual workspace and configured and personalized applications, as described in previous figures. Other downloaded code 3730 and potentially other data repositories 3720, also reside in the memory 3701, and preferably execute on one or more CPU's 3703. In a typical embodiment, the AWS 3710 includes one or more Node Managers 3711, one or more configuration repositories 3712, one or more user interfaces 3713 and session support 3714.

In an example embodiment, components of the AWS 3710 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk), functional (e.g., ML, Lisp, Scheme, etc.), procedural (e.g., C, Pascal, Ada, Modula), scripting (e.g., Perl, Ruby, Python, etc.), etc. In addition, the various components of the illustrated embodiments may be implemented by way of a single monolithic executable running on a single CPU computer system, or alternately decomposed using a variety of structuring techniques known in the art, including but not limited to, multiprogramming, multithreading, client-server, or peer-to-peer, running on one or more computer systems each having one or more CPUs.

In addition, programming interfaces to the data stored as part of the AWS process can be available by standard means such as through C, C++, C#, and Java APIs; libraries for accessing files, databases, or other data repositories; through scripting languages such as XML; or through Web servers, FTP servers, or other types of servers providing access to stored data. The configuration repository 3712 may be implemented as one or more database systems, file systems, LDAP servers or any other method known in the art for storing such information, or any combination of the above. In addition, some operations may be implemented as stored procedures, or methods attached to configuration "objects," although other techniques are equally effective.

Also the example AWS 3710 may be implemented in a distributed environment that is comprised of multiple, even heterogeneous, computer systems and networks. For example, in one example embodiment shown below in FIG. 38, the Node Manager 3711 and the configuration data repository 3712 are all located in physically different computer systems. In another embodiment, various components of the AWS 3710 are hosted each on a separate server machine and may be remotely located from the tables which are stored in the configuration data repository 3712. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, DHTML, Web Services (XML-RPC, JAX-RPC, SOAP, etc.). Other variations are possible.

In example embodiments, these components may execute concurrently and asynchronously; thus the components may communicate using well-known message passing techniques. Equivalent synchronous embodiments are also supported by an AWS implementation. Also, other steps could be implemented for each routine, and in different orders, and in different routines, yet still achieve the functions of the AWS.

Figure 38:
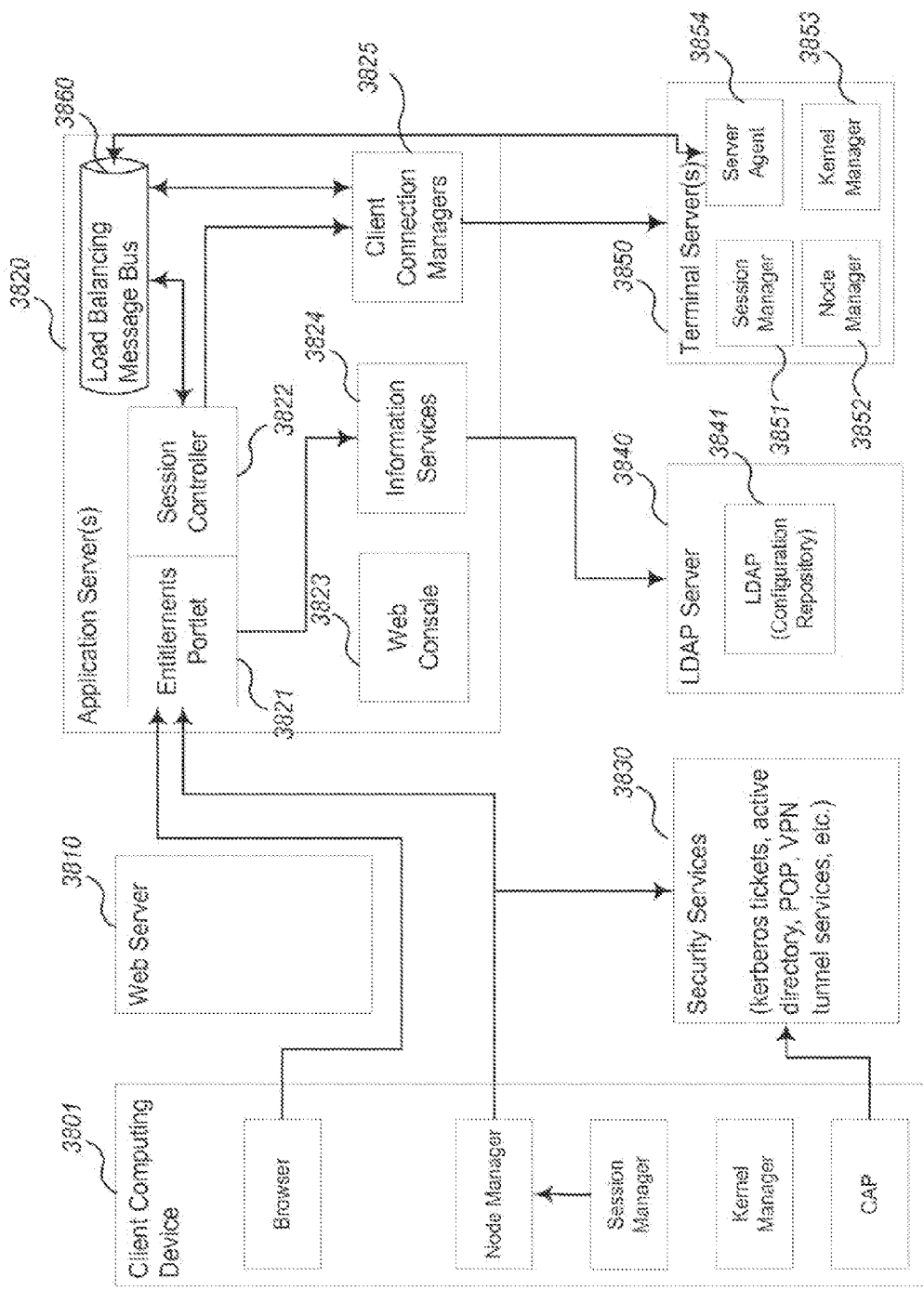
FIG. 38 is an example block diagram of detailed service side components of an Application Workspace System and their interactions to provide the services described here.

FIG. 38 is an example block diagram of detailed service side components of an example embodiment of a Application Workspace System and their interactions to provide the services described here. A client computing device that is unmanaged (not shown) communicates with the AWS Application Servers 3820 through web server 3810. The client computing device 3801 communicates to with the AWS Application Servers 3820 to resolve entitlements, obtain applications to download onto a local device, etc. as described in detail above. In addition, the client computing device 3801 (managed) communicates using web service calls for remote applications to Entitlements Portlet 3821 in order to obtain information regarding the remote applications and to run sessions, for example, on Terminal Servers 3850. The session controller selects the appropriate Client Connection Manager 3825 based on the type of the remote application as stored in the configuration repository 3841, and uses that Client Connection Manager to choose an optimal server for processing a remote application. In addition that Client Connection Manager provides all the necessary information to allow the Session Controller to return DHTML and/or responses to Web Services calls that enable the Client computing device 3801 to connect to the selected server processing the remote application. Commonly, although not required, the Client Connection Managers 3825 communicate via a load balancing message bus 3860 with Terminal Servers 3850 via listening server agents 3854 in order to choose an optimal server for processing a remote application. The load balancing message bus 3860 mechanism is further described with respect to FIG. 39.

The Entitlements Portlet 3821 communicates with Information Services 3824 to obtain information from the configuration repository 3841 stored and managed by one or more LDAP Servers 3840. An AWS provided replication mechanism that uses XSLT stylesheets to perform the replication is described further below. This technique is used to replicate the LDAP directories 3840 as needed by the system. The Entitlements Portlet 3821 performs the entitlement resolution process as described in detail above.

The client computing device 3801 uses AWS security services 3830 to implement tunneling for secure connections to the applications servers and to perform remote application processing. The tunnel client also known as the CAP, can be seen in the workstations on the diagram. The components of the security services 3830 also provide Kerberos security services to the system.

XSLT Based LDAP Synchronization

The XSLT based LDAP Synchronization technology ("XLDAPS") allows synchronization of LDAP data between directories of different types using a unique approach of a transformed replication changelog. Normally LDAP replication is used to replicate directory data between two identical directory server implementations. In some environments, including the AWS described above, every data entry added/deleted/modified in the LDAP is automatically replicated to the other directories. The XLDAPS technology uses XSLT transformation rules to synchronize LDAP changes to different LDAP Directories which may have a different LDAP Schema and a different LDAP Directory Information Tree structure.

A transformation expressed in XSLT describes rules for transforming a standard replication log into a synchronization log. A transformation expressed in XSLT is called a stylesheet. Appendix B is an example XSLT document as used in the AWS to perform LDAP replication.

The XLDAPS technology is implemented as an Directory Server plug-in and is used on an LDAP Directory Server (e.g., Sun Java Directory Server, IBM Tivoli Directory Server, Microsoft Active Directory etc.). It allows add/modify/delete operations performed on one LDAP Directory to be synchronized using corresponding operations on a completely different type of LDAP Directory.

For more information on LDAP—Lightweight Directory Access Protocol—IETF standard—see RFC 3377 http://www.ietf.org/rfc/rfc3377.txt. For more information on XSLT see XSLT—Extensible Style Language Transformations—W3 standard—see http://www.w3.org/TR/xslt.

Multiple instances of the Plugin can run each outputting a different format changelog (a changelog contains the datastream to be replicated to the target directory server) each described by the XSL/XML definition files. More about XSL is found at http://www.w3.org/Style/XSL/

Typical uses of this plugin include the generation of an OpenLDAP style slurpd changelog to replicate LDAP changes to other LDAP servers including Microsoft Active Directory. The XSL stylesheet defines the slurpd replication changelog format and defines the mapping from LDAP attribute types to Active Directory attribute types. This means that the plugin does not need any knowledge of the slurpd changelog format or of the specific details of mapping LDAP attribute types to Active Directory attribute types. Rather, the plugin can just invoke an XSLT processor to read and execute the transformations in order to produce the changelog.

This plugin can also be used to output a changelog for use by other replication and synchronization services such as for replicating changes to an RSA/Ace SecurID server or for producing an audit log in a specific format.

The plugin is designed to work with Sun ONE Directory Server, but could fairly easily be ported to work with IBM Directory Server on Intel or zSeries hardware. Currently it is supported on Intel Red Hat 7.3 Linux working with Sun One Directory Server 5.1.

This plugin is extensible. By using XSL as the changelog format transformation mechanism, new replication requirements can be met without the need to make changes to the software. Adding a new replication log, or changing the attribute mappings etc. can all be done by modifying or creating a new XSL stylesheet and XML file definition.

In an example embodiment, the plugin is called libpaerepplugin.so and is a re-entrant shared object library. It is configured in LDAP to automatically start when the LDAP processes ns-slapd start.

When the plugin is started, it parses the XML and XSL files. If they are not readable, or they contain syntax errors, the processing aborts and the plugin will not initialize. Otherwise the XSL file is read to determine the list of XSL parameters that are defined.

For efficiency, the XML and XSL files are only read and parsed at initialization time. If the contents of the files are changed, it is necessary to restart the LDAP processes ns-slapd. This is acceptable as the contents of the XML and XSL files should rarely change.

Parameters configured in LDAP are passed to the plugin at startup to determine the format of the changelog. They are defined in order as follows:

- XML Filename—The name of the XML file that contains any fixed parameters needed by the specified XSL stylesheet.
- XSL Filename—The name of the XSL stylesheet file that contains the transformation definition for the XSLT processing to format the changelog output.
- Changelog Filename—The name of the changelog output file. If this file doesn't exist it is created. Changes passed to the XSLT processor may be appended to this file in a format described by the XSL file after each LDAP add, modify and delete operation.

The remaining parameters represent a list of LDAP attribute types for which values are always passed as parameters to the XSLT processing after a modify operation. Usually after a modify, only the attribute type values that have been modified are passed together with certain fixed ones (see below).

The LDAP entry of Table 2 shows an example plugin configuration used for Active Directory Replication.

TABLE 2 dn: cn=Sample Active Directory Replication, cn=plugins, cn=config
cn: Sample Active Directory Replication
objectClass: top
objectClass: nsSlapdPlugin
objectClass: extensibleObject
nsslapd-pluginarg0: /opt/Propero/properDirectory/ad_changelog.xml
nsslapd-pluginarg1: /opt/Propero/properDirectory/ad_changelog.xsl
nsslapd-pluginarg2: /usr/iplanet/servers/slapd-m49/logs/ad.replog
nsslapd-pluginarg3: pae-ADUnicodeBase64Password
nsslapd-pluginType: postoperation
nsslapd-plugin-depends-on-type: database
nsslapd-pluginInitfunc: paerep_postoperation_init
nsslapd-pluginPath: /opt/Propero/properDirectory/lib/libpaerep plugin.so
nsslapd-pluginvendor: Propero Ltd.
nsslapd-pluginDescription: Propero Extensible Replication Plugin
nsslapd-pluginVersion: 0.4
nsslapd-pluginId: PAEREP Extensible Replication
nsslapd-pluginEnabled: on LDAP Add After an LDAP entry is added, each added LDAP attribute type is compared with the parameter list specified in the XSL stylesheet. If there's a match, the XSLT Processor is run passing all available parameter values from the new LDAP entry.

In addition to LDAP attribute types, the built in parameters changetype, dn, modifiersname and time are also passed if they are defined in the XSL. See below for a description of these built in parameters.

LDAP Modify

The XSLT processing for an LDAP Modify is similar to LDAP Add. The difference is that only the attribute types that have actually changed are passed as parameters. This is done for efficiency. If an attribute type value changes that is not defined as a parameter in the XSL stylesheet, XSLT processing will not be performed.

XSLT processing is performed once for each attribute type modified.

In addition to LDAP attribute types, the built in parameters changetype, dn, modifiersname and time are also passed if they are defined in the XSL. See below for a description of these built in parameters.

Additional attribute types can be passed after an LDAP Modify even if those attribute types have not changed. This is sometimes required for LDAP Modify XSLT processing. These additional parameters are specified as plugin startup parameters 4 and beyond. See above.

LDAP Delete

The XSLT processing for LDAP Delete is very simple as no LDAP attribute type values are available after the entry has been deleted. The only parameters available are the built in parameters changetype, dn, modifiersname and time. These are passed if they are defined in the XSL. See below for a description of these built in parameters.

LDAP MODRDN

This plugin doesn't support the MODRDN LDAP operation. It may be supported in a future release.

XSL Parameters

Any LDAP attribute type such as uid, cn, mail etc. can be used as a parameter in the XSL stylesheet.

This plugin also allows some built in parameters to be used. These are as follows:

- changetype—one of add, modify or delete
- dn—the distinguished name of the LDAP entry added, modified or deleted
- modifiersname—the distinguished name of the LDAP user who made the change.
- time—the time the change took place given, as the number of seconds since 00:00:00 GMT, Jan. 1, 1970. This value is used in a slurpd changelog. See the man pages for slapd.replog.

Any parameters passed to the XSLT processing are automatically decrypted if they have been encrypted using the encryption routines as supplied with the Propero workSpace software. See the XSL stylesheet example below for details of how these parameters are used.

XSLT Processing

The plugin uses the C API to the Sablotron library as the XSLT processor. This is maintained by the Ginger Alliance Open Resource Centre. See http://www.gingerall.org/charlie/ga/xml/p_sab.xml Sablotron provides access to a set of standard Document Object Model (DOM) functions which are used to parse the XSLT stylesheets.

It is linked with the static Sablotron libraries to avoid a library function clash with an LDAP Function. This means that the plugin is not dependent on the Sablotron shared object libraries.

Message Based Load Balancing

One of the techniques provided by the Application Workspace System is a message bus, which it uses for operations such as load balancing among terminal servers and for security related resources. A message bus is a communications abstraction (provided by code) which allows a requestor (or any type of querying agent) to send a broadcast message asking for certain information or requesting a particular response, Servers that can potentially provide the information or the requested service, subscribe to the messaging service and the particular messages that are relevant to the information or services provided by the servers. When the requestor broadcasts a request, only those servers that can/desire to provide the information or service respond. In that way, the requestor knows what servers are available and/or appropriate to the desired information or service.

Message based load balancing keeps the application logic of resource selection simple, and also inherently provides up-to-date information that does not include information about resources that are not present or not responding, and thus provides a basis upon which to construct highly-available systems.

For example, the AWS uses message-bus based load balancing to determine which servers to use to launch remote application access requests. This allows the AWS to avoid use of central component to respond to load balancing queries, to ensure the receipt of updated information regarding available servers, and to avoid the complexities of detecting server unavailability, timeouts, etc. For example, the AWS session management server components (such as Session & Connection Control 312 in FIG. 3) can use the message bus to find out what terminal servers (e.g., remote applications terminal services 340 in FIG. 3) are available, and then in the surrounding code determine which one to use based upon any AWS specified load balancing algorithm.

Figure 39:
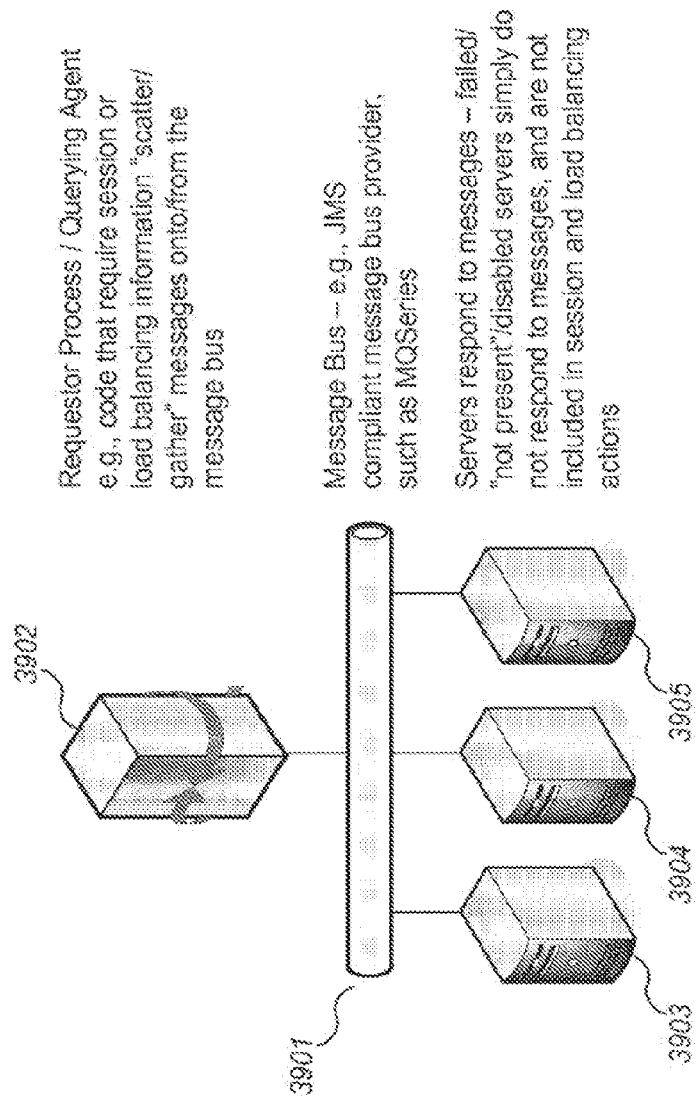
FIG. 39 is an example block diagram of a general message bus as used by an Application Workspace System.

FIG. 39 is an example block diagram of a general message bus as used by an Application Workspace System. As described, message bus 3901 can be used for load balancing as well as for general service or resource discovery, and for high-availability work. When a load balancing query or resource discovery query requires resolving, a querying agent (some component of the AWS or other system) such as requestor process 3902 broadcasts a message to message bus 3901 to which all possible respondents are listening/subscribed to. The message may include elements of data that will be relevant to resolving the request, such as data that indicates which of the possible respondents should respond.

Thereafter, servers, such as servers 3903, 3904, and 3905, respond to the particular request. The querying agent 3902 then receives all the possible responses to the original message within a defined timeout period (controlled, for example, by the code invoked by the querying agent to broadcast the message). This timeout period is relatively short, for example 10 seconds, and as such serves to filter out possible respondents that are not in a position to respond—either due to a failure, or due to overloading. In one embodiment, this timeout period is defined as the time period for all responses to be received, and not as a timeout per possible respondent.

The querying agent 3902 then applies an algorithm to the elements of data returned from all the respondents to decide which is the most appropriate respondent. In the case of a query to figure out where to run or access an application or data, the algorithm may be a load balancing algorithm.

Note that the message bus mechanism provided by the AWS also can be used for other purposes, such as voting and consistency checking.

Example pseudo-code of how the message bus is used to perform a load balancing algorithm across Terminal Servers for session management is included as Table 3, below. Note that the parameter "serversToQuery" is a list of possible servers that has been retrieved from LDAP. The load balancing algorithm employed in this code sorts the responding servers based upon statistical information and then chooses which one to use based upon the sort. For example, in the code shown below, the statistics include the number of current sessions being serviced, the percentage of memory being used, and the average processor time being utilized. Other load balancing algorithms can be similarly incorporated.

TABLE 3

```
1   SDMessageManager statisticsRequest = new SDMessageManager (serversToQuery,
2     serverTimeout);
3   log.debug("allocateNewSession - sending GetStatistics message");
4   HashMap statisticsResponse =
5   statisticsRequest.sendMessage(SDMessageManager.GET_STATISTICS);
6   TreeMap sortedResponse = new TreeMap( );
7   // We produce a "score" based on the statistics, and then put the server
8   // name as a value into the TreeMap keyed by the score. The TreeMap is sorted, so the first
9   // item in the Map will be the one to use. If that can't be used, then the second is used
10  // and so forth. Note, however, that responding to a statistics query is taken to mean that the
11  // server is alive and can accept connections.
12
13  // The statistics are:
14  //    Number of sessions
15  //    Percentage of Committed Bytes Used
16  //    Averaged processor utilization
17
18  // This results in an easy percentage scoring - for number of sessions for example 50 users
19  // can be selected as the maximum load
20
21  Iterator statisticsIterator = statisticsResponse.entrySet( ).iterator( );
22
23  while (statisticsIterator.hasNext( ))
24  {
25    try
26    {
27      Map.Entry statisticsEntry = (Map.Entry)statisticsIterator.next( );
28      HashMap statisticsMap = (HashMap)statisticsEntry.getValue( );
29
30      String isAccepting = (String)statisticsMap.get("ACCEPTINGCONNECTIONS");
31
32      if (isAccepting == null) // Downlevel systemmanager.
33        isAccepting = "TRUE";
34
35      // Is this server accepting connections?
36
```

TABLE 3-continued

```
37      if ( isAccepting.length( ) == 0 || isAccepting.equalsIgnoreCase("TRUE") )
38      {
39         // Compute our value...
40
41         float sessionLoadPercentage = Float.parseFloat ( (String)statisticsMap.get
42  ("TOTALSESSIONCOUNT"));
43         sessionLoadPercentage = (sessionLoadPercentage * 100) / (float)MAX_SESSIONS;
44
45         float committedBytesPercentage = Float.parseFloat ( (String)statisticsMap.get
46  152("COMMITTEDBYTESUSED"));
47         float processorPercentage = Float.parseFloat ( (String)statisticsMap.get
48  ("PROCESSORLOAD"));
49
50         float totalLoadPercentage = (sessionLoadPercentage + committedBytesPercentage +
51  processorPercentage) / 3;
52
53         // check the processorPercentage and committedBytesPercentage - if they're more
54
55         // than e.g. 75% and 65% ignore this server
56
57         if (processorPercentage < maxProcessorPercentage && committedBytesPercentage
58  < maxCommittedBytesPercentage) {
59
60            if (log.isDebugEnabled( )) {
61
62               log.debug ("allocateNewSession - Server " + statisticsEntry.getKey( ).toString( ) +
63               " has current load (%) of " + Float.toString (totalLoadPercentage));
64
65            }
66
67            sortedResponse.put (new Float (totalLoadPercentage), statisticsEntry.getKey( ));
68
69         } else {
70            log.warn ("allocateNewSession - Server " + statisticsEntry.getKey( ).toString( ) +
71            " is overloaded, sessionLoadPercentage=" + sessionLoadPercentage +
72            ", committedBytesPercentage=" + committedBytesPercentage +
73            ", processorPercentage=" + processorPercentage);
74         }
75
76      }
77
78   }
79   catch(Exception E) {log.error (E);}
80 }
81
82 // OK... first entry is...
83 PAESessionImp chosenSession;
84
85 String chosenServerDn;
86
87 try
88 {
89    chosenServerDn = (String)sortedResponse.get( sortedResponse.firstKey( ));
90
91    // We won't know much of the details at this point (as there's no session there yet)
92
93    log.debug("allocateNewSession - identified server for application "+applicationDn);
94
95    chosenSession = (PAESessionImp)(PAESessionImp.newInstance(getLdapConnection( ),
96  this));
97
98 }
99 catch (Exception E)
100 {
101    // Didn't work - perhaps no responses
102
103    log.error("No servers responded - unable to allocate new session.");
104
105    throw new NoServersAvailableException( );
106 }
```

The above code shows that this is a Session Manager implementation in that it is implementing the interfaces of the session controller for Terminal Servers (e.g., PAESessionImp class is an implementation of the PAESession interface). Other algorithms for load balancing can be similarly defined and integrated in an example AWS.

The underlying support for a message bus can be provided by any compliant message bus provider. In the example embodiment used to support the AWS, which is JAVA based, the message bus is a JMS message bus, for example, provided by MQSeries. Additional information on JMS message buses can be found in http://java.sun.com/products/jms/, which is incorporated herein by reference.

In addition to using a message bus for session management, the message based load balancing techniques can be used to determine which server to use for implementing secure VPN services (such as the tunnel services offered by the Security, Authentication and Other Support Services 314 in FIG. 3) when a user logs onto a managed workstation running the AWS Manager client code. Session management and the selection of security service resources share some common requirements which can be suitably addressed by the use of the AWS message bus load balancing techniques. For example, both scenarios share the following characteristics:

The information must be up-to-date—as a result, lookups in central repositories are not appropriate as the central repository information is typically only be updated periodically.

The selected resource must be present—message based load balancing has the advantage that if a resource doesn't respond, then it will not be selected. Central repositories may contain stale information—in such instances, a resource may be selected that is unavailable.

If a central repository is not used, then attempting to query many individual resources using traditional connection based approaches is inappropriate mainly due to handling situations when resources are not present—the timeout behaviors when dealing with multiple connections require careful attention and can be difficult to implement.

Using message bus load balancing, the AWS web services can select an appropriate tunnel server at the moment it is needed to provide the conduit for secure communications between an AWS client and the AWS Web services.

Grid Location Services

Grid Location Services ("GLS") represent an integration of the multicast DNS (mDNS) technologies with DNS technology to achieve transparent configurability of servers.

The AWS needs to support the ability to services to be added, removed and to fail over without reconfiguring all the entities that use those services. The AWS implements a mechanism referred to as Grid Location Services to provide this capability. In older systems, mDNS or other broadcast/multicast directory name service systems were used through a network to achieve transparent reconfigurability, but the implementations of firewalls in modern networks prevent such service systems from being effective. There are only a few services that all firewalls allow through, and DNS (Domain Name Service) is one of them.

In a DNS system, names such the server names contained in urls (also known as fully qualified domain names) are mapped to network addresses analogous to how a phone book resolves names to phone numbers but with (typically) multiple steps of translation for all portions of a network address. The directory, or portions of it, are typically replicated throughout a networked environment, but when a change to a mapping of domain name to network address occurs, this change needs to be propagated to the DNS servers that implement the directory. Thus, when a server address fails, or when the network is configured there is a delay to await the change taking effect. In addition, many small local networks do not support a DNS server, and so use other ways to map the address to a final destination—a node on the local network. In addition, as DNS does not check the state of any addresses that it provides (as downstream or caching servers may be providing the address), there is also the possibility that the final hop to a physical machine on a local network will not properly result in a working destination.

mDNS protocols offer a way to provide such mappings without the use of a DNS. Thus, smaller or localized networks may implement mDNS to figure out which computing resource is response to a service request. In mDNS, a request for a service is reconciled with the provider of a service using an IP multicast protocol without a DNS server being implemented. When devices fail, or are reconfigured, they simply don't respond, or respond as appropriate to the service request.

As mentioned, many of today's firewall systems do not allow mDNS messages to pass through the firewall. The AWS Grid Location Services address these problems by allowing remote computers and LANs to use a DNS name and the DNS protocol to resolve a name to an IP address, even though the "last hop" of the DNS resolution process is actually achieved using mDNS. Thus, the devices can be reconfigured at will locally (or even fail) transparent to requesting systems that access them remotely.

Technically, Grid Location Services is a combination of DNS and mDNS. mDNS is used to locate services on the same LAN, and a DNS to mDNS bridge allows entities not resident on the same LAN to take advantage of the capabilities of mDNS to locate services on that LAN.

Figure 40:
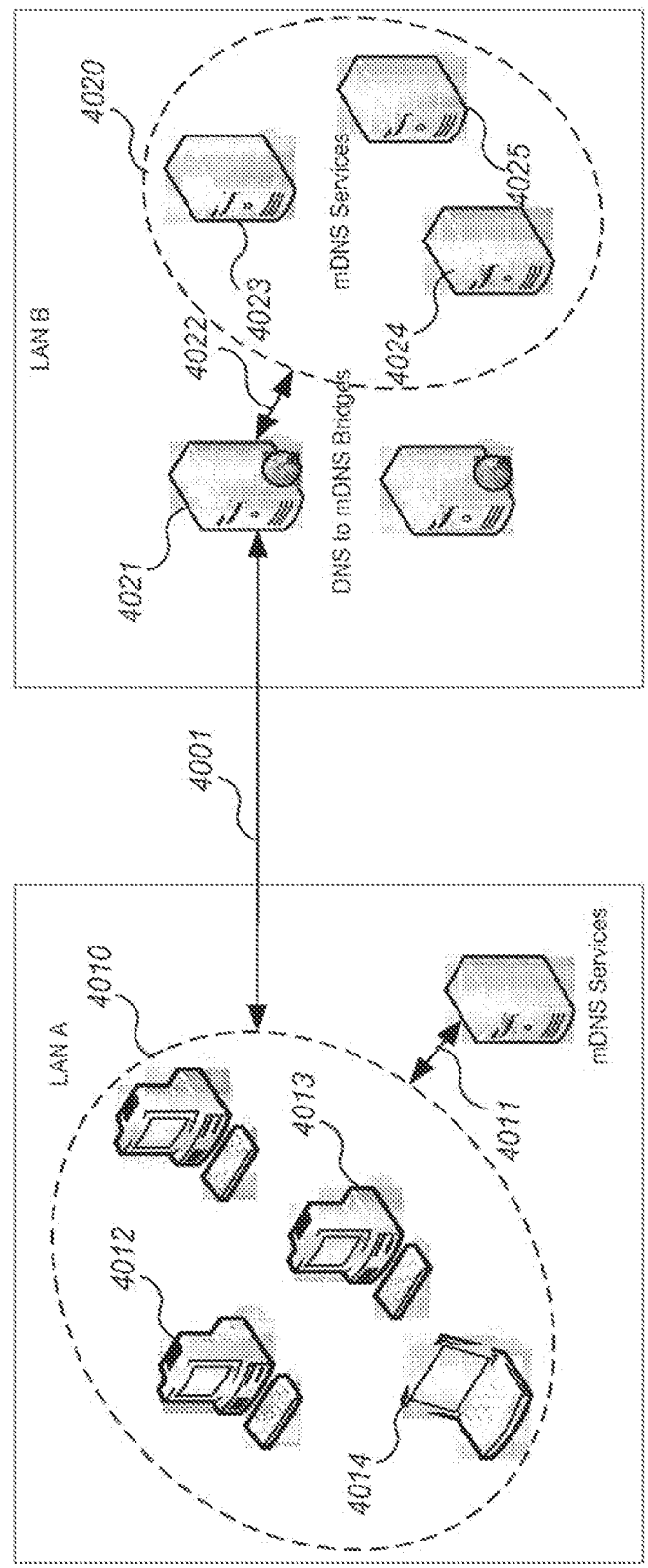
FIG. 40 is an example block diagram that illustrates how AWS Grid Location Services work within a LAN and across LANs.

FIG. 40 is an example block diagram that illustrates how AWS Grid Location Services work within a LAN and across LANs. Within LAN A 4010, workstations, such as computing systems 4012-4014, locate mDNS services within their LAN by using mDNS directly through mDNS server 4011. Remote services are located across a network, such as via wide area network 4001, using the DNS, for example via the DNS/mDNS bridge server 4021, which communicates using mDNS on LAN B 4020 through mDNS connection 4022. For example, the DNS/mDNS bridge server 4021 within LAN B is configured so that the subdomain "grid" of "lanb.foo.com" is handled by across the mDNS connection 4022. As a result, a query from any DNS client (for example, computing system 4013 on LAN A 4010) for the name "collectionserver.grid-.lanb.foo.com" would result in the name "collectionserver" being resolved ultimately using mDNS services 4023-4025 on LAN B 4020.

Note that this is not an implementation of what is sometimes termed "Dynamic DNS" in that the DNS servers in this invention are not updated. Rather, they always return a 0 "time to live" for all responses so they are always re-queried, and each time they will use the state of the MDNS system to resolve the DNS query.

In an example embodiment of the AWS Grid Location Services, the GLS subsystem (the DNS to mDNS bridge), for example, bridge server 4021 in FIG. 40, comprises two server components:

A server process (GLSDNS) that responds to DNS requests based on the contents of a file (the "registration" file);

A server process (GLSMDNS) that is a registered mDNS node that alters the contents of the above registration file based on mDNS registrations.

The GLSDNS process is not the same as a standard DNS server—standard DNS servers load information from a file, but then view that information as static and tend to respond to queries without re-querying the file. GLSDNS uses the contents of the file for *each and every request it receives* and responds to those requests setting the TTL (time to live) to 0 to ensure that the response is not cached by any downstream components. This ensures that if a name needs to be resolved again, it will result in another query being sent to GLSDNS.

The GLSMDNS process registers as an MDNS node with a configurable domain and for a number of different service types (see below for example usage), and listens for other registrations in that domain. When other registrations are received, it updates the registration file—this in essence ensures that the registration file contains all of the names and associated IP addresses of nodes registered in a particular domain providing a particular service. In addition, when nodes are no longer present, their information will be removed from the registrations file by the GLSMDNS process.

GLSMDNS can also be extended with particular plug-ins that can check whether a server that is providing a service type is actually providing that service. For example, if the GLSM-DNS process is monitoring servers that register LDAP directory services, then GLSMDNS will have a plug-in that will periodically perform LDAP queries against all the servers in the registration file, and for those that do not respond correctly, not include that node in the list of addresses that correspond to that service type in the registration file. mDNS uses a convention of underscores in service names—GLSMDNS strips these off when creating DNS names that map to service names.

As an example of the use of AWS Grid Location Services, suppose 4 mDNS nodes exist in the .local. domain as follows:

TABLE 4

| Name | Service(s) | IP Address | Notes |
|---|---|---|---|
| PC01 | _ldap._tcp | 192.168.100.41 | Has an LDAP server |
| PC02 | _ldap._tcp _jms._tcp | 192.168.100.42 | Has an LDAP server and a JMS server |
| PC03 | _http._tcp | 192.168.100.43 | Has a web server |
| PC04 | _rdp._tcp | 192.168.100.44 | Terminal Server |

In this example, there are a number of different service types, including LDAP services, JMS services, terminal services, and http services. GLSMDNS may have a plug-in to monitor each service type, but LDAP is the one that is commonly used in an example AWS. GLSMDNS monitors mDNS messages for the .local. domain and having received registrations for the above 4 nodes will write out a registration file that includes the following contents:

TABLE 5

| # Hosts |
|---|
| PC01 = 192.168.100.41 |
| PC02 = 192.168.100.42 |
| PC03 = 192.168.100.43 |
| PC04 = 192.168.100.44 |
| # Services |
| LDAP = 192.168.100.41, 192.168.100.42 |
| JMS = 192.168.100.42 |
| HTTP = 192.168.100.43 |
| RDP = 192.168.100.44 |

In this example, GLSDNS is configured to be the authoritative DNS server for the domain WORKSPACE.INT. GLSDNS responds to queries for names in the WORKSPACE.INT domain by using the registration file created from the mDNS information.

As a result, a DNS query for pc01.workspace.int would get the response 192.168.100.41, and a DNS query for http.workspace.int would get 192.168.100.43. GLSDNS uses each service address it finds in turn, so that a DNS query for ldap.workspace.int may return 192.168.100.41 or 192.168.100.42.

This last example demonstrates how the monitoring plug-ins operate—if the GLSMDNS monitoring plug-in for LDAP failed to retrieve a correct LDAP response to the test query, it would remove that node from the LDAP list thus ensuring that clients who are requesting the service LDAP will only receive the IP address of a working LDAP service.

By combining mDNS and DNS, a number of features of both are no longer available—e.g., mDNS has a facility for providing the port number of a service as well as the address, and DNS has a strong focus on caching results to lower network traffic. Neither of which are available using GLS.

However, the advantages of using the GLS approach are several. Servers and services can be added to an embodiment of the AWS without the need for the configuration that DNS systems require and the AWS can dynamically address whether those servers and services are present or not. Also, service queries can take into account whether the service is actually functioning—this is an important part of high availability. Moreover, the GLS functionality is available to any client systems that use DNS without the requirement for additional client side software.

Additional information on DNS is provided in the DNS Specification RFC 1035: http://www.ietf.org/rfc/rfc1035.txt. Details on using DNS to locate services is provided in RFC 2782: http://rfc.net/rfc2782.html. Details on using mDNS are available in the mDNS Specification: http://files.multicastdns.org/draft-cheshire-dnsext-multicastdns.txt.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/752,208 entitled "VIRTUALIZED APPLICATION WORKSPACES," filed on Dec. 19, 2005, is incorporated herein by reference, in its entirety.

From the foregoing it will be appreciated that, although specific embodiments of the description have been described herein for purposes of illustration, various modifications may be made without deviating from the spirit and scope of the invention. For example, the methods and systems for performing entitlement resolution and packaging discussed herein are applicable to other architectures other than a Windows-based architecture and in non "online" environment. For example, the separation of user administration and application administration can be integrated into a group of peer computer systems connected together. The methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

What is claimed is:

1. A method for providing access to applications for a computing device comprising:
  receiving an identification of a user and/or group to which the user belongs, wherein the user is associated with the device;
  determining, based on the identification, a plurality of applications that the user and/or the group to which the user belongs is entitled to access, wherein each of the plurality of applications includes (i) code and/or script that is locally executed on the computing device to provide screen and user input functionality, and (ii) code and/or script that is executed remotely from the computing device to perform functions of the application; and transmitting information corresponding to the plurality of applications to the computing device to enable the computing device to present a set of icons, each of which is associated with one of the applications, wherein upon a selection of one of the icons by the user, the associated application is launched through a web browser of the computing device.

2. The method of claim 1, wherein each of the plurality of applications cannot be locally installed on the computing device.

3. The method of claim 1, further comprising:
determining, based on the identification, additional applications that the user and/or the group to which belongs is entitled to access, wherein each of the additional applications need to be locally installed on the computing device in order to be executed; and
transmitting information corresponding to the additional application to the computing device to enable the computing device to present an additional set of icons, each of which is associated with one of the additional applications, wherein upon selection of one of the icons by the user, the associated application is installed on the computing device.

4. The method of claim 3, further comprising:
causing the computing device to display the set of icons together with the additional set of icons within a single applications portal that enables the user of the computing device to launch an application or to locally install the application depending on which icon is selected by the user.

5. The method of claim 3, further comprising transparently installing at least one of the additional applications on the computing device.

6. The method of claim 3, wherein determining the additional applications further comprises identifying the additional applications based on characteristics of the computing device.

7. The method of claim 4, wherein the computing device is a mobile device.

8. The method of claim 1, wherein a virtual workspace implemented on the computing device receives the transmitted information and presents the set of icons.

9. A non-transitory computer readable storage medium comprising instructions, that when executed by one or more processors, cause the one or more processors to:
receive an identification of a user and/or group to which the user belongs, wherein the user is associated with the device;
determine, based on the identification, a plurality of applications that the user and/or the group to which the user belongs is entitled to access, wherein each of the plurality of applications includes (i) code and/or script that is locally executed on the computing device to provide screen and user input functionality, and (ii) code and/or script that is executed remotely from the computing device to perform functions of the application; and
transmit information corresponding to the plurality of applications to the computing device to enable the computing device to present a set of icons, each of which is associated with one of the applications, wherein upon a selection of one of the icons by the user, the associated application is launched through a web browser of the computing device.

10. The non-transitory computer readable storage medium of claim 9, wherein each of the plurality of applications cannot be locally installed on the computing device.

11. The non-transitory computer readable storage medium of claim 9, further comprising instructions, that when executed by the one or more processor, cause the one or more processors to:
determine, based on the identification, additional applications that the user and/or the group to which belongs is entitled to access, wherein each of the additional applications need to be locally installed on the computing device in order to be executed; and
transmit information corresponding to the additional application to the computing device to enable the computing device to present an additional set of icons, each of which is associated with one of the additional applications, wherein upon selection of one of the icons by the user, the associated application is installed on the computing device.

12. The non-transitory computer readable storage medium of claim 11, further comprising instructions, that when executed by the one or more processor, cause the one or more processors to:
cause the computing device to display the set of icons together with the additional set of icons within a single applications portal that enables the user of the computing device to launch an application or to locally install the application depending on which icon is selected by the user.

13. The non-transitory computer readable storage medium of claim 11, further comprising instructions, that when executed by the one or more processor, cause the one or more processors to:
transparently install at least one of the additional applications on the computing device.

14. The non-transitory computer readable storage medium of claim 11, wherein determining the additional applications further comprises identifying the additional applications based on characteristics of the computing device.

15. The non-transitory computer readable storage medium of claim 12, wherein the computing device is a mobile device.

16. The non-transitory computer readable storage medium of claim 9, wherein a virtual workspace implemented on the computing device receives the transmitted information and presents the set of icons.

17. A system comprising one or more processors and computer memory containing instructions executed by the one or more processors to cause the one or more processors to:
receive an identification of a user and/or group to which the user belongs, wherein the user is associated with the device;
determine, based on the identification, a plurality of applications that the user and/or the group to which the user belongs is entitled to access, wherein each of the plurality of applications includes (i) code and/or script that is locally executed on the computing device to provide screen and user input functionality, and (ii) code and/or script that is executed remotely from the computing device to perform functions of the application; and
transmit information corresponding to the plurality of applications to the computing device to enable the computing device to present a set of icons, each of which is associated with one of the applications, wherein upon a selection of one of the icons by the user, the associated application is launched through a web browser of the computing device.

18. The system of claim 17, wherein each of the plurality of applications cannot be locally installed on the computing device.

19. The system of claim 17, wherein the computer memory further contains instructions to cause the one or more processors to:
- determine, based on the identification, additional applications that the user and/or the group to which belongs is entitled to access, wherein each of the additional applications need to be locally installed on the computing device in order to be executed; and
- transmit information corresponding to the additional application to the computing device to enable the computing device to present an additional set of icons, each of which is associated with one of the additional applications, wherein upon selection of one of the icons by the user, the associated application is installed on the computing device.

20. The system of claim 19, wherein the computer memory further contains instructions to cause the one or more processors to:
- cause the computing device to display the set of icons together with the additional set of icons within a single applications portal that enables the user of the computing device to launch an application or to locally install the application depending on which icon is selected by the user.

21. The system of claim 19, wherein the computer memory further contains instructions to cause the one or more processors to: transparently install at least one of the additional applications on the computing device.

22. The system of claim 19, wherein determining the additional applications further comprises identifying the additional applications based on characteristics of the computing device.

23. The system of claim 20, wherein the computing device is a mobile device.

24. The system of claim 17, wherein a virtual workspace implemented on the computing device receives the transmitted information and presents the set of icons.

* * * * *